United States Patent [19]
Allen et al.

[11] Patent Number: 5,995,884
[45] Date of Patent: Nov. 30, 1999

[54] COMPUTER PERIPHERAL FLOOR CLEANING SYSTEM AND NAVIGATION METHOD

[76] Inventors: Timothy P. Allen; Pauline O. James, both of 16100 Soda Springs Rd., Los Gatos, Calif. 95030

[21] Appl. No.: 08/813,710

[22] Filed: Mar. 7, 1997

[51] Int. Cl.⁶ .................................................. G06F 165/00
[52] U.S. Cl. ............................. 701/24; 701/25; 318/587; 180/167
[58] Field of Search ................................. 701/2, 23, 24, 701/25, 26, 300, 301; 318/587; 180/167, 168, 169

[56] References Cited

U.S. PATENT DOCUMENTS

| | | | |
|---|---|---|---|
| 4,700,301 | 10/1987 | Dyke | 364/424 |
| 4,754,402 | 6/1988 | Wand | 364/424 |
| 4,811,228 | 3/1989 | Hyyppa | 364/424.02 |
| 4,847,769 | 7/1989 | Reeve | 364/424.02 |
| 4,939,650 | 7/1990 | Nishikawa | 701/26 |
| 4,939,651 | 7/1990 | Onishi | 701/26 |
| 4,940,925 | 7/1990 | Wand et al. | 318/587 |
| 4,962,453 | 10/1990 | Pang et al. | 364/424.02 |
| 4,986,384 | 1/1991 | Okamoto et al. | 701/2 |
| 4,987,540 | 1/1991 | Luke, Jr. | 701/24 |
| 5,051,906 | 9/1991 | Evane et al. | 364/424 |
| 5,109,566 | 5/1992 | Kobayashi et al. | 15/319 |
| 5,111,401 | 5/1992 | Everett, Jr. et al. | 364/424 |
| 5,220,263 | 6/1993 | Onishi et al. | 701/24 |
| 5,276,618 | 1/1994 | Everett, Jr. | 701/24 |
| 5,305,217 | 4/1994 | Katsunari et al. | 364/424 |
| 5,321,614 | 6/1994 | Ashworth | 701/26 |
| 5,341,540 | 8/1994 | Soupert et al. | 15/319 |
| 5,448,479 | 9/1995 | Kemner et al. | 701/2 |
| 5,467,273 | 11/1995 | Faibish et al. | 364/424 |
| 5,483,455 | 1/1996 | Lay et al. | 364/488 |
| 5,543,789 | 8/1996 | Behr et al. | 340/995 |
| 5,548,296 | 8/1996 | Matsuno | 342/457 |
| 5,548,511 | 8/1996 | Bancroft | 364/424 |
| 5,570,285 | 10/1996 | Asaka et al. | 364/424 |
| 5,749,058 | 5/1998 | Hashimoto | 701/23 |

*Primary Examiner*—Gary Chin

[57] ABSTRACT

A computer peripheral system including a mobile vehicle, a two-way wireless link to a host computer and software residing on the host computer for providing control and guidance is disclosed. The system is installed on an existing host computer as an add-on peripheral device whose function is to perform some automatic task (e.g. floor cleaning) in a working environment (e.g. a home or business). The mobile vehicle is equipped with a plurality of sensors, data from which is conveyed to the host system over the wireless link. Software on the host computer communicates control and movement commands to the mobile system. A method and apparatus for sensing the position of the mobile vehicle in a working environment is also disclosed. Software installed on the host computer can use data from the sensing apparatus to automatically construct and maintain a map of the operating environment and to guide the mobile vehicle through the environment in order to carry out its task. Also disclosed are methods and apparatus for providing entertainment for onlookers as the vehicle carries out its task.

36 Claims, 38 Drawing Sheets

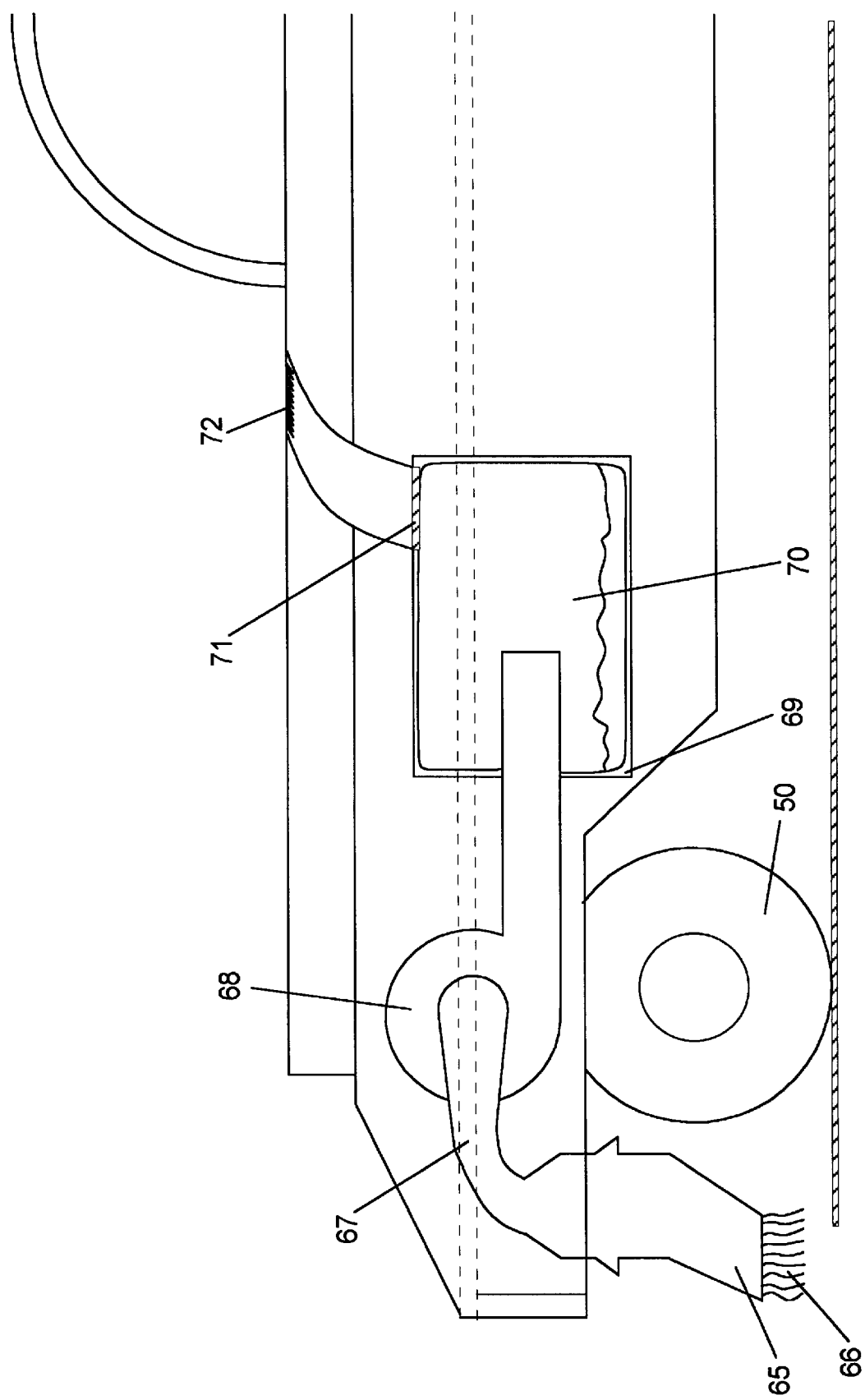

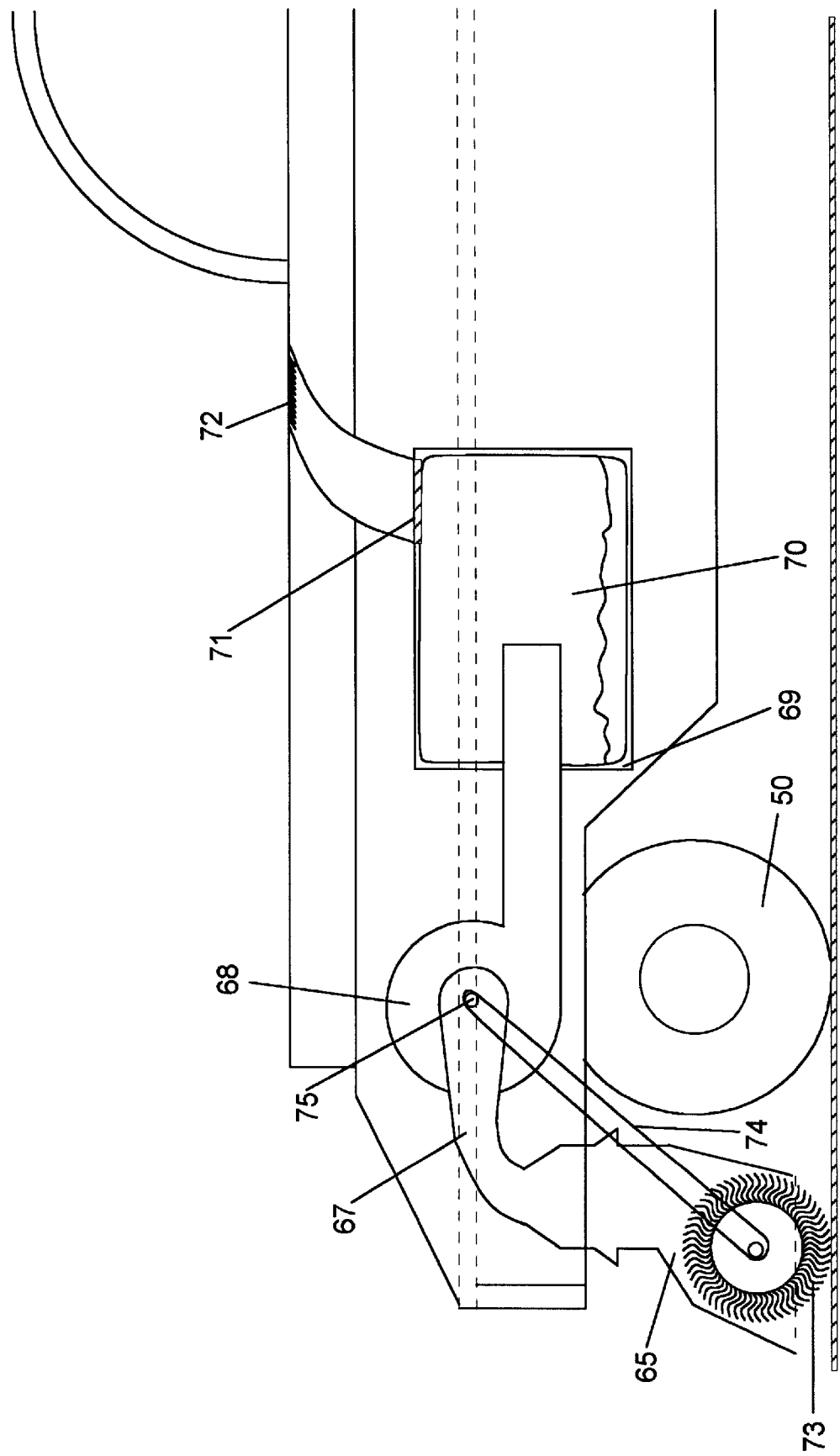

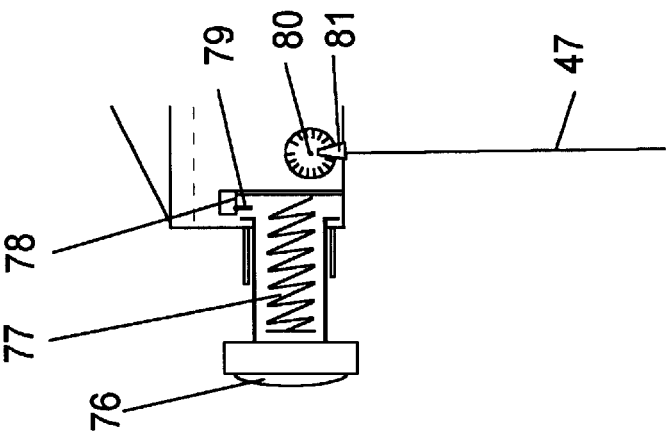
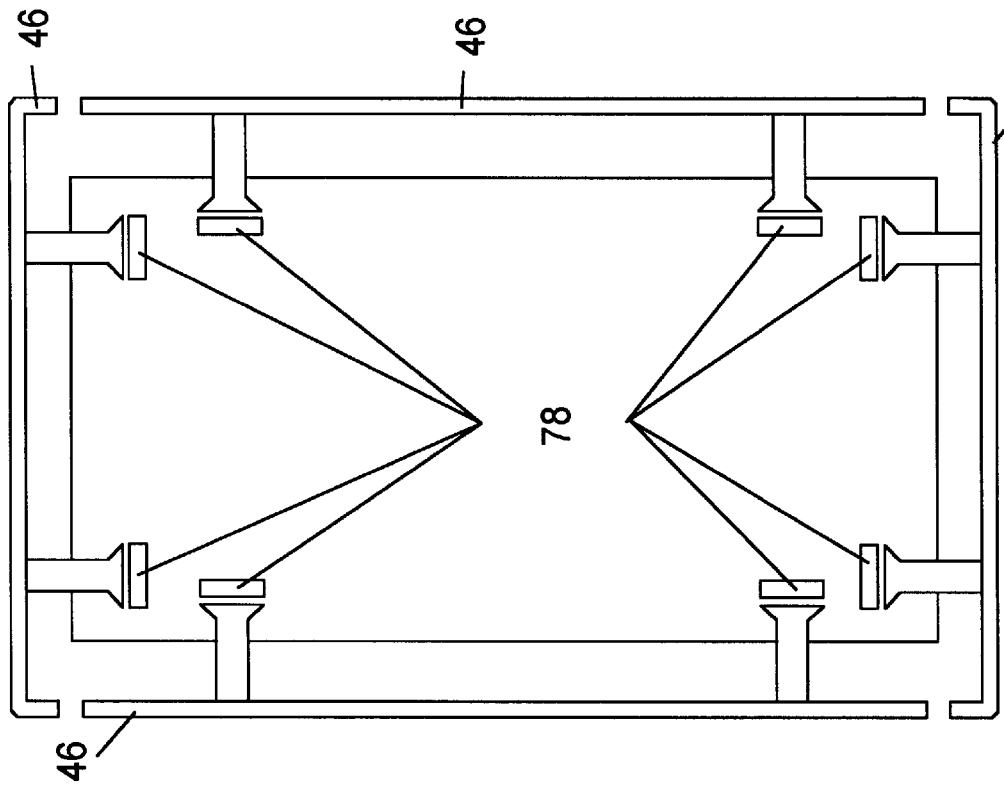
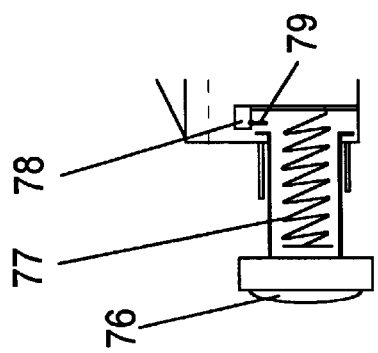

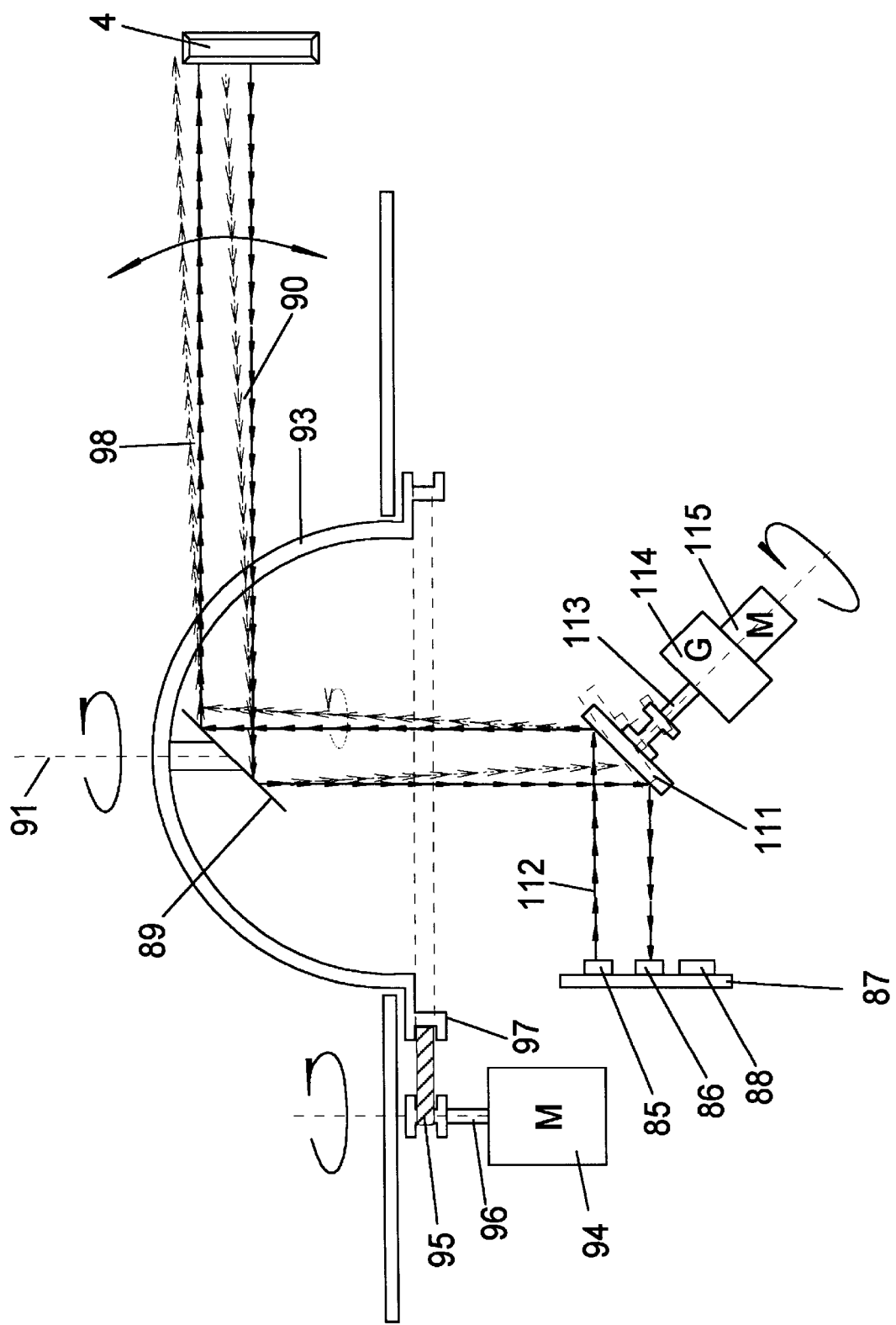

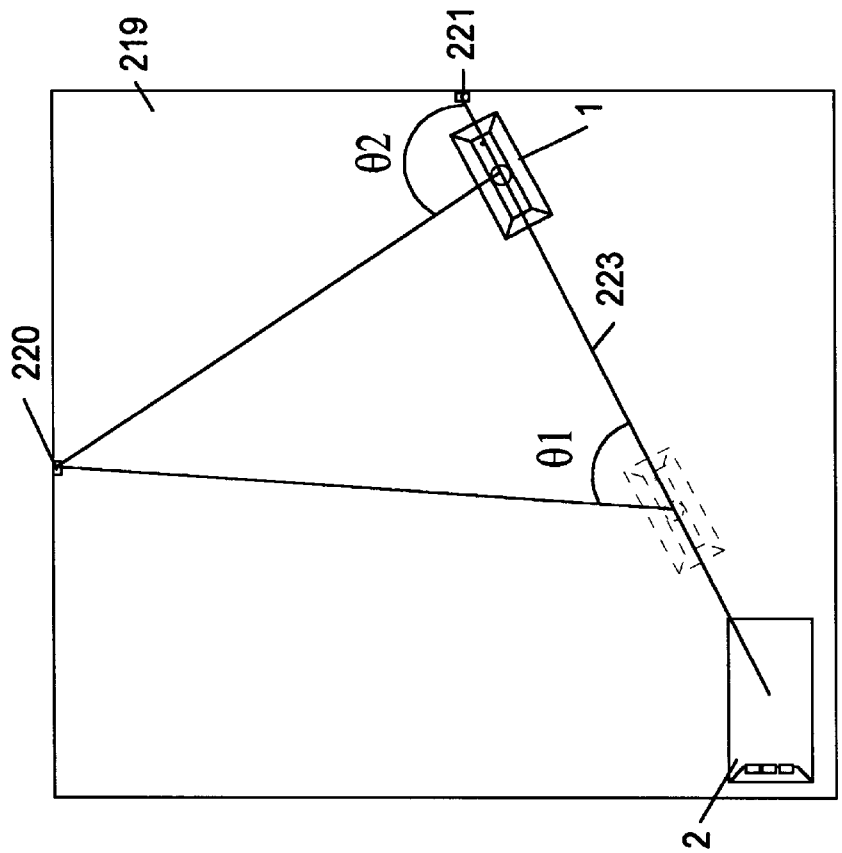
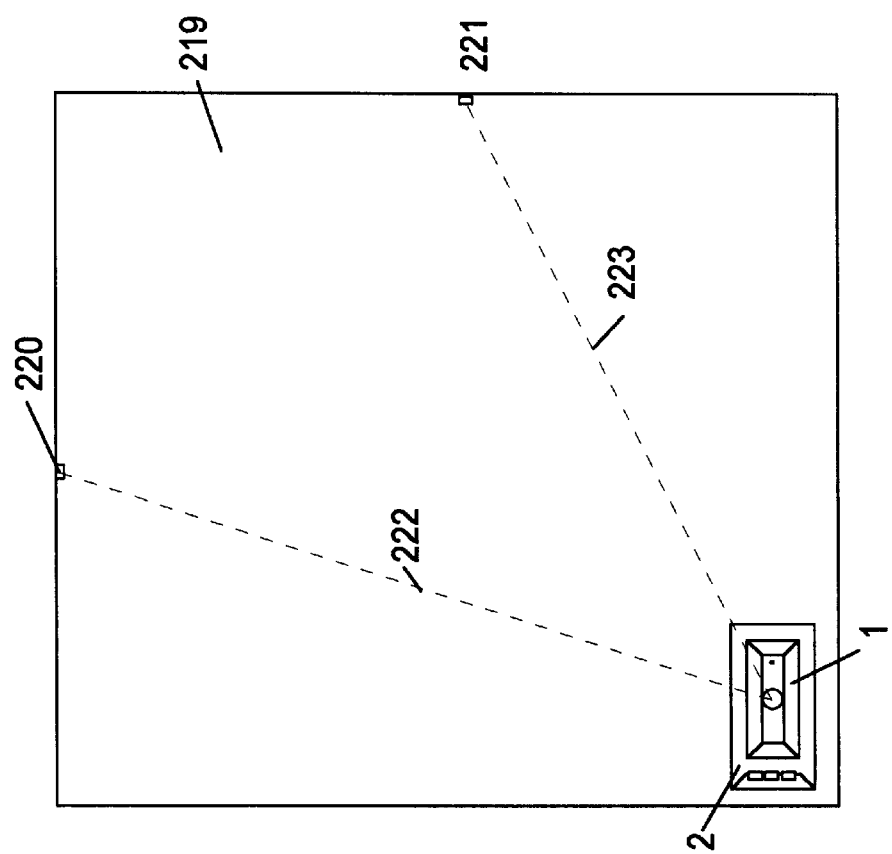

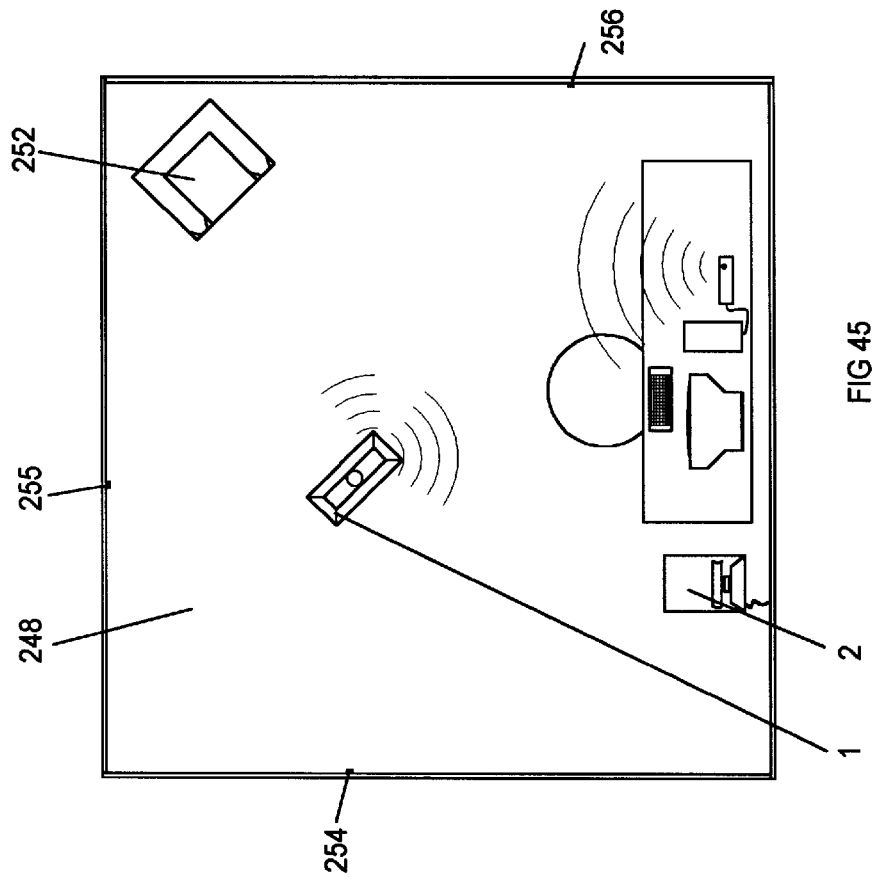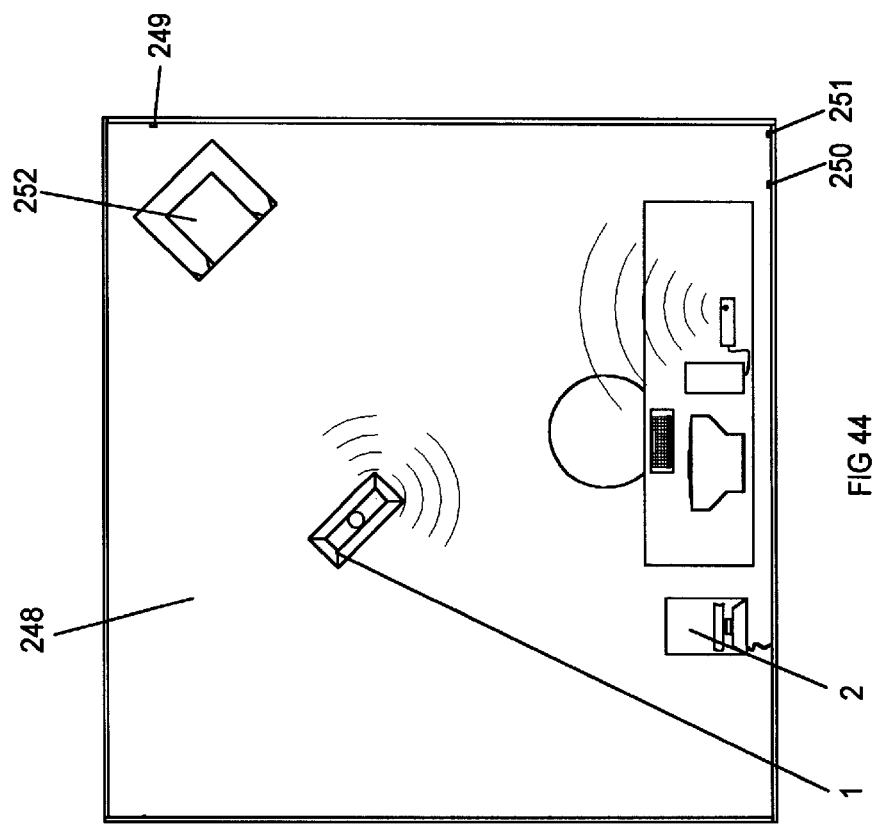

COMPUTER PERIPHERAL FLOOR CLEANING SYSTEM AND NAVIGATION METHOD

BACKGROUND

1. Field of the Invention

The present invention relates to automatic guided vehicles (AGVs), methods and apparatus for controlling AGVs, and use of an AGV as a computer peripheral device in a home or office environment already equipped with a computer.

2. Description of the Prior Art

Numerous devices and systems have been proposed for controlling an automatic guided vehicle (AGV) through a working environment. AGV systems have been successfully applied to specialized tasks such as warehouse automation, hospital delivery systems, and other industrial applications. There is a great deal of interest in using AGVs for automatic cleaning tasks. Despite extensive work and progress in the fields of AGV design, navigation, and control, the promise of ubiquitous cleaning robots suitable for ordinary household use remains substantially unfulfilled.

Most AGV systems described in the prior art use an onboard computer for control and guidance. U.S. Pat. No. 5,109,566 to Kobayashi, et al, describes a method for subdividing an area to be cleaned into a regular grid. As the AGV traverses the area, ultrasonic sensors detect the presence or absence of an obstacle within each grid square. The onboard computer system stores this information and uses it to guide the vehicle through the environment. A principal limitation of this system (and many similar systems, such as another taught by U.S. Pat. No. 5,305,217 to Nakamura et al.) is the high cost and/or limited capabilities of the onboard computer. If the vehicle includes an inexpensive computer, its storage, processing, and user-interface capabilities are necessarily limited. If the vehicle includes a computer system with plentiful storage and CPU resources, the cost of the system is increased beyond the reach of many consumers.

U.S. Pat. No. 5,111,401 to Everett, et al; teaches a method for AGV navigation using retroreflective strips applied to a floor to mark guidepaths. These strips are detected by a camera and image-processing equipment mounted on the vehicle. The cost of the camera and image-processing equipment render this system unsuitable for consumer applications. Furthermore, most household and office environments cannot accommodate strips applied to the floor.

U.S. Pat. No. 5,341,540 to Soupert, et al; teaches a cleaning system which requires an operator to manually guide an AGV through a desired path during a learning phase. A computer system on the vehicle memorizes the path so that the vehicle can later clean automatically. Any such system which requires a laborious, time-consuming, or error-prone installation process will be subject to substantial resistance from consumers.

The fields of AGV navigation and control have been extensively addressed in the prior art. A principal problem in AGV navigation is determining the position of the vehicle within the working environment. Dead-reckoning (a.k.a. odometry), a process in which wheel rotation counts and steering angle measurements are used to continuously update an estimate of the vehicle's location, is a standard technique. AGV navigation methods which rely exclusively on dead-reckoning tend to be severely limited by accumulated errors in the position estimate.

Some systems in the prior art use a secondary source of navigational information to correct accumulated errors in a dead-reckoning position estimate. U.S. Pat. No. 4,754,402 to Wand et al; teaches a method for using a vision system to provide an absolute reference for dead-reckoning navigation. Vehicles which include a vision system and associated computation and storage facilities are too complex and expensive for cost-sensitive applications.

U.S. Pat. No. 4,811,228 to Hyyppa teaches a navigation method which uses a plurality of anonymous, fixed retroreflective reference markers detected by a scanning system on a vehicle. During a learning phase, an operator guides the vehicle along a desired path and an onboard computer monitors the apparent motion of the reference markers and memorizes their locations. During a subsequent automatic operation phase, the computer can derive an estimate from observations of the reference markers. This system is limited because the vehicle must be within line-of-sight of at least three reference reflectors at every point along its intended path. This system is further limited because it requires that the operator precisely specify the path for the vehicle to follow.

The cited example systems suffer from high cost, an inconvenient installation process, or both. These factors limit their utility in home or small-business applications. That such systems have not been widely accepted for home or office use (as of the date of this application) despite much progress in the field of AGVs is significantly due to the high cost of the onboard computers used for guidance and control.

Traditionally, AGVs have been thought of as expensive systems suitable only for use in large factories or dangerous environments where the cost of the system is not a critical factor. Most improvements have been in the area of making AGVs more autonomous, or in developing sensing methods to determine their position more accurately-often through the application of expensive technologies or components.

OBJECTS AND ADVANTAGES

The present invention addresses the requirements of an automated cleaning device for use in a home or office environment. The requirements of such an environment are markedly different from those of industrial robot applications described in the prior art, such as hospital delivery systems or warehouse. The principal objects and advantages of the present invention include:

Very low cost, competitive with conventional manually-operated vacuum cleaning systems.

A simple and quick setup procedure which can be carried out by a non-technical end-user.

Less stringent requirements on guidance and navigation accuracy than is needed for industrial robots. For example, collisions are a permitted means of sensing the environment, and it is permissible for the system to occasionally get stuck or require operator intervention.

The absence of a need to perform the cleaning task in an especially efficient or rapid manner. The task is typically carried out at night or at some other time when the environment is vacant.

The inclusion of a number of features which make the device more suitable to home use than industrial robots described in the prior art, including:
1. A friendly, graphical user interface that allows users to configure the operation, schedule, and cleaning methods used by the system.
2. Various features for providing entertainment to onlookers, including a control program which can be configured to move the vehicle in an amusing manner in accordance with a user-selected "personality."

The overarching object and advantage of the present invention is the construction and deployment of an automatic self-running cleaning system which is inexpensive enough, convenient enough, effective enough, and fun enough to find widespread acceptance among consumers. Thereby the present invention seeks to fulfill the promise of ubiquitous self-running cleaning robots suitable for ordinary household use.

BRIEF DESCRIPTION OF THE DRAWINGS

FIG. 10 shows a cutaway side view of onboard vacuum apparatus.

FIG. 11 shows cutaway side view of vacuum apparatus with agitator brush.

FIG. 12 shows a cutaway side view of vehicle bumper.

FIG. 13 shows the schematic plan view of an example bumper switch arrangement.

FIG. 14 shows cutaway side view of vehicle's whiskers.

FIG. 21 shows cross sectional side view of improved navigational scanner.

FIGS. 37A and 37B show a plan view of example room with charging station and two reflectors.

FIG. 44 shows a plan view of example room showing poor placement of reference reflectors.

FIG. 45 shows a plan view of example room showing improved placement of reference reflectors.

LIST OF REFERENCE NUMERALS IN DRAWINGS

Figure 1:
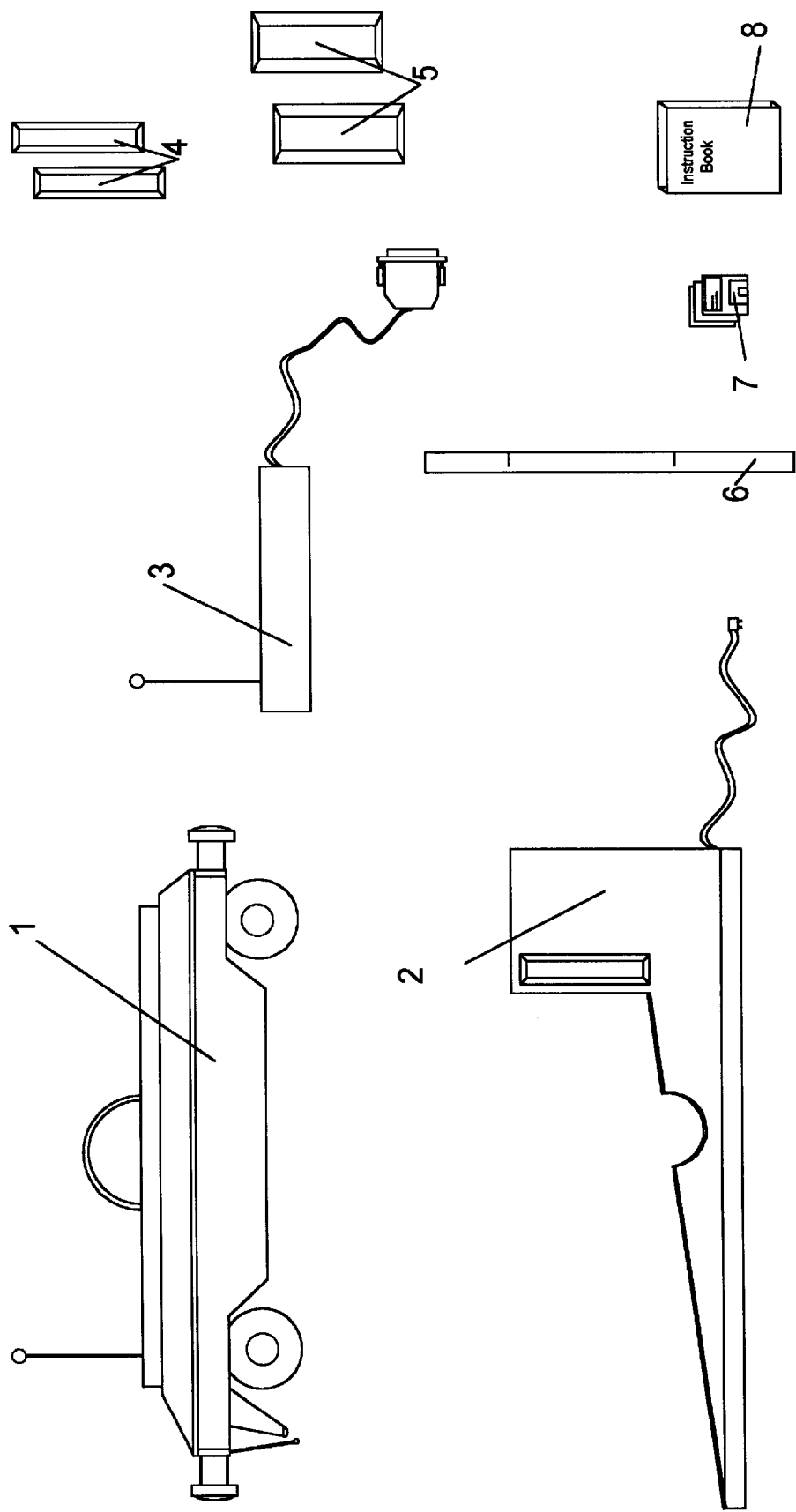
FIG. 1 shows the primary components of robot cleaning system.

1 Remotely controlled self-propelled vehicle.
2 Charging station.
3 Host interface transmit/receive module.
4 Reflective navigational reference marker.
5 Reflective Keep-out marker.
6 Measuring stick for reference reflector placement.
7 Distribution media containing control program.
8 Installation instruction booklet.
9 Host personal computer system.
10 Graphical display device.
11 Desk.
12 Example room in working environment.
13 Second example room.
14 Third example room.
15 Wireless communication signals.
16 Control program executing on host computer 9.
17 Operating system for host computer 9.
18 Keyboard input device.
19 Pointing device.
20 Hard disk mass-storage device.
21 System random-access memory (RAM).
22 Peripheral connection port.
23 Second peripheral connection port.
24 Cable connecting host interface module 3 to host 9.
25 Plug assembly for insertion into peripheral port 22.
26 Housing of host interface module 3.
27 Printed circuit board inside host interface module 3.

28 Microcontroller chip inside host interface module 3.
29 Wireless communication circuit inside host interface module 3.
30 Buffer memory chip inside host interface module 3.
31 Antenna on host interface module 3
32 Plug for connecting charging station 2 to an AC outlet.
33 Transformer and battery-charging circuit inside charging station 2.
34 Spring-loaded contact probes.
35 Retroreflective reference markers affixed to charging station 2.
36 Housing of charging station 2.
37 Chassis of vehicle 1.
38 Suspension system of vehicle 1.
39 Propulsion system of vehicle 1.
40 Energy storage (battery) system of vehicle 1.
41 Onboard electronic control system of vehicle 1.
42 Radio antenna on vehicle 1.
43 Onboard vacuum system.
44 Navigational scanner system.
45 Sound generation (speaker) system.
46 Collision bumpers on vehicle 1.
47 Low-hanging whiskers on vehicle 1.
48 Battery unit for powering vacuum system 43.
49 Main battery unit.
50 Front (steering) wheels of vehicle 1.
51 Rear (driven) wheels of vehicle 1.
52 Suspension member.
53 Drive motors.
54 Steering linkage.
55 Integrated servomotor actuator for steering control.
56 Rotation sensors attached to front wheels 50.
57 Front caster wheel.
58 Pivot axis for caster wheel 57.
59 Rotation sensor affixed to pivot axis of caster wheel 57.
60 Slotted, opaque plastic disk.
61 Rotation sensor axle.
62 Integral quadrature-encoding opto-interruptor unit.
63 Radial slots formed into disk 60.
64 Quadrature pulse signals produced by opto-interruptor 62.
65 Inlet opening for vacuum system 43.
66 Brushes surrounding inlet 65.
67 Vacuum system duct.
68 Fan motor housing.
69 Collection reservoir.
70 Gas-permeable trapping bag.
71 Vacuum system exhaust filter.
72 Vacuum system exhaust vent.
73 Rotating agitator brush.
74 Drive belt.
75 Pulley affixed to shaft of fan motor 68.
76 Rubber bumper strip applique.
77 Coil spring supporting bumper.
78 Bumper microswitch.
79 Actuator member for bumper switch 78.
80 Hinge supporting whiskers 47.
81 Rotation sensor affixed to hinge 80.
82 Overhanging obstacle.
83 Mounting hinge for antenna 42.
84 Rotation sensor affixed to antenna hinge 83.
85 Photoemitter.
86 Photodetector.
87 Circuit board containing electronics for navigational scanner 44.
88 Electronic circuits for navigational scanner 44.
89 Rotating Primary projection mirror for navigational scanner 44.
90 Reflected beam.
91 Axis of rotation of mirror 89.
92 Beam projected upward onto rotating mirror 89.
93 Rotating mounting assembly for mirror 89.
94 Motor for rotating mounting assembly 93.
95 Drive belt.
96 Pulley affixed to shaft of motor 94.
97 Integrally-formed flange in rotating mounting assembly 93.
98 Scanning beam projected by navigational scanner system 44.
99 Reference orientation mark on rotating mounting assembly 93.
100 Fixed detector for sensing reference mark 99.
101 Example dark-colored obstacle in the working environment.
102 Example light-colored obstacle.
103 First example retroreflective reference marker.
104 Second example retroreflective reference marker.
105 Downward perturbation in detector signal due to obstacle 101.
106 Upward perturbation in detector signal due to obstacle 102.
107 Upward spike in detector signal due to reflector 103.
108 Upward spike in detector signal due to reflector 104.
109 Example wall of room in working environment.
110 Example of uneven terrain in working environment.
111 Secondary mirror in improved navigational scanner.
112 Beam projected onto secondary mirror 111.
113 Rotating mounting shaft for secondary mirror 111.
114 Reduction gearbox for driving shaft 113.
115 Motor for driving gearbox 114.
116 Axis of rotation of mounting shaft 113.
117 Approximate instantaneous plane of rotation of scanning beam 98.
118 Plane of rotation of scanning beam 98 at a later time.
119 Vertical angle covered by helical scan pattern of beam 98.
120 Scan paths followed by beam 98 in its helical scan pattern.
121 Local processor of onboard vehicle control system 41.
122 Vehicle's onboard wireless communication subsystem.
123 Buffer queue for sequencing commands received from host.
124 Sensor signal inputs to vehicle local processor 121.
125 Status signal inputs to vehicle local processor 121.
126 Battery charge level sensor unit.
127 Command signals to vehicle systems.
128 Vehicle control flowchart step: Accumulate motion quadrature pulses.
129 Vehicle control flowchart step: Test for collision signal.
130 Vehicle control flowchart step: Command vehicle motion stop.
131 Vehicle control flowchart step: Report collision sensor data to host.
132 Vehicle control flowchart step: Report quadrature accumulators to host.
133 Vehicle control flowchart step: Clear quadrature accumulator values.
134 Vehicle control flowchart step: Report vehicle status signals to host.
135 Vehicle control flowchart step: Test for data ready from navigational scanner.
136 Vehicle control flowchart step: Pre-process navigational scanner data.
137 Vehicle control flowchart step: Test for reflector return signal.

138 Vehicle control flowchart step: Report navigational scanner data to host.
139 Vehicle control flowchart step: Test accumulator values against threshold.
140 Vehicle control flowchart step: Execute host command.
141 Command queue flowchart step: Update distance-traveled variable.
142 Command queue flowchart step: Check queue for new command.
143 Command queue flowchart step: Test for distance-deferred command.
144 Command queue flowchart step: Compare distance.
145 Command queue flowchart step: Execute command.
146 Command queue flowchart step: Remove command from queue.
147 Command queue flowchart step: Test for time-deferred command.
148 Command queue flowchart step: Compare time.
149 Sensor data processing subsystem of control program 16.
150 Processed sensor data produced by sensor-processing subsystem 149.
151 Position-determination subsystem of control program 16.
152 Estimated current location and orientation of vehicle 1.
153 Mapping subsystem of control program 16.
154 Task-scheduling subsystem of control program 16.
155 Path-planning subsystem of control program 16.
156 Vehicle control subsystem of control program 16.
157 Command sequence issued by vehicle control subsystem 156.
158 User-interface subsystem of control program 16.
159 Estimated error in calculated vehicle location 152.
160 Simplified plan view of example room with two reference reflectors.
161 First reference reflector.
162 Second reference reflector.
163 Line along which vehicle 1 travels between successive observations.
164 Simplified plan view of example room with only one reference reflector.
165 Region of uncertain location.
166 Cone of uncertain orientation.
167 Unknown true position of vehicle 1.
168 Unknown true orientation of vehicle 1.
169 P-D subsystem flowchart test: Any reflectors detected?
170 P-D subsystem flowchart step: Integrate odometry vectors.
171 P-D subsystem flowchart step: Increment estimated error 159.
172 P-D subsystem flowchart test: Error 159 exceeds threshold?
173 P-D subsystem flowchart step: Request navigational reference.
174 P-D subsystem flowchart test: Collision detected?
175 P-D subsystem flowchart test: Known objects nearby?
176 P-D subsystem flowchart test: More than one nearby object?
177 P-D subsystem flowchart step: Use known object to estimate location.
178 P-D subsystem flowchart step: Use known object to adjust estimated error.
179 P-D subsystem flowchart step: Establish identity of observed reflectors.
180 P-D subsystem flowchart step: Store measured bearing angles in buffer.
181 P-D subsystem flowchart test: Three or more reflectors identified?
182 P-D subsystem flowchart step: Calculate location from 3 bearing angles.
183 P-D subsystem flowchart step: Estimate error in location calculation.
184 P-D subsystem flowchart test: Only one reflector identified?
185 P-D subsystem flowchart step: Use measured angle to reduce orientation error.
186 P-D subsystem flowchart test: Distance traveled since previous observation?
187 P-D subsystem flowchart step: Calculate location from reflector pair & motion.
188 Installation flowchart step: Insert media.
189 Installation flowchart step: User types "setup" command.
190 Installation flowchart step: Copy files to hard disk.
191 Installation flowchart step: Present instructions for connecting host interface module.
192 Installation flowchart test: Host interface module connected?
193 Installation flowchart step: Present instructions for charging station installation.
194 Installation flowchart step: Present instructions for reference reflector installation.
195 Installation flowchart step: Present cleaning schedule options.
196 Installation flowchart test: Ask the user: run now?
197 Installation flowchart step: End.
198 Installation flowchart step: Present system personality options.
199 Installation flowchart step: Execute explore/clean sortie immediately.
200 Predetermined arrangement of reference reflectors affixed to charging station.
201 Map calculation flowchart step: Sort collision records by age.
202 Map calculation flowchart test: Last record in database?
203 Map calculation flowchart step: Get next collision record.
204 Map calculation flowchart step: Adjust weight based on age.
205 Map calculation flowchart step: Adjust weight based on context.
206 Map calculation flowchart step: Distribute weight across neighboring squares.
207 Map calculation flowchart step: Compute new aggregate probability for each square.
208 Database update flowchart step: Identify last-traversed grid square.
209 Database update flowchart test: Any collision in grid square?
210 Database update flowchart step: Add collision record to database.
211 Database update flowchart test: New obstacle?
212 Database update flowchart step: End.
213 Database update flowchart step: Request follow-up confirmation of obstacle.
214 Database update flowchart test: Prior collision records in square?
215 Database update flowchart test: Vehicle position known accurately?
216 Database update flowchart step: Purge collision records from database.
217 Database update flowchart test: Any nearby obstacles?
218 Database update flowchart step: Request follow-up to confirm no obstacle.
219 Example room with charging station and two reflectors.

220 First reference reflector in room 219.
221 Second reference reflector in room 219.
222 Bearing line from charging station to reflector 220.
223 Bearing line from charging station to reflector 221.
224 Example room with charging station, one reference reflector, and obstacle.
225 Reference reflector in room 224.
226 Obstacle in room 224.
227 Path leading away from charging station.
228 Point along path 227 where reflector 225 is first visible.
229 Wide retroreflective reference marker.
230 Narrow retroreflective reference marker.
231 Path of scanning beam across wide and narrow reflectors.
232 Return reflection amplitude spike due to beam crossing wide reflector.
233 Return reflection amplitude spike due to beam crossing narrow reflector.
234 Example room to be cleaned by vehicle 1.
235 Example room to be avoided by 1.
236 First ordinary reference reflector in room 234.
237 Second ordinary reference reflector in room 234.
238 Chair in room 234.
239 Desk in room 234.
240 First keep-out reflector placed at en to room 235.
241 Second keep-out reflector placed at entrance to room 235.
242 Line connecting reflectors 240 and 241
243 Boundaries of working environment shown in map display window.
244 Obstacle shown in map display window.
245 Edit command menu associated with map display window.
246 Planned path shown in map display window.
247 Map display window.
248 Plan view of an example room with poor reference reflector placement.
249 First poorly-placed reference reflector.
250 Second poorly-placed reference reflector.
251 Third poorly-placed reference reflector.
252 Chair in example room 248.
253 Desk in example room 248.
254 Improved location for first reference reflector.
255 Improved location for second reference reflector.
256 Improved location for third reference reflector.

BRIEF DESCRIPTION OF THE INVENTION

The present invention brings together a unique combination of functions individually described in the prior art, along with additional unique features, which will allow for new applications not previously possible. The principal distinction between this invention and other AGVs described in the prior art is that it is constructed and delivered to the end-user in the manner of a computer peripheral. This device is designed and constructed for the specific purpose of being attached to a personal computer already owned and operated by the end-user (e.g. an Apple Macintosh system, or an Intel-based computer running a version of Windows).

With the widespread use of internet, multimedia, and other consumer-oriented applications, more and more households now include a computer. Today's CPU, memory, storage, and display capabilities of even the least expensive PC rival those of supercomputers 15 years ago. For typical home computers these considerable resources go unused for the majority of the hours in a day. The present invention takes advantage of the freely-available computation resources that can be found in many homes during the hours when the home PC is not being used.

The proposed automatic cleaning robot system consists of three major elements:

1. A self-propelled vehicle containing a vacuum system for floor-cleaning and a wireless communication link through which the vehicle's actions are controlled remotely.
2. A wireless base station connected to a peripheral port on a pre-existing personal computer (PC). This base station (referred to hereafter as the host interface module) allows a control program executing on the PC to operate the vehicle remotely.
3. A control program installed on the host PC which schedules, coordinates, plans, and controls the action of the vehicle. This program implements all of the high-level control and navigation algorithms traditionally associated with AGVs.

This invention, like many AGV systems described in the prior art, requires sophisticated control, navigation, and guidance systems. To whatever extent possible, the preferred embodiment uses the simplest and cheapest available hardware components to perform these functions—often at the cost of additional complexity, more computation, or greater storage requirements in the control algorithms. Since these algorithms are executed by the preexisting host computer and have access to all of the resources and capabilities thereof, their increased complexity adds negligibly to the system cost.

The present invention overcomes the need for a special real-time operating system running on the host PC. Because it is permissible (for example) for the vehicle to stop momentarily and await instructions as it carries out its task, the control functions can be carried out by software executing within the standard operating system (e.g. Windows 95) typically found on PCs.

The present invention also includes a novel method and apparatus for AGV navigation. The disclosed method uses a scanner and a set of anonymous retroreflective reference markers to establish an absolute location reference. Novel capabilities of the disclosed method overcome several limitations of a similar method taught by U.S. Pat. No. 4,811,228 to Hyyppa. These novel capabilities include the ability to detect the reference reflectors even when the vehicle is traversing an uneven surface and the ability to establish a location reference when only two reflectors are visible.

DETAILED DESCRIPTION OF A PREFERRED EMBODIMENT

Those of ordinary skill in the art will realize that the following description of the present invention is illustrative only and in no way limiting. Other embodiments of the invention will readily suggest themselves to such skilled persons.

Robot System Components

FIG. 1 shows all the components of the robot system as they would appear to an end-user. The robot system is composed of a mobile vehicle 1, a charging station 2, a host interface module 3, several reflector strips 4, special keep-out reflectors 5, a reference stick 6, distribution media 7 containing a control program, and an installation and instruction booklet 8.

Figure 2:
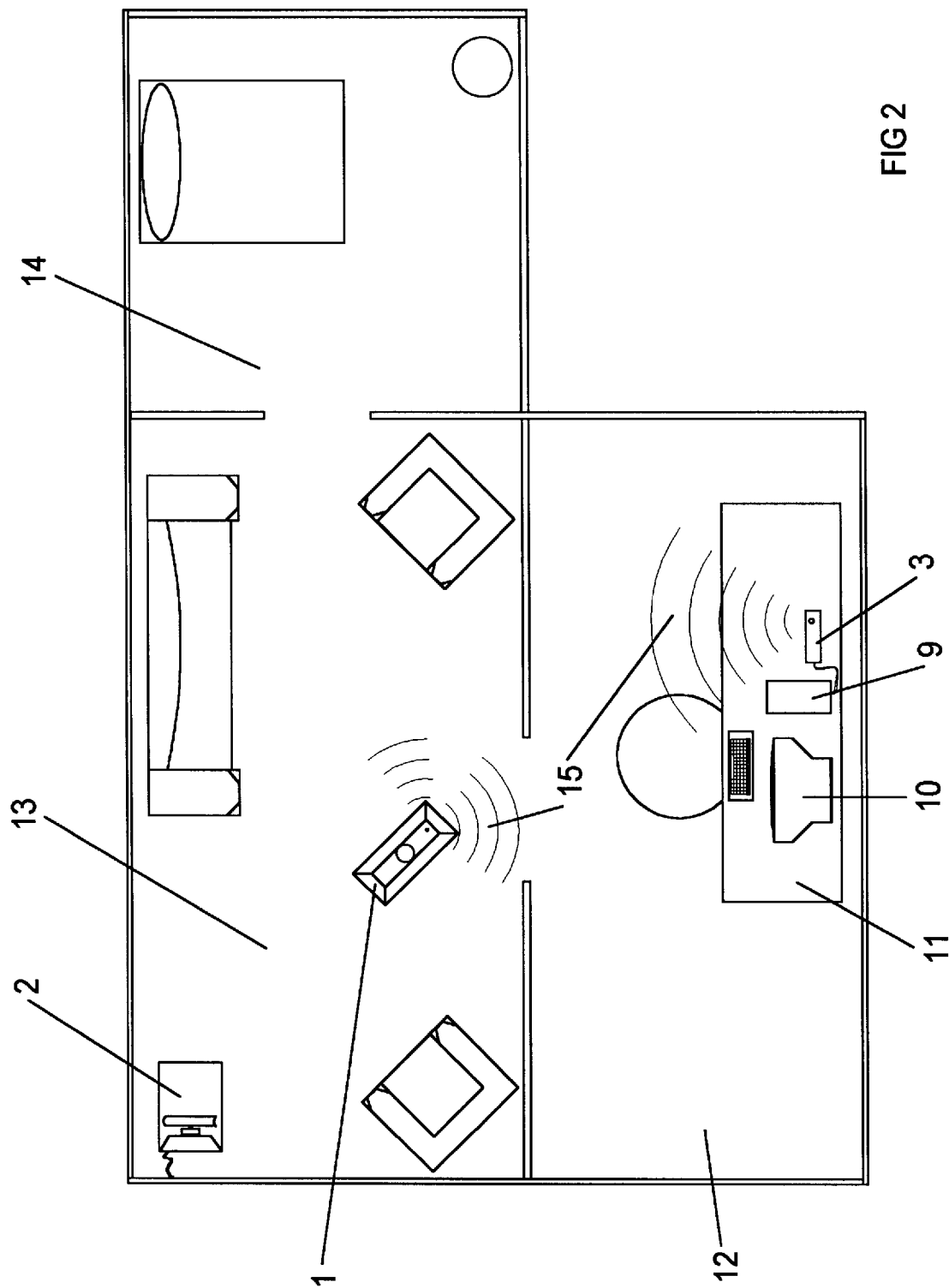
FIG. 2 shows the placement of system components in an example working environment.

FIG. 2 shows a simplified plan view of an example working environment and the placement of the various robot system components therein. Host interface module 3 is connected to a host computer 9 with an associated computer display 10, all of which are located (for example) on a desk 11. Host computer 9 is not included with the robot system;

it is presumed to be already installed. The example working environment consists of three adjoining rooms (12, 13, and 14), and several obstacles such as pieces of furniture. Charging station 2 is installed in an unobtrusive location that provides ready access to the areas to be cleaned. Vehicle 1 communicates with host interface module 3 via wireless signals 15 (discussed in detail below).

Figure 3:
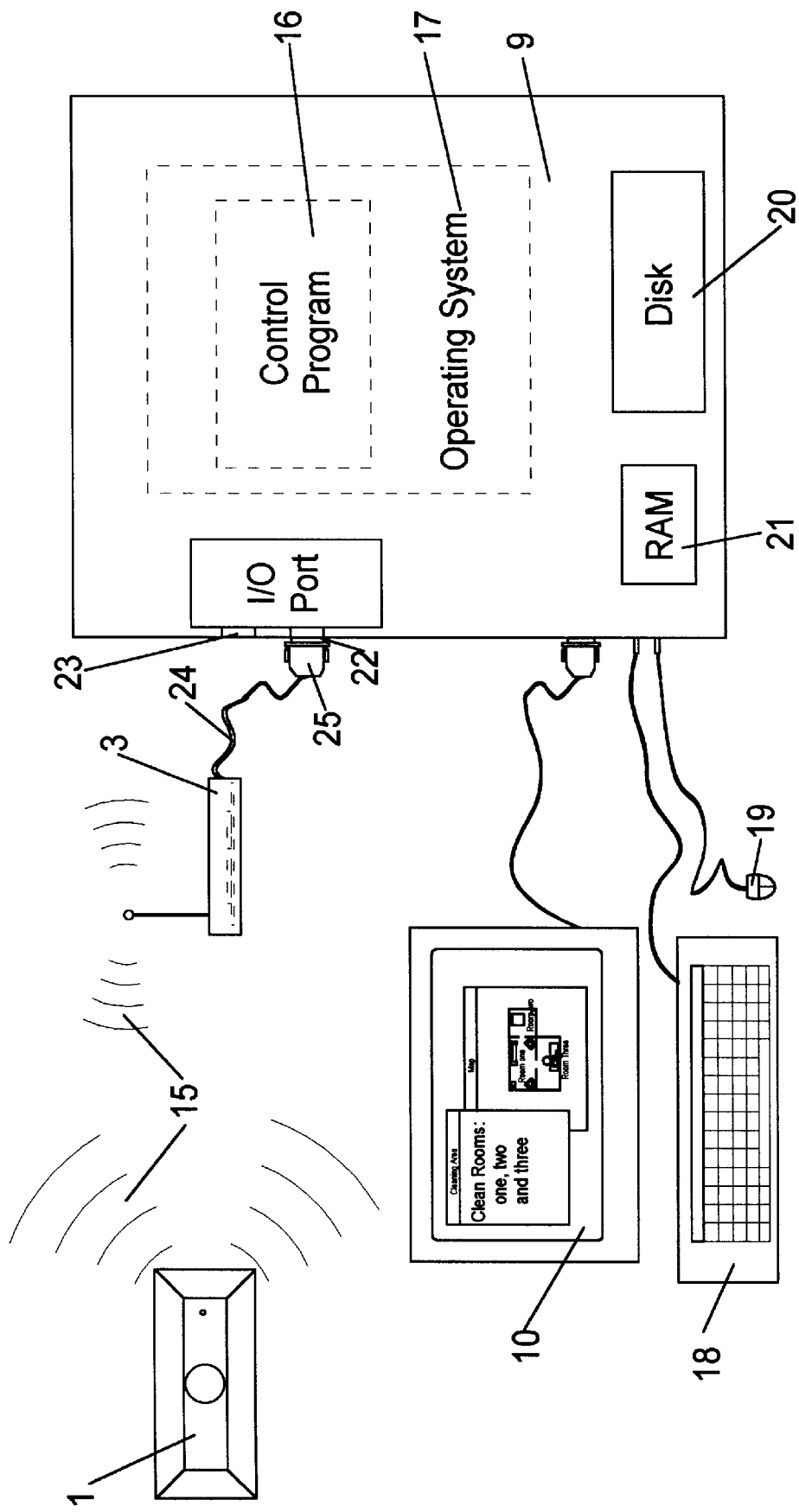
FIG. 3 shows a block diagram of robot system connection with host computer.

FIG. 3 shows a simplified block diagram of host computer 9 and its interconnections with the various components of the present invention. A control program 16 resides on host computer 9 and is executed from within an operating system 17. Control program 16 has access to all of the facilities of computer 9 through operating system 17, including display 10, a keyboard 18, a pointing device 19, a mass-storage device 20, a system memory 21, and peripheral connections 22 and 23. Host interface module 3 is attached via a cable 24 and a plug 25 to one of the standard peripheral connections (as discussed in detail below under the section heading "Host Interface Module"). Host interface module 3 allows control program 16 to gather data from, and issue commands to, remotely-located vehicle 1 via wireless signals 15.

The robot system of the preferred embodiment requires that host computer 9 be equipped with an Intel 80486- or better processor, at least four megabytes of RAM in system memory 21, at least twenty megabytes of available storage on hard-disk 20, and Microsoft Windows 95 (or equivalent) operating system software 17.

Host Interface Module

Figure 4:
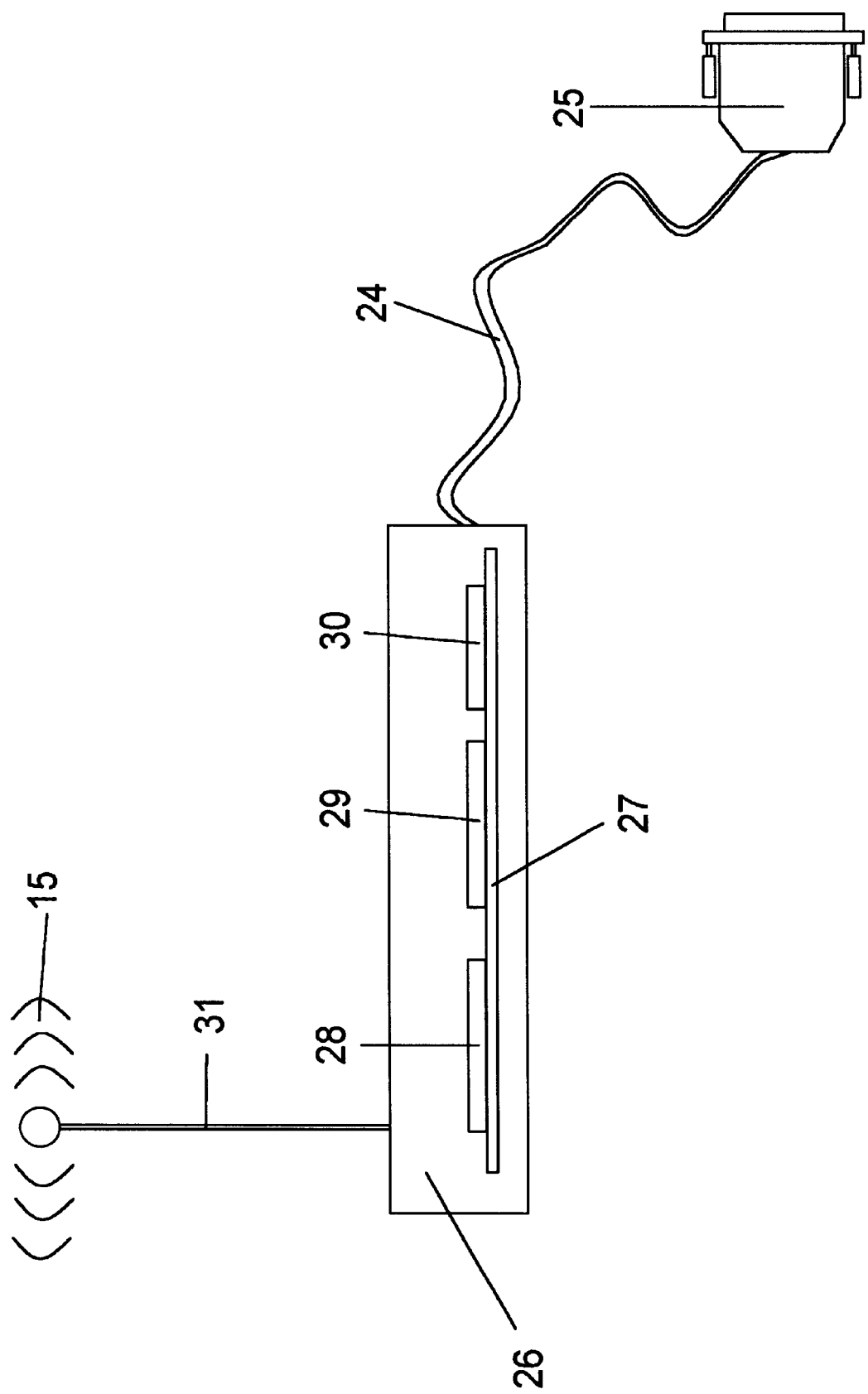
FIG. 4 shows the cutaway view of host interface module.

FIG. 4 shows the preferred construction of host interface module 3, including a plastic housing 26 containing a circuit board 27 with an attached controller chip 28, an attached RF communication chip 29, an attached buffer memory chip 30, an antenna 31, a cable 24 and a connector 25. Host interface module 3 allows control software 16 running on host computer 9 to gather data from, and issue commands to, mobile vehicle 1. Host interface module 3 is somewhat smaller in physical size than a conventional cordless telephone base station. In a typical application, host interface module 3 is placed near computer 9 (for example, on a desktop or under a desk). Cable 24 and connector 25 attach host interface module 3 to computer 9 via either a standard serial port or a parallel port. Controller chip 28 is a conventional microcontroller (for example, an Intel 8051, Microchip PIC16C58 or equivalent). Controller chip 28, its firmware, and accompanying circuitry on circuit board 27 implement the electrical and protocol-level interface with host computer 9. Firmware and circuitry to perform such functions is well known to persons of ordinary skill in the art. RF communications chip 29 (for example, model NCL354 available from National Semiconductor Corp. located in Santa Clara, Calif.) and antenna 31 implement a two-way wireless link with a corresponding system mounted in mobile vehicle 1.

Buffer memory chip 30 synchronizes data flow between host control program 16 and interface module processor 28. Because buffer memory 30 can temporarily store incoming data received from vehicle 1, the system can tolerate a momentary interruption of control program 16 without loss of data. Buffer memory 30, along with other system features described below, allows compatibility with standard PC operating systems (such as Windows 95). Because of these features, the present invention does not require a special real-time operating system, a serious limitation of many AGVs described in the prior art.

In an alternative embodiment, a single integrated circuit can implement both the RF communications circuitry and the microcontroller functions. An example of such an integrated communications and control chip (used in cordless telephone base stations and handsets) is model Am79C432 manufactured by the AMD corporation of Santa Clara, Calif.

A principal advantage of the present invention is its ability to connect to a host computer in a manner familiar to non-technical users. At the time of this application, simple user-installed computer peripheral devices typically connect via several standard interface ports. These include RS-232 serial data communications ports (also known as "Serial ports" or "COM ports"), DB-25 parallel data I/O ports (also known as "parallel ports," "printer ports," or "LPT ports"). Host interface module 3 allows the user the option of connecting to a host computer via either a parallel port or a COM port. However, rapidly changing and evolving standards in the personal computer industry have frequently required that peripheral system vendors adopt and support new interface standards. At the time of this application, several viable peripheral interface standards have either been accepted or are in the process of being accepted within the computer industry. Well-established interface standards include ISA-bus and EISA-bus (Industry Standard Architecture and Extended Industry Standard Architecture) cards, USB (Universal Serial Bus) ports, PCMCIA (Personal Computer Memory Interface Adapter) cards, SCSI (Small Computer Systems Interface) ports, PCI-bus (Personal Computer Interface) cards, and IRDA (Infrared Data Association) ports. Future versions of the present invention may include one or several of the above interface means, or even other standard interfaces not yet extant, depending on then-current market needs. The spirit of the present invention merely requires that the means for connecting host interface module 3 to host computer 9 be standard, well-accepted, and familiar to non-technical end-users. The examples given above, or any other particular interface choices, are meant to be illustrative but not limiting.

Charging Station

Figure 5:
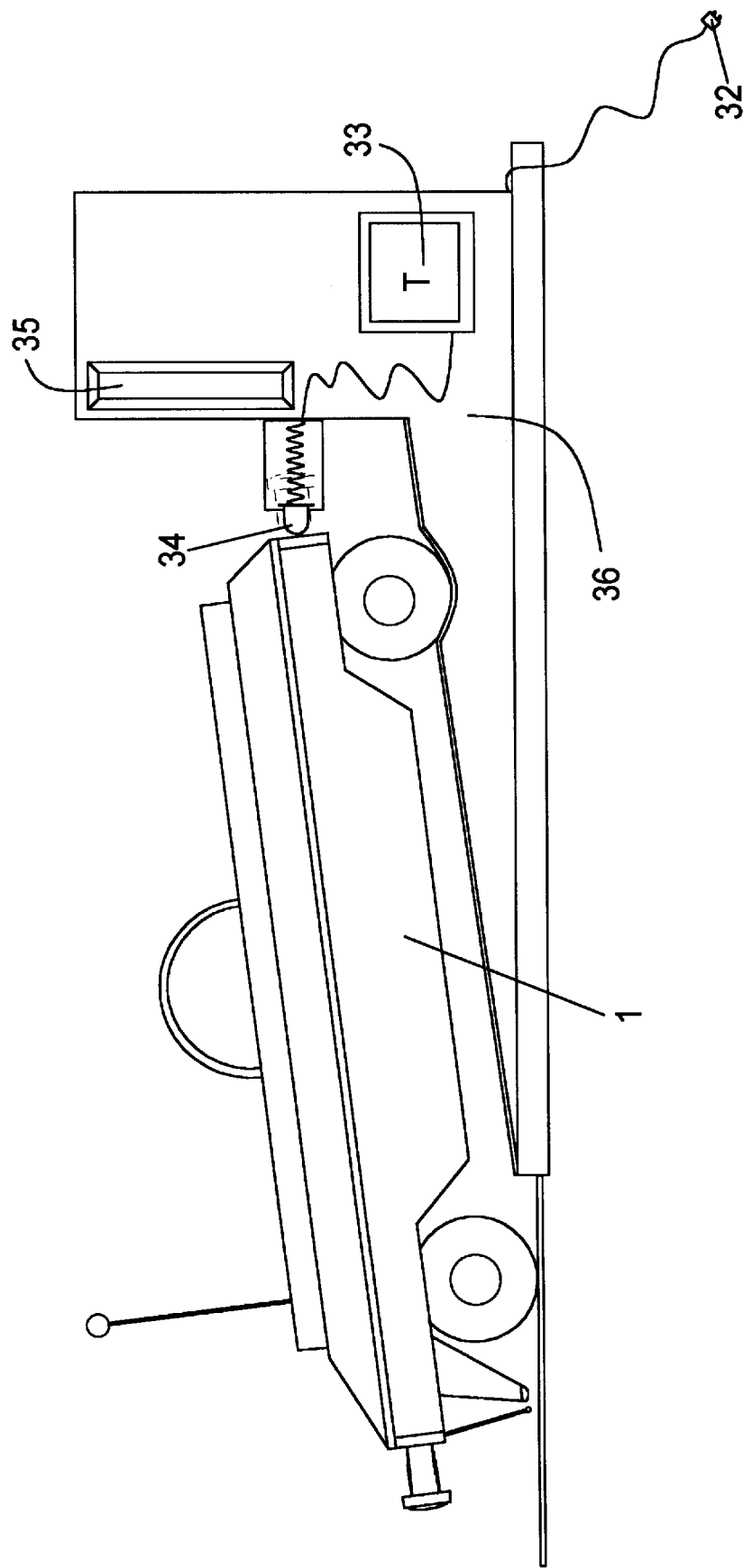
FIG. 5 shows the charging station with vehicle docked.

FIG. 5 shows a simplified diagram of charging station 2 with vehicle 1 in the docked position. Charging station 2 includes a power plug 32, a transformer and other circuitry 33 necessary to recharge batteries, contacts 34 for forming an electrical connection with vehicle 1 when docked, an arrangement of pre-attached reflective strips 35, and a housing 36. Housing 36 is made of, for example, injection-molded ABS plastic. Housing 36 forms a positive, mechanical docking between vehicle 1 and charging station 2 when vehicle 1 is correctly positioned. For illustrative purposes, FIG. 5 shows housing 36 formed with depressions which accommodate the wheels of vehicle 1. Charging station 2 performs two principal functions: recharging batteries in vehicle 1 and providing a fixed, recognizable navigational reference (as discussed below). In order to carry out its charging function, charging station 2 is equipped with contacts 34 for establishing an electrical connection with vehicle 1 when docked. Contacts 34 comprise two protruding spring-loaded, nickel-plated contact probes which touch corresponding exposed metal contacts on vehicle 1. Contacts 34 are equivalent to probes used in consumer cordless telephones to connect the handset to the telephone base station.

In an alternative embodiment, charging station 2 can perform its charging function via a magnetic induction system and corresponding induction coil, rectification circuitry, and charging system disposed inside vehicle 1. An example of such a system is taught by U.S. Pat. No. 5,109,566 to Kobayashi et al. This system does not require electrical contact between vehicle and charging station, but does necessitate the addition of a more costly induction coil in both.

Vehicle

Figure 6:
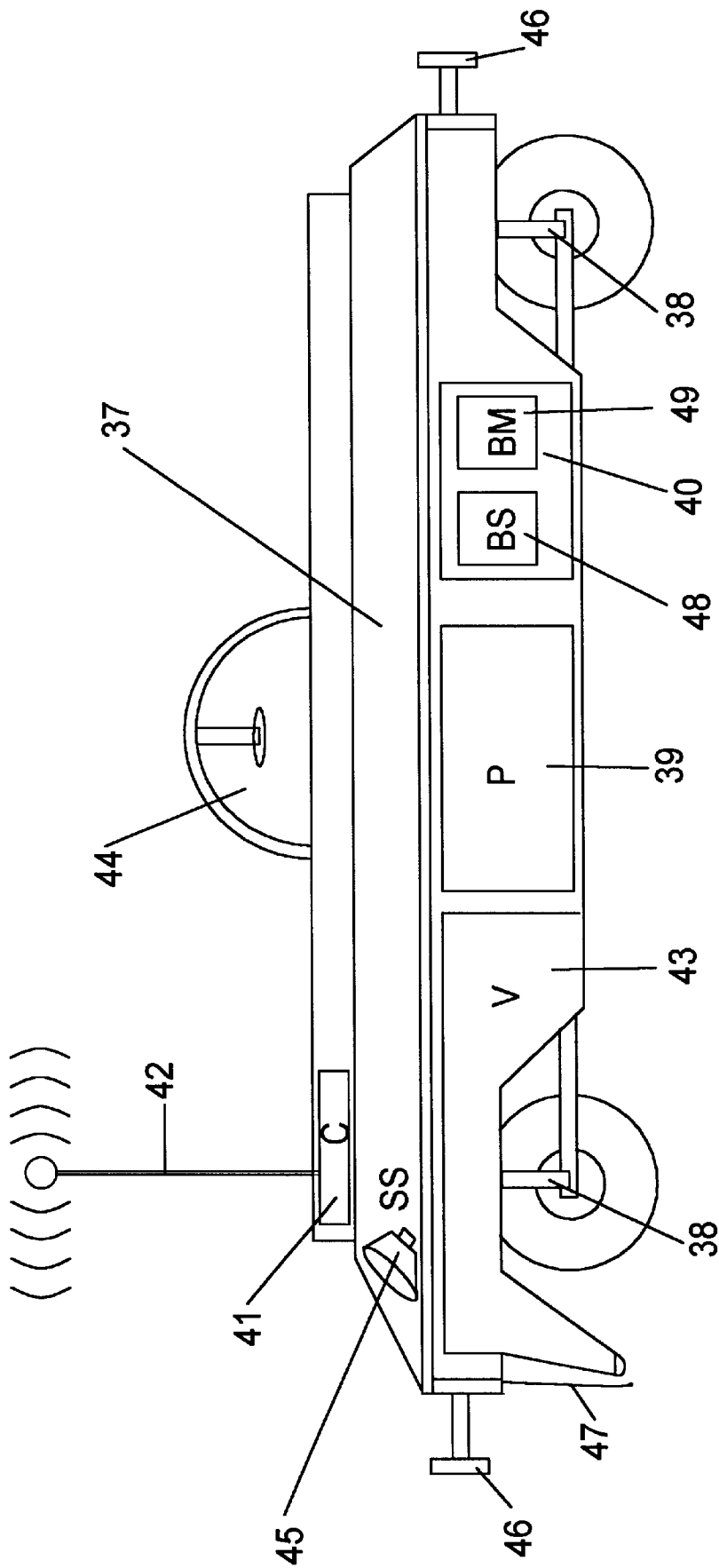
FIG. 6 shows a block diagram of onboard vehicle systems.

FIG. 6 shows the systems comprising mobile vehicle 1. These include a chassis 37, a suspension 38, a propulsion system 39 denoted by the letter P, a steering system (not shown), a battery subsystem 40, a communication and control system 41 denoted by the letter C, an antenna 42, a vacuuming system 43 denoted by the letter V, a navigational scanning system 44, a sound generation system 45 denoted by the letters SS, and a collision detection system with bumpers 46 and low-hanging whiskers 47. Battery system 40 comprises two separate battery units 48 and 49. Battery unit 48 denoted by the letters BS provides power for vacuum system 43, and battery system 49 denoted by the letters BM (main battery) provides power for all other vehicle systems as discussed below under the section heading "The Battery System."

The Suspension, Chassis. and Propulsion Systems

Figure 7:
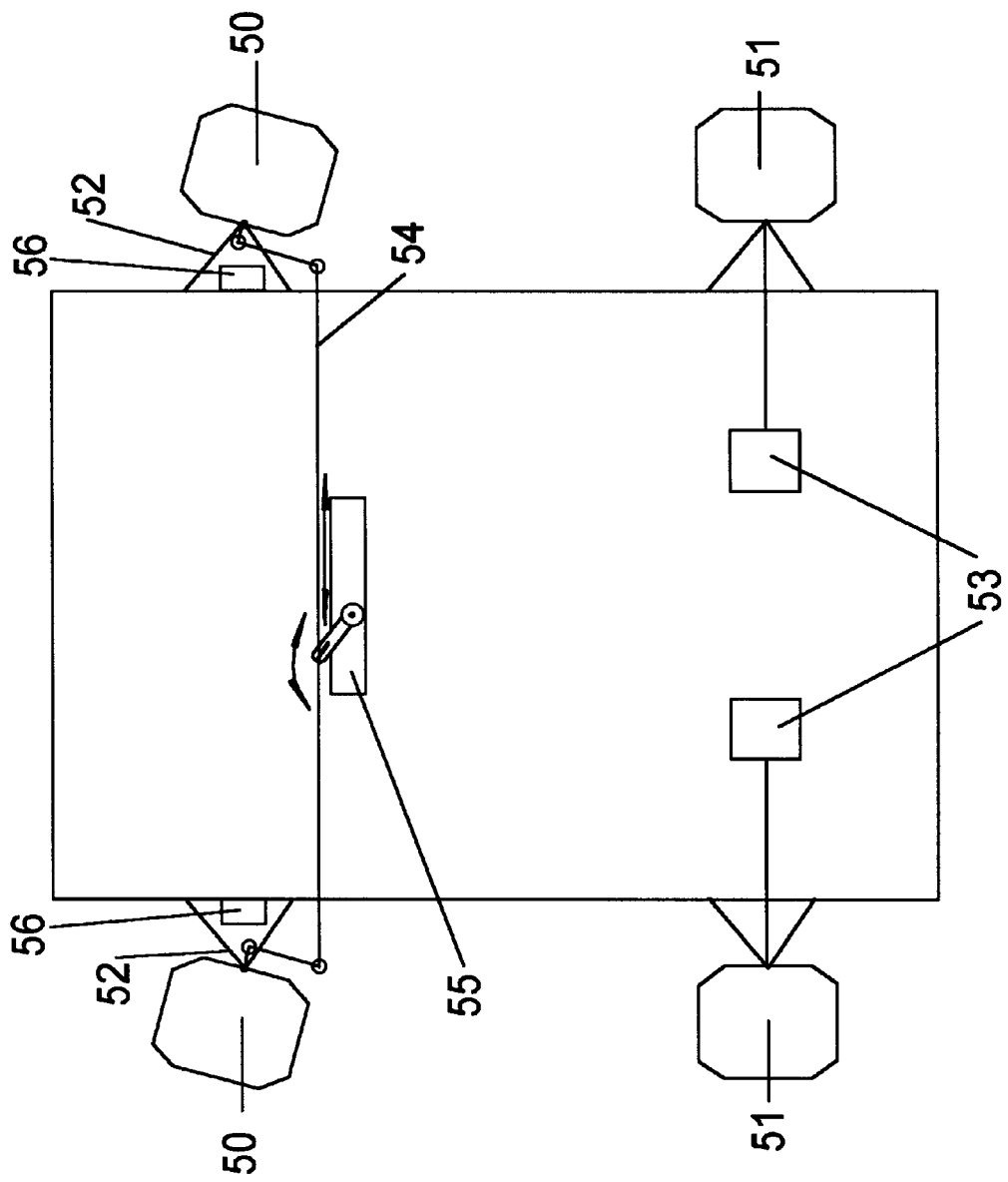
FIG. 7 shows a block diagram of chassis, drive, and steering systems.

FIG. 7 is a simplified block diagram showing the relationships between components of suspension system 38, propulsion system 39, and the steering system. All are similar to those widely used in inexpensive remote-control toy cars. Front wheels 50 and rear wheels 51 comprise hollow, semi-pneumatic tires with "knobs", or other well-known high-traction tread design, mounted on a plastic center attached to an axle. Each wheel (50 or 51) and axle is attached to chassis 37 by suspension members 52 and springs which provide for some degree of vertical travel (typically 3–10mm) as vehicle 1 rolls over uneven surfaces. Rear wheels 51 include separate drive mechanisms 53, each of which comprise a variable-speed DC motor and reduction gearing. Suitable motors and gearboxes are widely available, inexpensive, and well known to persons of ordinary skill in the art. In an alternative embodiment (not shown), there may be only a single motor unit connected to driving wheels 51 through a differential gearbox. In the preferred embodiment, front wheels 50 are not driven and are attached to a steering linkage 54 and steering control mechanism 55. Steering control mechanism 55 is an integrated servo-motor actuator of a type readily available for use in radio-controlled cars (for example, model S3003 manufactured by the Futaba corporation with US offices in Irvine Calif.). Attached to the axles of front wheels 50 are inexpensive rotation sensors 56, a detail of which is shown in FIG. 9 and discussed in detail below. The purpose of the suspension system is to carry vehicle 1 over uneven terrain that might typically be found in home or office environments, for example: door thresholds, edges of carpeting, and other surface irregularities not exceeding 2cm in vertical height.

Figure 8:
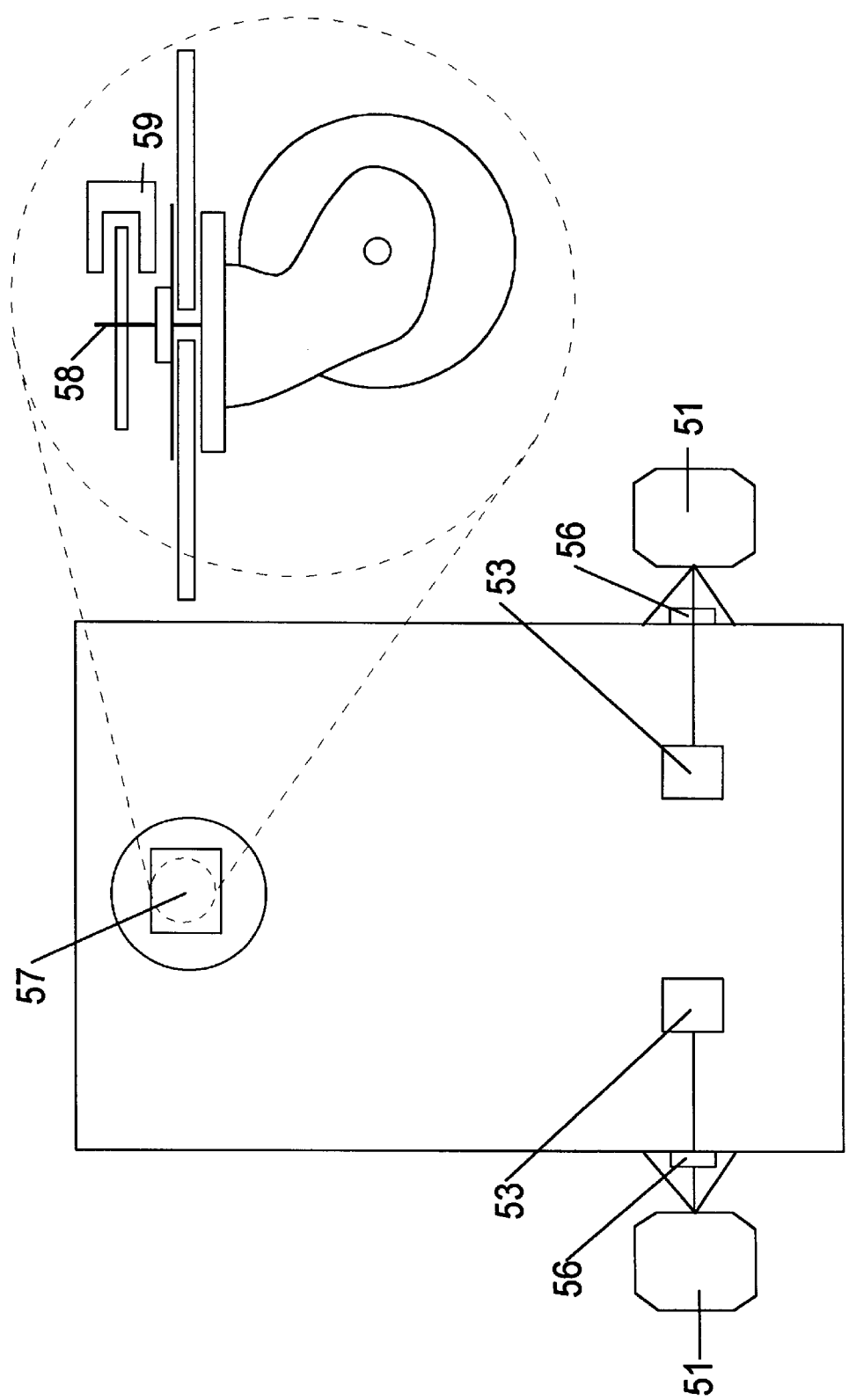
FIG. 8 shows a block diagram of alternative embodiment of chassis system.

FIG. 8 shows an alternative embodiment of suspension system 38 comprising two independently-diven rear wheels 51 equipped with rotation sensors 56, and a single pivoting caster wheel 57. FIG. 8 also shows detail of pivoting caster wheel 57. Steering is achieved by applying differential torque to the two driving wheels 51. The vertical axis 58 of the caster wheel 57 is fitted with a rotation sensor 59. Rotation sensor 59 provides data to vehicle control system 41 in order to form an instantaneous estimate of the effected steering angle. A variety of other alternative arrangements of drive wheels, driven wheels, steering mechanisms, rotation sensor placements, and suspension designs will readily suggest themselves to persons of ordinary skill in the art.

Figure 9B:
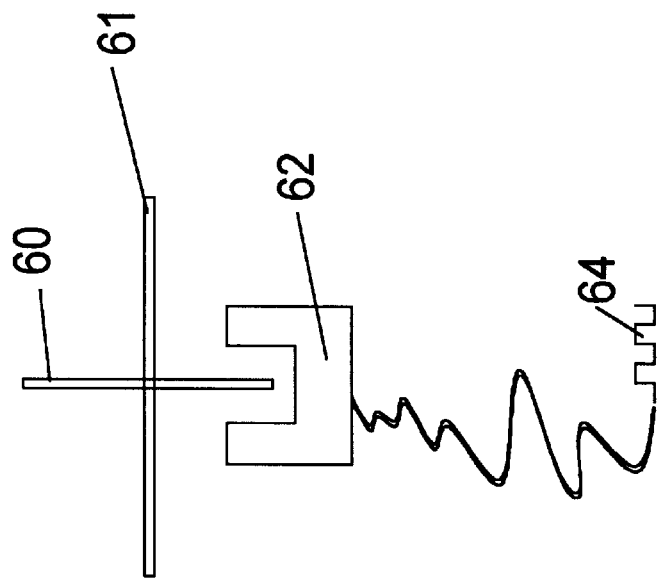
FIGS. 9A and 9B show the detail of an inexpensive shaft rotation sensor.
Figure 9A:
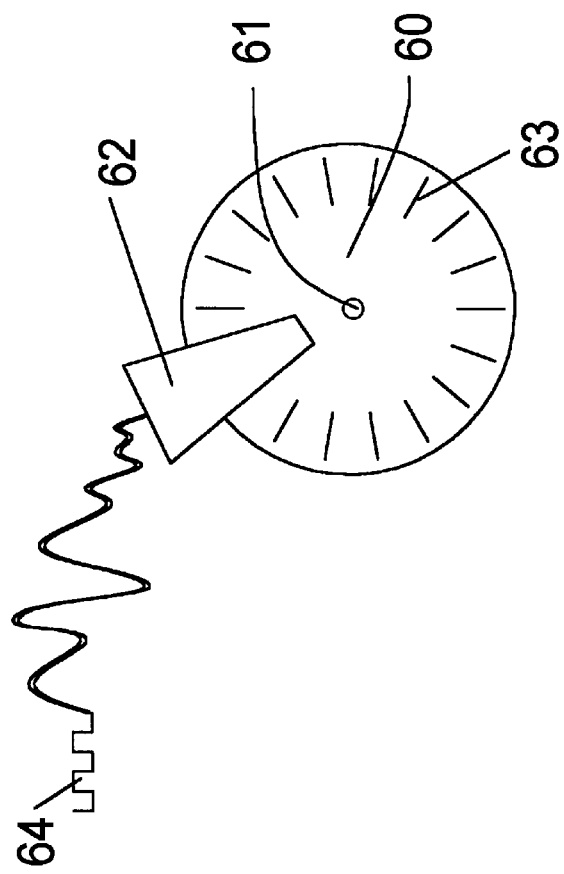

FIG. 9A and FIG. 9B show two views of an inexpensive rotation sensor comprising a thin, opaque plastic wheel 60 affixed to an axle 61, and an opto-interruptor unit 62. Wheel 60 is formed with integral radial slots 63 disposed at regular angular intervals. Opto-interruptor unit 62 is of a type well-known in the prior art, and is equipped with multiple detectors that produce a quadrature signal 64 as slotted wheel 60 rotates through an integrally-formed gap. Rotation sensors of this type are commonly used to detect motion in computer mice and trackballs; advantages include extremely low cost, simple and reliable operation, low power consumption, light weight, and compact size. Rotation sensors of this sort do not produce an produce an absolute reading of shaft encoder system often used in other AGV systems. Instead, they produce only a differential, or relative, indication of the net accumulated motion over a given interval. For the purposes of the preferred embodiment, a relative measure of wheel motion is sufficient.

The Battery System

Battery system 40 comprises two separate battery units, the first unit 48 providing electrical power for vacuum system 43, and the second unit 49 providing power for all other vehicle systems, including propulsion system 39 and control system 41. Both battery systems use conventional rechargeable chemical cells based, for example, on Nickel-Cadmium, Nickel-Metal-Hydride, or Lithium-Ion technology, of a type well-known to persons of ordinary skill in the art. In the preferred embodiment, vacuum battery unit 48 is capable of storing between 100,000 and 300,000 Joules of electrical energy, and the main battery unit 49 between 50,000 and 100,000 Joules. These energy stores are sufficient to operate vacuum system 43 for 20–30 minutes of operation, and all other vehicle systems for 90–180 minutes of normal use. The total weight of the battery system 40 is between 1 and 4 kilograms. The battery system 40 is positioned within the body of vehicle 1 so that its weight tends to improve wheel traction and positive contact between the vacuum system opening and the floor surface. Both battery units 48 and 49 are equipped with means for detecting the instantaneous level of charge. Alternatively, means for measuring battery charge may instead be incorporated within vehicle control system 41. Battery units of the required type are used widely in toys, portable telephones, portable computers, and other mobile devices. An example of an adequate battery unit is model P280C-9LT produced by Fedco Electronics, Inc. located in Fond du Lac, Wis.

The Vacuum System

FIG. 10 shows a simplified cross-section of vacuum system 43. Vacuum system 43 comprises an intake opening 65 located at the bottom front of vehicle 1 within 1–2cm of the floor, one or more flexible curtains or brushes 66 surrounding intake 65, a duct 67 leading from intake 65 to a fan motor housing 68, a dirt collection reservoir 69 lined with a trapping bag 70, an air filter 71, and an exhaust vent 72. Fan motor housing 68 contains a DC motor and a centrifugal fan of a type commonly found in a variety of conventional manually-operated vacuum-cleaning systems. As is common in such systems, an air stream is drawn by fan 68 in through intake opening 65, then forced out through exhaust vent 72 via dirt collection reservoir 69 and associated gas-permeable trapping bag 70. Vacuum cleaning systems of this type are well-known, and a variety of equivalent configurations will readily suggest themselves to persons of ordinary skill in the art.

In the preferred embodiment, intake opening 65 is located forward of front wheels 50 and spans the maximum practical extent of the lateral dimension of vehicle 1. This configuration facilitates cleaning in corners and against walls, though other equivalent configurations are possible.

FIG. 11 shows a simplified cross-section of an improved embodiment of vacuum cleaning system 43 which includes a rotating agitator brush 73 located directly beneath air intake 65, driven by the fan motor 68 via a belt 74 and a pulley 75. Vacuum systems equipped with belt-driven rotating agitator brushes are well-known in the prior art.

Applications Other Than Vacuuming

The system of the preferred embodiment is an AGV used to vacuum floors in a home or office environment. The particular task of vacuuming has been selected for reasons of broadest possible commercial application and relative ease of implementation. The distinguishing characteristics of the present invention are not, however, limited to the application of vacuum cleaning.

A relatively straightforward adaptation of the vacuum system described above would make the vehicle suitable for a damp-mopping function. A suitably modified vehicle 1 would include a rotating mop head and reservoirs for clean and dirty water, for example. In such a system, the charging station 2 would include additional facilities for connecting to the two fluid reservoirs in order to replenish and drain them, respectively. The system's ability to clean household environments could be further enhanced by the optional addition of, for example a movable rubber scoop that would allow vehicle 1 to collect objects left on the floor of a room and push them to a predetermined location (e.g. a corner). Vacuum system 43 described above is a placeholder for a generic "actuation means" mounted on vehicle 1 which allows the robot system to carry out some particular task autonomously in a home or office environment. By suitable selection of actuation means, the present invention could easily be adapted for such diverse functions as an office delivery system (with the inclusion of mail slots or other paper-handling equipment), a spreader for lawn fertilizer (with the inclusion of a fertilizer bin and spreading mechanism) or a security system (with the inclusion of motion or sound sensors). The application of the present invention to the task of vacuum cleaning is meant to be illustrative, but not limiting.

The Collision Detection System

In the preferred embodiment, the system's principal means for detecting objects and obstacles in the working environment is by colliding with them. This sensing modality is obviously not permissible in many applications for industrial robots (e.g. automated forklifts), but is indeed permissible for the task of vacuum cleaning, provided that vehicle 1 is surrounded by reasonable means for cushioning impact with objects. Walls, furniture, and other fixtures present in typical household or office environments are already subject to forceful collisions by manually-operated vacuum cleaners, and can be presumed to be designed accordingly. The principal advantage of sensing the working environment through collisions, as opposed to, for example, ultrasonic proximity detectors which have been widely used in the prior art, is that means for detecting collisions can be constructed from very inexpensive components. Nevertheless, an alternative embodiment of the present invention may include a plurality of ultrasonic proximity sensors that provide data in addition to the simple collision detectors of the preferred embodiment.

FIG. 12 shows one embodiment of an integrated bumper and collisiondtection system comprising a stiff, light bumper element 46 with attached rubber strip 76, a spring element 77, an electrical switch 78, and associated actuator 79. Bumnper element 46 is attached to the body of the vehicle 1 in such a way as to permit limited inward movement (between 5 and 10mm). For example, bumper 46 may include one or more integrally-molded spring-loaded telescoping shafts (as shown), although a variety of equivalent mounting schemes will readily suggest themselves to persons of ordinary skill in the art. The composition of rubber strip 76 and the stiffness of springs 77 are selected so that vehicle 1 will not damage typical household objects (e.g. corners of soft-wood furniture) in a collision at operating speed (typically less than 0.3 meter per sec). A plurality of bumper elements 46 are disposed around the perimeter of vehicle 1's body. Bumpers 46 are placed so that their bottom edges rest at a height between 1 and 3 cm from the floor surface when vehicle 1 sits on its suspension 38. The vertical dimension of bumper element 46 is typically between 1 and 3 cm.

The system detects collisions by means of one or more electromechanical switches 78 mounted behind each bumper element 46. So-called "microswitches" suitable for this application are widely available for low cost, and are well know to persons of ordinary skill in the art. Signals from switches 78 are presented to vehicle control system 41. Bumper element 46, switch 78, spring 77, and associated mounting hardware should be arranged so that very slight pressure (5–10 grams) applied to bumper 46 actuates switch 78. This can be accomplished by selecting a very weak mounting spring 77, but such weak springs may yield unsatisfactory collision protection. In the preferred embodiment, bumper 46 is mounted such that it actuates switch 78 within the first millimeter (approximately) of travel, but does not contact the main mounting spring 77 until after switch 78 has been actuated. This arrangement satisfies the simultaneous need for sensitive collision detection and effective collision protection.

FIG. 13 shows a schematic plan view (not to scale) for an arrangement of four bumper elements 46 and eight switches 78 around the perimeter of vehicle 1. In a collision, one or more switches 78 will be actuated depending upon the point of collision and direction of travel of vehicle 1. The vehicle control system 41 relays signals from all switches 78 to control program 16 on host computer 9, which can interpret and record these signals as appropriate. FIG. 13 shows but one logical arrangement of bumpers 46 and switches 78, but other equivalent arrangements will readily suggest themselves to persons of ordinary skill in the art.

Bumper elements 46 and switches 78 shown in FIGS. 12 and 13 are suitable for detecting collisions with objects in the environment tall enough to come into contact with bumpers 46 (i.e. taller than 1–3cm). This mechanism allows for detection of most large, immobile objects in the operating environment including walls, posts, furniture, trash cans, stacks of books, etc. The height of bumper elements 46 is selected so that suspension 38 is capable of rolling over any object which would pass undetected beneath the lower edge of bumper 46.

Even though vehicle 1 is designed so that it can traverse obstacles which are too short to be detected by bumpers 46, it is often desirable to prevent low-height obstacles such as toys, clothing, or electrical cords from passing beneath vehicle 1. In particular, such objects may tend to obstruct vacuum cleaning system 43. In order to detect and avoid low objects, the forward edge of vehicle 1 is equipped with a plurality of low-hanging whiskers 47.

FIG. 14 shows a cross-section detail of the forward portion of vehicle 1 showing bumper element 46 and a whisker element 47 which hangs below the front edge of vehicle 1, attached via a free-moving hinge 80. An inexpensive rotation sensor 81 (of the type shown previously in FIG. 9) attached to the axle of hinge 80 measures the relative deflection of whisker 47. Whisker element 47 is a thin, semi-stiff bristle formed from a durable polymer material such as DuPont Nylon typically less than 0.2mm in diameter. In the preferred embodiment, a plurality of whiskers 47, spaced at intervals of no more than 2cm, are attached to common hinge 80 which spans the width of vehicle 1. Any object which might pass below the lower edge of bumper assembly 46 will encounter one or more whiskers 47 before it passes under vacuum intake 65 or front wheels 50. The obstacle will deflect whisker 47, and rotation sensor 81 attached to common hinge 80 will register the deflection. The whisker deflection signal is presented to vehicle control system 41, and thence relayed to control program 16 on host computer 9 for analysis, processing, and storage as necessary. In an alternative embodiment, rotation sensor 81 on hinge 80 can be replaced with a simple microswitch and accompanying actuator linkage that registers deflection of whiskers 47 beyond a predefined angle.

In another alternative embodiment, the plurality of individual whisker fibers 47 can be replaced by a loose mesh (1 thread/cm or less) made from fibers of comparable stiffness and composition. The mesh is connected to the same single free-moving hinge 80. This embodiment will tend to detect narrow objects which might be missed by a plurality of individual whiskers 47.

Bumpers 46 and whiskers 47 detect obstacles which rise vertically from the floor. It is necessary, however, to detect overhanging obstacles such as shelves which are too high to contact bumpers 46, yet low enough to collide with the topmost part of vehicle 1.

Figure 15:
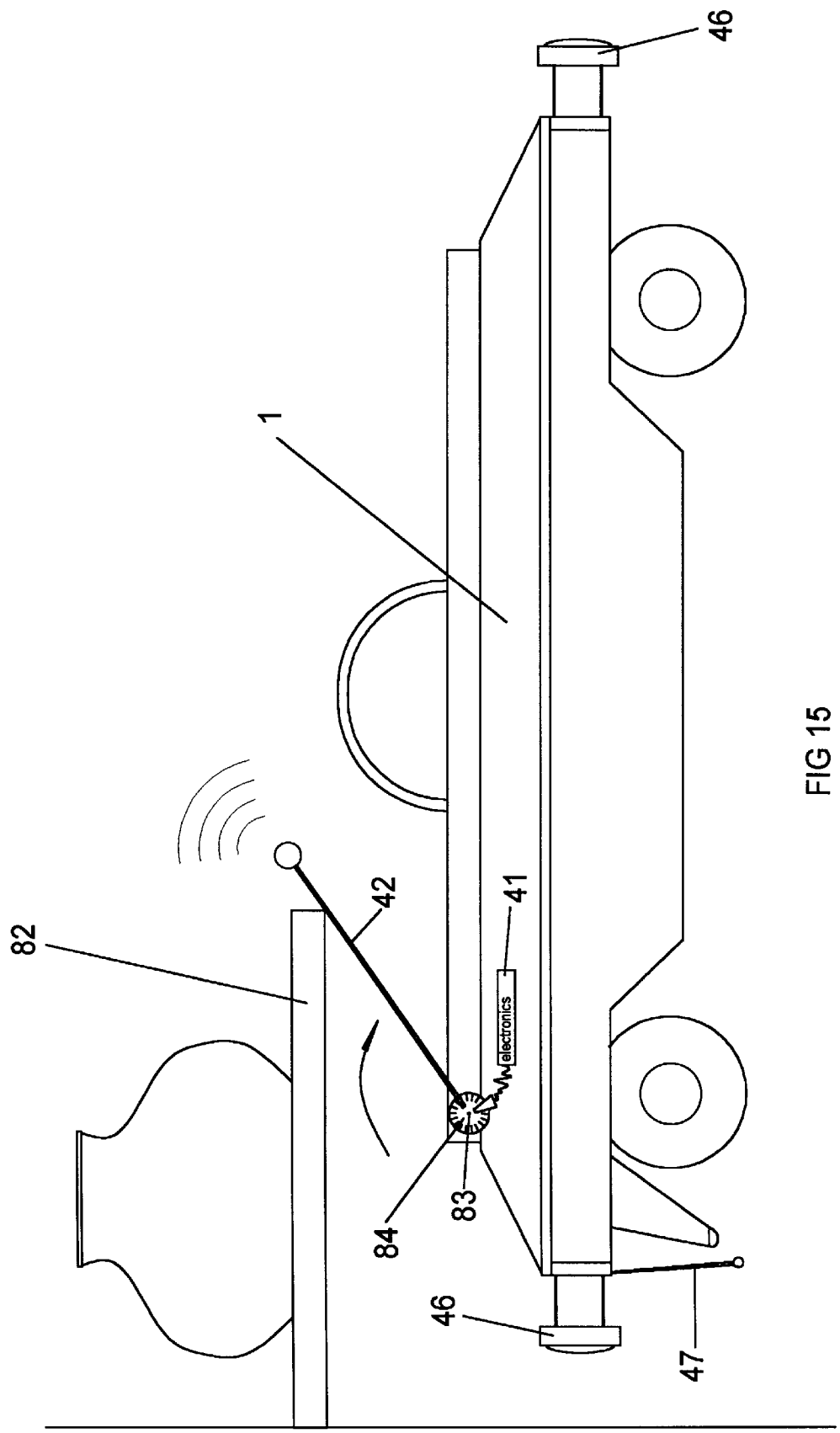
FIG. 15 shows a side view of vehicle encountering overhanging obstacle.

FIG. 15 shows vehicle 1 encountering an overhanging obstacle 82. Notice that neither bumpers 46 nor whiskers 47 will register the presence of obstacle 82. In the preferred embodiment, vehicle 1 is constructed so that its highest point is the tip of its antenna 42. In general, this is the most natural configuration for vehicle 1. It is further constructed so that antenna 42 is located near the front of vehicle 1.

Antenna 42 is mounted on a hinge 83 which permits deflection along the direction of movement of vehicle 1. Antenna 42 is held upright by a light spring force. An inexpensive rotation sensor 84 (of the type shown previously in FIG. 9) is attached to the axle of hinge 83 and produces a relative deflection signal when antenna 42 is displaced by contact with any overhanging obstacle 82. Deflection signals from rotation sensor 84 are presented to vehicle control system 41 which relays them to control program 16 on host computer 9 for appropriate analysis, processing, and storage. Obstacles higher than the tip of antenna 42 will not be detected, but are of no consequence to the operation of the system and can safely be ignored.

The Navigational Scanner

Purpose

Control program 16 running on host computer 9 is responsible for processing data gathered from sensors on vehicle 1 and creating from the data an estimated location of vehicle 1 in the working environment. Methods by which control program 16 computes this estimated location are presented below, under the section heading "Position Determination." In order to understand the purpose for navigational scanner 44, it is important to first note that one method by which the control program 16 estimates the vehicle location is "dead reckoning," also known as odometry. This technique is well-known in the prior art, and is accomplished by keeping track of the distance traveled by each of the front wheels 50 as recorded by their associated rotation sensors 56 in conjunction with the commanded steering angle as vehicle 1 moves about. Wheel-rotation and steering-angle data is processed by control program 16 according to well known methods to yield an approximate instantaneous estimate of vehicle location and orientation. The principal limitation of odometry is accumulated error, particularly in the orientation estimate, that can ultimately lead to disastrously incorrect position estimates if not regularly corrected by some secondary navigational means. The purpose of navigational scanner 44 is to provide a secondary means of position estimation that is sufficient to correct accumulated errors in the odometry calculations, and in particular to correct errors in the estimated vehicle orientation.

Several systems in the prior art, including U.S. Pat. No. 5,111,401 to Everett, Jr., et al; and U.S. Pat. No. 4,847,769 to Reeve, teach methods for correcting accumulated errors in odometry estimates by integrating data from a secondary navigational reference source. Navigational scanner 44 uses a rotating scanning beam in combination with a plurality of anonymous retroreflective reference markers 4 to provide a secondary navigational reference. This system's basic operating principles are similar to those of a related navigation system taught by U.S. Pat. No. 4,811,228 to Hyyppa. The current invention uses a hardware apparatus improved over that described by Hyyppa combined with more sophisticated processing and mapping techniques, discussed in detail below.

Components of the Navigational Scanning System

Vehicle 1 is equipped with navigational scanner 44 located atop its body as shown in FIG. 6. Navigational scanner 44 detects retroreflective reference markers 4 disposed at several arbitrary locations on substantially vertical surfaces (especially walls) around the working environment. Scanner 44 presents detection signals to vehicle software 16 on 41 which pre-process these signals, then relays them to control software 16 on host computer 9.

Figure 16:
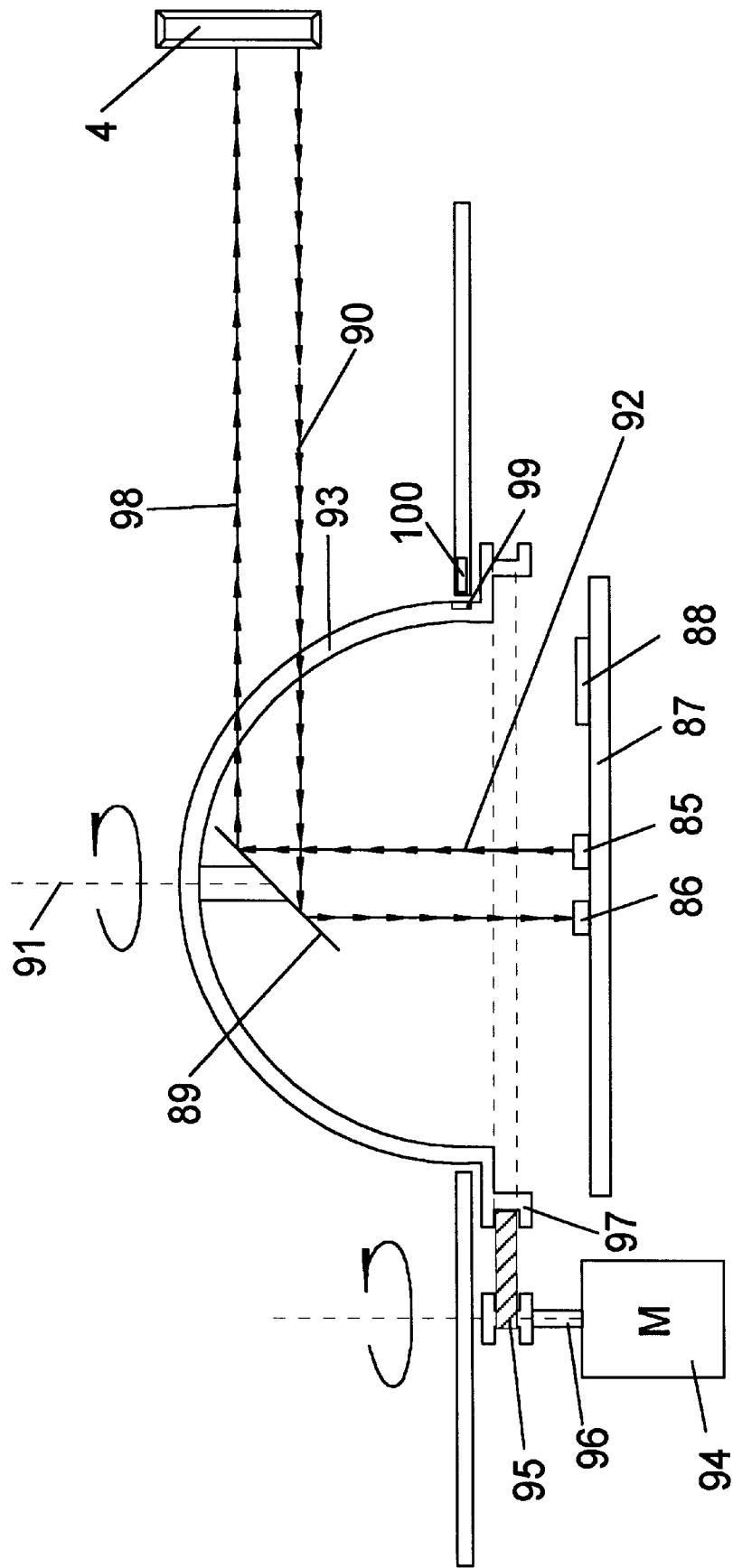
FIG. 16 shows a cross sectional side view of navigational scanner.

FIG. 16 shows a simplified cross-section of navigational scanner 44, including a photoemitter 85 and a photodetector 86 mounted on a circuit board 87 with associated power supply, control, and signal processing electronics 88. Circuit board 87 is mounted beneath a mirror 89 affixed to the mounting 93 which rotates about a vertical axis 91, the mirror 89 being mounted at an angle of 45 degrees relative to axis 91. Photoemitter 85 is mounted so that its projected beam 92 is parallel to axis 91. Photodetector 86 is also mounted so that its direction of maximum sensitivity is parallel to axis 91. Both photoemitter 85 and photodetector 86 are located on circuit board 87 as close as practical to axis 91. Mirror 89 is affixed to rotating mounting 93, which is spun at a substantially constant rate (for example, 600–1200 RPM) by an electric motor assembly 94. The example shown in FIG. 16 uses a simple belt 95 and pulley 96 arrangement to drive a flanged wheel 97 formed integrally with the base of rotating mirror mount 93, though various alternative equivalent rotation means will readily suggest themselves to persons of ordinary skill in the art. The example mirror mounting is shown as rotating dome 93 which is transparent to the wavelength of light projected by photoemitter 85, though many other equivalent configurations are possible.

As rotating mounting 93 spins, an incident beam 92 is reflected by spinning mirror 89. The reflected beam 98 will sweep through 360° in the horizontal plane as mirror 89 spins. As scanning beam 98 sweeps a path through the working environment, some of the projected light will be reflected back towards vehicle 1, shown in FIG. 16 as a reflected beam 90. Coaxial photodetector 86 will produce a signal proportional to the intensity of reflected beam 90. This signal will vary with the reflectivity, distance, and angle of the objects beam 98 strikes in its scan. If beam 98 strikes a retroreflective marker 4, a very large portion of the projected beam 98 will be reflected back, producing a large signal in photodetector 86. Rotating mirror mount 93 is equipped with a reference mark 99 (for example, a protruding tab or reflective stripe). Each rotation of mirror mount 93 carries reference mark 99 past a corresponding detector 100 which can be implemented by (for example) an integrated opto-interruptor unit. Whenever reference mark 99 passes through detector 100, mirror mounting 93 (and hence scanning beam 98) are at a known orientation. Signals corresponding to the detection of reference mark 99 are presented to vehicle control system 41 (and thence to control program 16 on host computer 9). These signals provide a time reference which allows control program 16 to determine the instantaneous angle of scanning beam 98 relative to the body of vehicle 1.

An alternate embodiment which serves the same purpose as reference mark 99 and detector 100 is the placement of a special reflector on the vehicle's antenna 42. Each sweep of scanning beam 98 will record a return from this special reflector at the same angle. The resulting regular return signal can be used by control program 16 as a synchronizing reference.

Photoemitter 85 and photodetector 86 used in the preferred embodiment consists of an infrared semiconductor laser and matched photodiode of a type used widely in consumer-electronics items such as CD (Compact Disk) players and CD-ROM drives (for example, model SLD104AU from Sony Semiconductor Corporation of America in San Jose, Calif.).

Operation of the Navigational Scanning System

Figure 17:
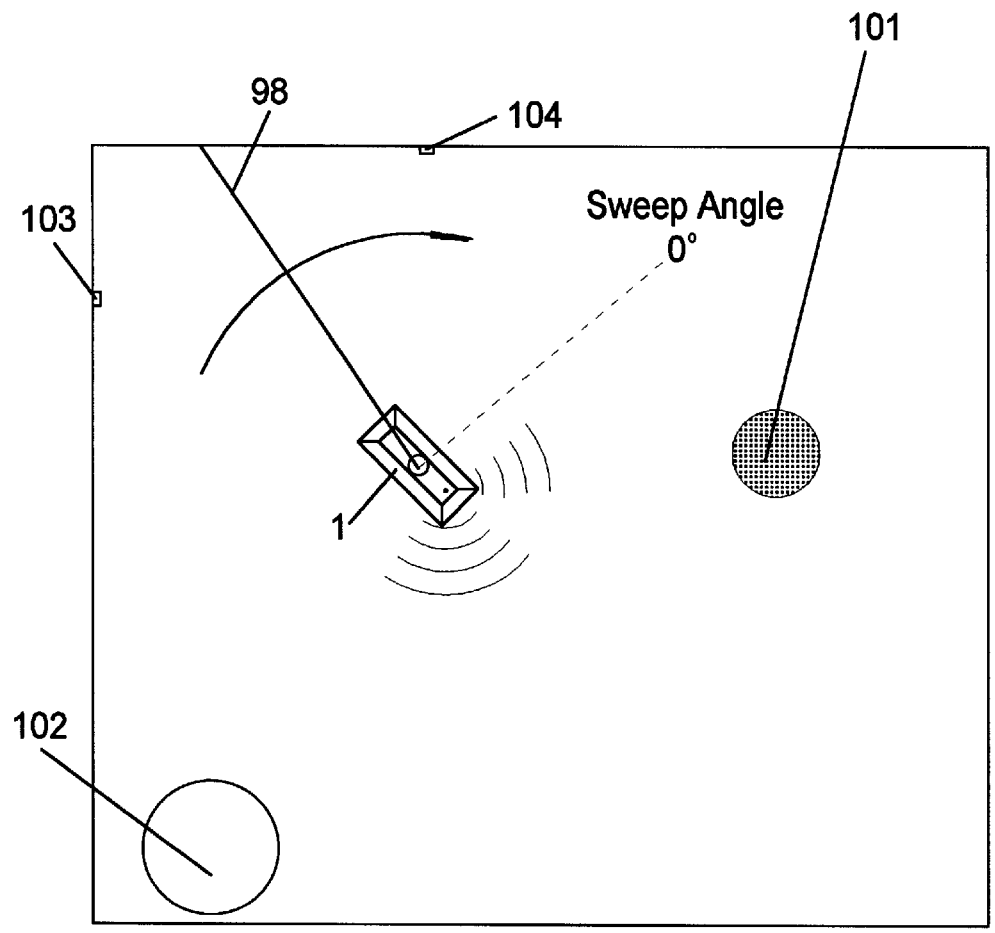
FIG. 17 shows a plan view of vehicle in room showing operation of navigational scanner.

FIG. 17 shows a plan view of vehicle 1 operating in a simplified working environment: a rectangular room with two round obstacles 101 and 102 and two retroreflective reference markers 103 and 104 affixed to the north and west wall in the plane of rotation of scanning beam 98. Reference reflectors 103 and 104 are made of retroreflective material (for example, Scotchlite™ tape manufactured by the 3M Corporation located in St. Paul, Minn.). In the preferred embodiment, reflectors 103 and 104 are adhesive-backed strips of material 1–2 cm wide and 15–25cm long. Reflectors 103 and 104 are mounted so that their long dimension is vertical (perpendicular to the scanning direction of beam 98), and they are roughly centered vertically in the beam's plane of rotation. The method by which the user places reference markers in the working environment is described in detail below under the section heading "System Installation and Setup."

Figure 18:
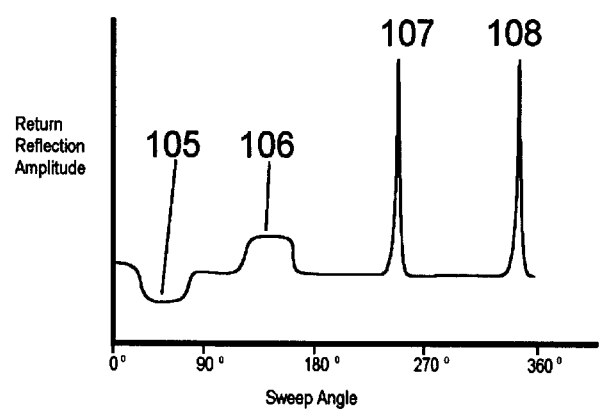
FIG. 18 shows an example X-Y plot of scanner detection amplitude vs. time.

FIG. 18 shows an example of the time-varying signal amplitude that might be recorded from photodetector 86 as scanning beam 98 sweeps through its 360° arc. The angle indicated on the X-axis of the graph in FIG. 18 is measured from a 0° reference derived from a synchronization method as described above. Beam 98 will, in sequence, encounter obstacle 101, then obstacle 102, then reference reflector 103, and finally reference reflector 104. In the example return signal shown in FIG. 18, the two obstacles 101 and 102 correspond to two perturbations 105 and 106 in the detected return amplitude, either positive or negative, depending on the reflectivity of the obstacle. The two reference reflectors 103 and 104 correspond to two distinctive "spikes" 107 and 108 in the return amplitude. The time-varying signal from photodetector 86 is presented to vehicle control system 41, which will pre-process and digitize the signal. Pre-processing might include such methods as automatic gain control (AGC), averaging, derivative enhancement, and other signal-processing techniques well-known to persons of ordinary skill in the art. This digitized signal is transmitted to host control program 16 for further processing.

The bearing angles to the two reference reflectors 103 and 104 (relative to the vehicle body) can be readily determined from the detection signal shown in FIG. 18 by simple means such as, for example, a fixed-threshold detection algorithm. More sophisticated signal-processing algorithms suitable for extracting large-amplitude, short-duration pulses from noisy signals are well-known in the prior art. More complicated photodetector hardware systems known in the prior art may also be used to produce superior results. U.S. Pat. No. 4,811,228 to Hyyppa teaches a method for using two photodetectors to derive a more reliable differential measure of reflected beam intensity. Any such scanning system which is capable of detecting, and measuring the bearing angle to, a retroreflective reference marker is suitable for use in the present invention.

The end product of the navigational scanner 44 is a set of estimated bearing angles ($\theta$) to any and all reference reflectors currently within line-of-sight of scanning beam 98. These angles are used by host control program 16 to assist in estimating the position and orientation of vehicle 1, and to assist in the generation and maintenance of a map of the working environment according to methods described in detail below.

Figure 19:
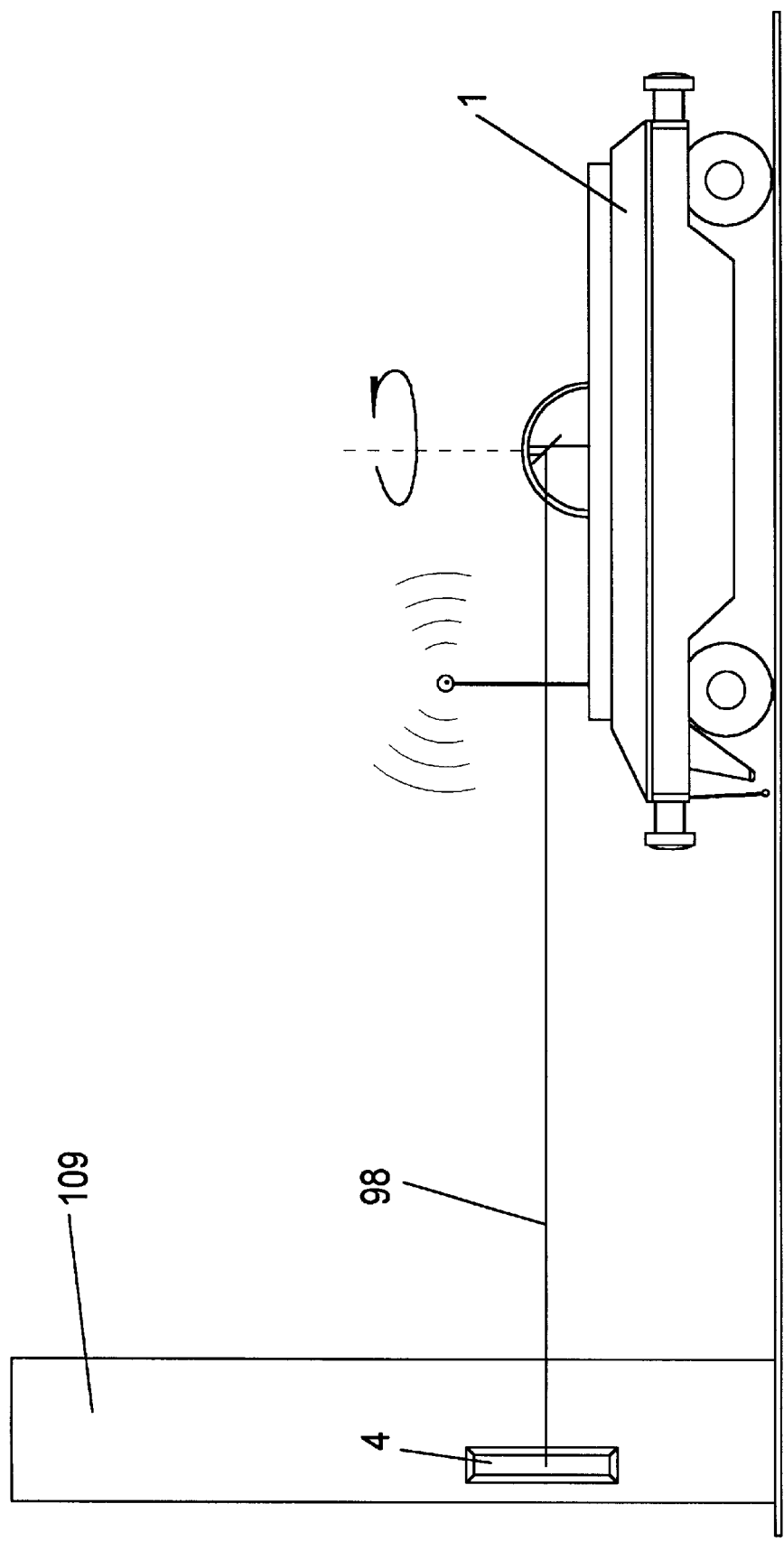
FIG. 19 shows a side view of vehicle and reflector showing navigational scanner operation.

FIG. 19 shows a simplified side view of vehicle 1 with navigational scanner 44 atop. Scanning beam 98 is shown sweeping across reference reflector 4 mounted to a wall 109. This view shows the appropriate vertical relationship between vehicle 1 and reflector 4.

An Improved Navigational Scanning System

Figure 20:
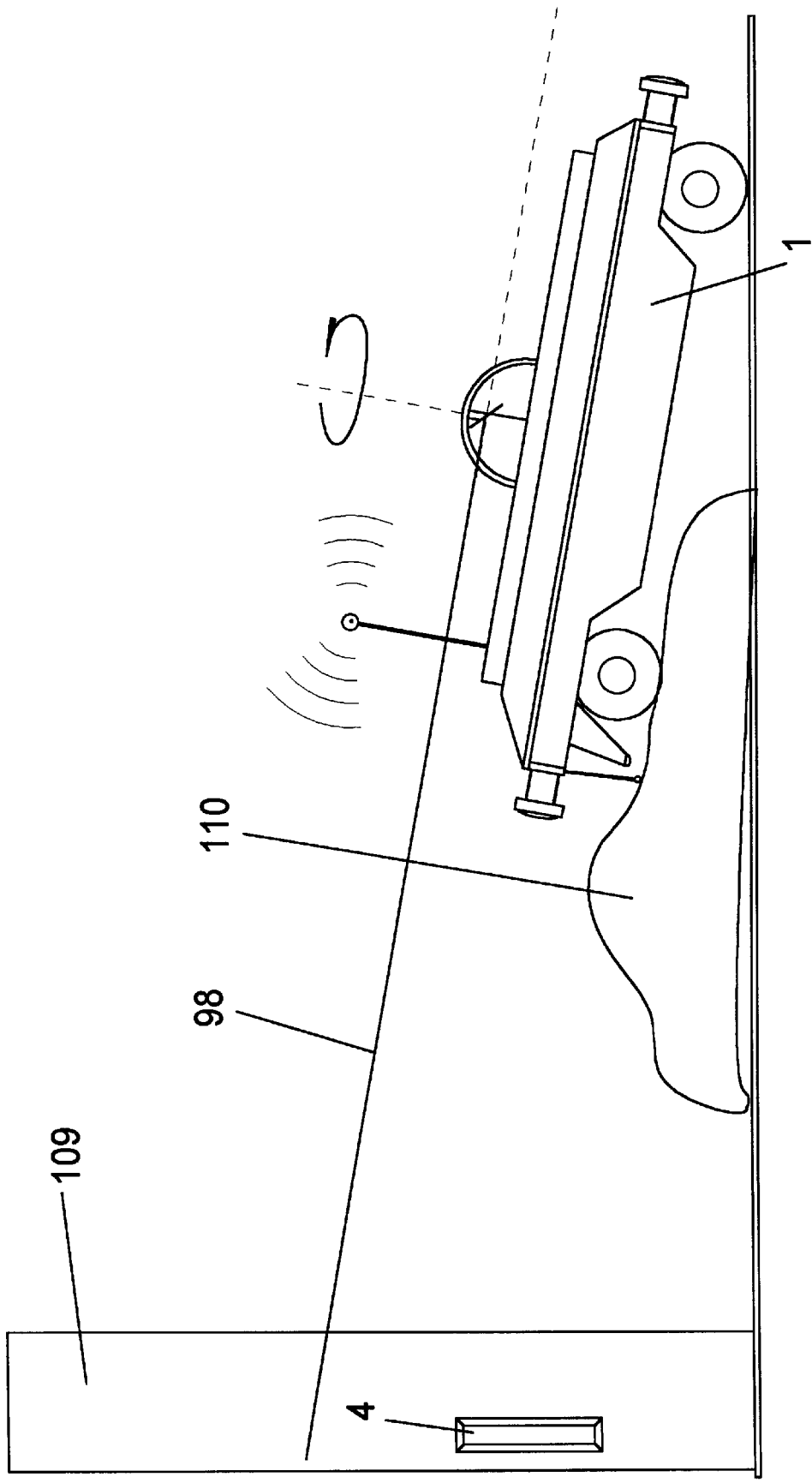
FIG. 20 shows a side view of vehicle on uneven surface showing failure of navigational scanner.

A principal limitation of the navigational scanner shown in FIG. 16 is the requirement that reference reflectors 4 be placed in the plane of scanning beam 98. As vehicle 1 traverses uneven surfaces, its body may not lie in an exactly horizontal plane. Consequently, scanning beam 98 will tend to tilt as vehicle 1 moves across the floor. FIG. 20 shows how the plane of scanning beam 98 can be perturbed away from horizontal if vehicle 1 encounters an uneven surface 110. In the example shown, the perturbation is large enough that scanning beam 1 no longer strikes reference reflector 4. If, for example, the distance between vehicle 1 and reflector 4 is 6 meters, and reflector 4 is 15cm in vertical height centered on the nominal plane of scanning beam 98, then a tilt of only 1.4° is sufficient to cause scanning beam 98 to "slide off" reflector 4, rendering reflector 4 momentarily invisible to scanner 44.

The problem of the tilting scanning beam can be mitigated by using larger, taller reference reflectors, but this solution has obvious drawbacks in household applications in which the system must cause minimal disruption to home decor. Alternatively, rotating mirror assembly 93 can include optics that spread beam 98 into a vertical "fan."

The system of the preferred embodiment includes a novel scanning scheme which overcomes the tilting problem. FIG. 21 shows a simplified cross-section of an improved navigational scanner. Primary scanning mirror 89 mounted at 45° and associated rotating mounting 93 are substantially similar to those shown previously in FIG. 16. As before, primary scanning mirror 89 and mounting 93 are spun at a substantially constant rate, by (for example) motor 94 and belt 95. In the improved system of FIG. 21, photoemitter 85 is not located directly below primary scanning mirror 89. Instead, photoemitter 85, photodetector 86, and associated circuitry 88 are mounted some small distance (for example 2–10) from axis of rotation 91. Beam 92 is projected onto primary mirror 89 from below by a secondary mirror 111 which is located directly beneath primary mirror 89. Secondary mirror 111 is positioned such that reflected beam 92 strikes primary mirror 89 at an angle deliberately offset by a small amount (between 5 and 20 degrees of arc) relative to axis of rotation 91.

For example, FIG. 21 shows photoemitter 85 and photodetector 86 and associated circuitry 88 mounted away from rotating mounting 93 such that beam 112 is projected horizontally. Secondary mirror 111 is placed directly beneath primary mirror 89. If secondary mirror 111 were mounted at a 45° angle relative to incident horizontal beam 112, then reflected beam 92 would strike primary scanning mirror 89 in an exactly vertical direction parallel to its axis of rotation 91. In such a case, scanning beam 98 would rotate in a horizontal plane, just like the beam of the device shown in FIG. 16. But in the improved scanner of FIG. 21, secondary mirror 111 is not mounted at a 45° angle. Instead, it is slightly tilted. Thus, beam 92 strikes primary mirror 89 along an axis tilted relative to axis of rotation 91. For example, if secondary mirror 111 is mounted at a 40° angle relative to incident beam 112, then the angle between reflected beam 92 and the axis of rotation 91 will be 10°. Since reflected beam 92 is offset from vertical when string primary mirror 89, the projected rotating scanning beam 98 projected into the working environment is offset from the horizontal plane by an equal amount. In the example cited above, the plane of rotation of scanning beam 98 will be tilted at a 10° angle relative to the horizontal plane.

In the improved navigational scanner, the angle of secondary mirror 111 is slowly and continuously changed, thereby causing the plane of scanning beam 98 to slowly and continuously sweep up and down. FIG. 21 shows secondary mirror 111 mounted on a shaft 113 of a reduction gearbox 114 driven by a motor 115. Motor 115 and gearbox 114 are selected so that the rate of rotation of shaft 113 is much slower than the rate of rotation of scanning beam 98 (for example, a shaft rate of 60 RPM vs. a scanning rate of 600 RPM). In the example of FIG. 21, shaft 113 is mounted so that it rotates about an axis 116 angled at 45° relative to incident beam 112. Secondary mirror 111 is affixed to the end of shaft 113 at a slight angle (5°, according to the example cited above). As shaft 113 slowly rotates, the surface of secondary mirror 111 will swivel, causing reflected beam 92 to slowly sweep through a cone. Consequently, the plane of scanning beam 98, reflected by rapidly-rotating primary mirror 89, will tilt in a circular fashion at a rate corresponding to the rate of rotation of shaft 113. The combination of the rapid scan rate and slow tilt rate produce a helical scan pattern.

The placement of photoemitter 85, secondary mirror 111, and primary mirror 89 shown in FIG. 21 are meant to be illustrative, but not limiting. Persons of ordinary skill in the art will appreciate that many equivalent arrangements of mirrors rotating at substantially different rates will produce a tilting scan plane and corresponding helical scan pattern. Such skilled persons will also appreciate that the angle of secondary mirror 111 can be slowly and continuously varied by means other than those indicated (a system of cams, for example), and that such means might produce a tilting scan pattern other than the helical pattern of the example system. Any such system which systematically tilts the scanning plane using optical and/or mechanical means is constructed within the spirit of the current invention.

Figure 22:
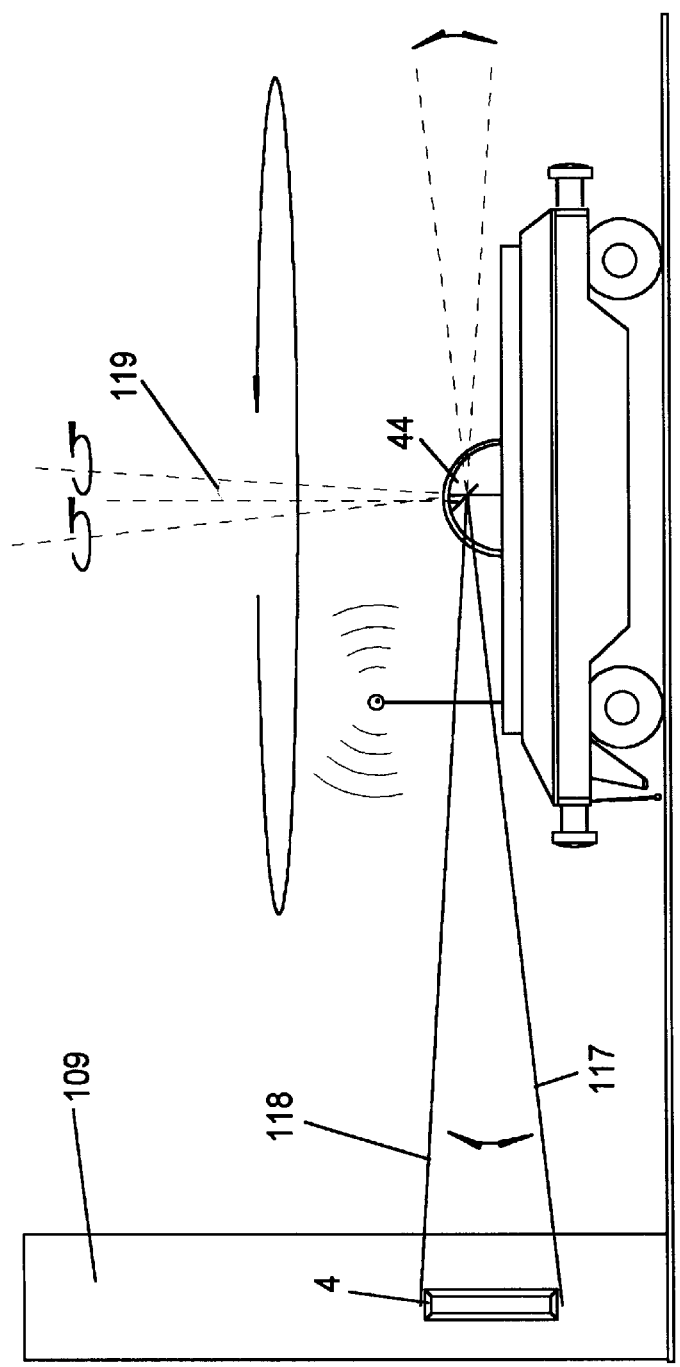
FIG. 22 shows a side view of vehicle and reflector showing improved scanner operation.

FIG. 22 shows a side view of vehicle 1 with an improved helical scanning system 44 mounted on top. At some time in its helical scan pattern, scanning beam 98 will sweep through an approximate instantaneous plane of rotation 117. Plane 117 is angled substantially downwards relative to reference reflector 4. At some later time, scanning beam 98 will have tilted so that it sweeps through the approximate instantaneous plane of rotation 118. Plane 118 is angled substantially upwards relative to reflector 4. As beam 98 moves through its helical pattern, the approximate instantaneous plane of the scanning beam will appear to sweep up and down across any given target.

An important parameter of helical scan system 44 is the maximum tilt angle 119 between the highest plane 118 and lowest plane 117 (as seen from reflector 4) swept by beam 98. In the example scanning system of FIG. 21, tilt angle 119 is established by the angle between axis 116 and a perpendicular to the surface of secondary mirror 111.

Figure 23:
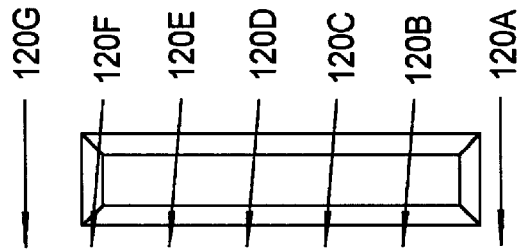
FIG. 23 shows a frontal view of reference reflector showing scanning beam paths.

FIG. 23 shows a face-on detail of reference reflector 4 previously shown in FIG. 22, and the trajectories 120A–120G of the beam spot projected onto reflector 4 by several successive rotations of navigational scanner 44 (not shown). As beam 98 (not shown) follows its helical scan path, the beam's mostly-horizontal path 120A will slowly drift up-and-down across the reflector. The number of passes beam 98 makes between the highest path 120G and lowest path 120A depends on the ratio between the rates of beam rotation and tilt. If the tilt rate is 1/20 that of the rotation rate, the beam's upward sweep across the reflector will take place over 10 scanning periods, followed by 10 downward-tending scan paths. By suitable selection of the tilt-rotation ratio, size of reflectors 4, and tilt angle 119, navigational scanner 44 can be constructed so that it will not fail to detect reflectors of a predetermined size in a room of prescribed maximum extent (provided that vehicle 1 itself is not tilted beyond a prescribed maximum angle).

The helical scanning scheme described above has the principal advantage that it will detect comparatively small reference reflectors even if vehicle 1 tilts somewhat as it moves about the working environment. A further advantage of a helical scanning system is that it can provide a rough estimate of the distance between vehicle 1 and a detected reflector 4. Note that in FIG. 23, only five of the seven beam trajectories 120A- actually intersect reference reflector 4; the others either pass above or below reflector 4. The number of scan paths 120A–120G that cross the surface of reflector 4 will depend on the vertical size of reflector 1, the maximum tilt angle 119, the ratio between the rates of tilt and rotation, and the distance from scanner 44 to reflector 4. For the system of the preferred embodiment, the reflector size, tilt angle 119, and tilt-rotation rate ratio are all fixed by the construction of the system and known a priori. Thus, the number of times that a reflector 4 is detected during a full helical scan period is indicative of the distance between vehicle 1 and reflector 4. If reflector 4 is very close to vehicle 1, then most or all of the beam paths 120A–120G will strike reflector 4; as the distance to reflector 4 is increased, fewer and fewer of the beam paths 120A–120G will pass within the vertical extent of reflector 4.

The data from navigational scanner 44 are presented to control program 16 running on host computer 9. Control program 16 counts the number of scans for which any given reflector 4 is detected during a full helical scan period. Control program 16 calculates an upper and lower bound on the possible distance between reflector 4 and scanner 44 by trigonometry. This effectively establishes a limited (though potentially large) distance range inside which vehicle 1 must lie. This distance information, though not precise, provides important supplemental cues to the navigation and control system. For example, if only one reflector is visible and/or substantial errors have accumulated in the dead-reckoning position estimate, even an approximate measure of distance to a reflector can provide useful additional information.

Vehicle Local Control System

The processing and control functions carried out by control system 41 contained within vehicle 1 itself are kept to a bare minimum. In the preferred embodiment, no means whatsoever are provided in control system 41 for constructing or storing a map of the environment, determining vehicle 1's location, planning an intended path, or evading obstacles. Virtually the only two functions of onboard control system 41 are (1) to relay information from the various vehicle sensors to control program 16 on host computer 9, and (2) to control the various vehicle systems in response to simple commands from host computer 9. The only other control function which resides in control system 41 is a reflexive action to stop moving if any bumpers 46 or whiskers 47 register contact with an obstacle. All higher-level navigation and control functions are left to control program 16 on host computer 9.

This uneven "division of labor" between host computer 9 and onboard vehicle control system 41 permits the use of a very simple and inexpensive microcontroller as the vehicle's local processor. The map-generation, position estimation, and path-planning means are each running on host computer 9 and have access to all of the CPU, memory, and mass-storage resources thereof. Thus, much more sophisticated and storage-intensive map-generation and path-planning algorithms can be used compared to those AGV systems disclosed in the prior art which implement such functions on the vehicle itself (for example, the system taught by U.S. Pat. No. 5,109,566 to Kobayashi).

Figure 24:
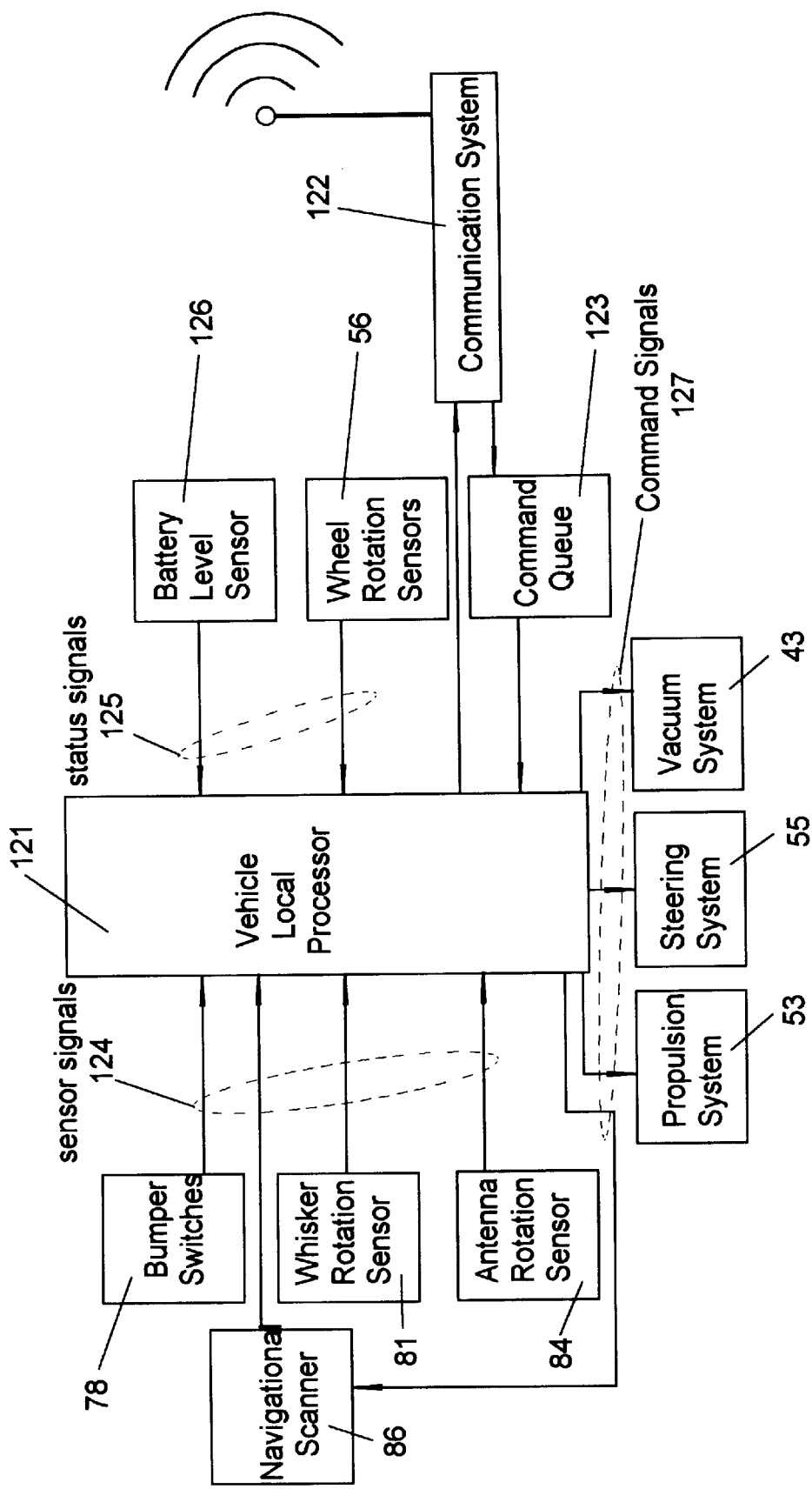
FIG. 24 shows a block diagram of vehicle control system.

FIG. 24 shows a simplified block diagram of the vehicle's communication and control system 41. The local processor 121 transmits data to and receives commands from host control program 16 via a communication subsystem 122. Commands received by communication subsystem 122 are entered into a command queue 123, from which they are retrieved by local processor 121.

Local processor 121 accepts a plurality of sensor signals 124 and status signals 125. Sensor signals 124 are produced by vehicle subsystems which detect objects in the working environment, for example: the bumper sensors switches 78, whisker sensor 81, antenna deflection sensor 84, and the navigational scanner's photodetector 86. Status signals 125 indicate the current operation of vehicle 1, and are produced by, for example: the battery-level sensors 126 and wheel rotation sensors 56.

Local processor 121 operates the various actuators and motors on vehicle 1 through a plurality of command signals 127. These command signals 127 are produced by various analog and digital output pins (and associated amplification circuitry, if necessary). Command signals 127 are connected to, for example: fan motor 68 of vacuum system 43, propulsion motors 53 connected to rear wheels 51, steering servo-motor 55, and motors 94 and 115 which drive navigational scanner 44. Local processor 121 actuates these vehicle subsystems in response to simple commands received from host 9 via communication subsystem 122.

Vehicle control system 41 is implemented with hardware similar to that used in host interface module 3: a microcontroller and an RF communication circuit. In the preferred embodiment, control system 41 uses a single integrated circuit which includes both control and communications functions (such as, for example, the Am79C432 chip manufactured by the AMD Corp. in Santa Clara, Calif.). In such an implementation, the cost of the communication and control electronics for the vehicle is no more than the cost of electronics in a cordless telephone handset.

As part of its task of relaying sensor signals 124 to control program 16, processor 121 applies certain basic pre-processing to the raw sensor signals before transmitting them over the wireless link. In the case of the various rotation sensor signals (from wheel rotation sensors 56 and whisker hinge sensor 81, for example), raw quadrature pulses 64 from opto-interruptors 62 are converted into incremental relative rotation counts using methods known to persons of ordinary skill in the art. Such methods are widely used in the control electronics of computer mice and trackballs, for example. Processor 121 also applies rudimentary pre-processing to the digitized signals from the navigational scanner's photodetector 86. In order to limit communication traffic, these data are reduced by various standard techniques (by only transmitting samples which exceed a fixed threshold, for example) then suitably encoded and transmitted to control program 16 for further processing. In the preferred embodiment, vehicle control system 41 makes no attempt to calculate bearing angles to reference reflectors based on data from navigational scanner 44; instead, these calculations are carried out by control program 16 on host computer 9.

Figure 25:
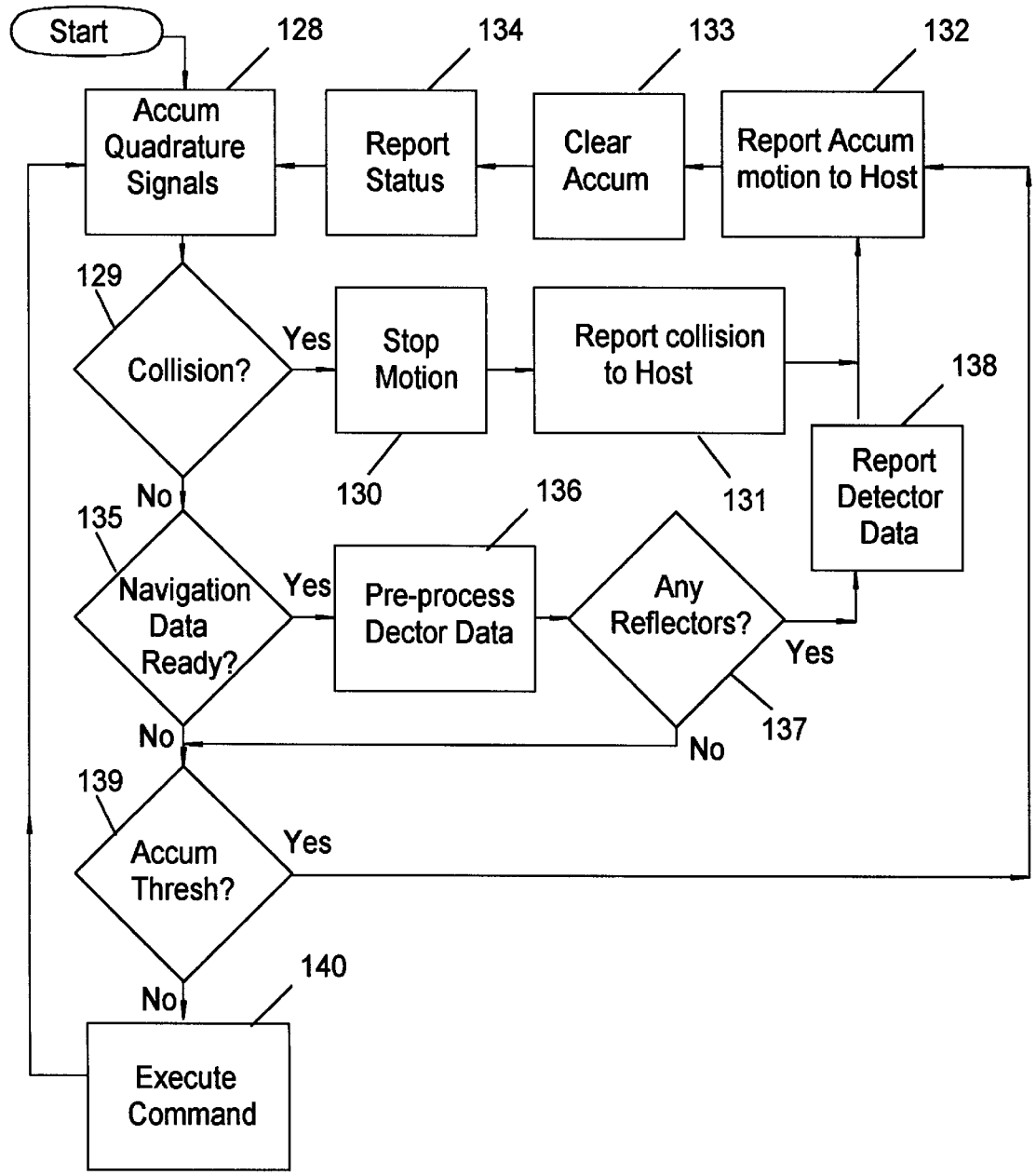
FIG. 25 shows a simplified flowchart for vehicle local processor operation.

FIG. 25 is a simplified example flowchart of operation for the vehicle's control system 41. In step 128, processor 121 accumulates quadrature pulses 64 recorded from rotation sensors 56 affixed to front wheels 50. Separate accumulation results are kept for each front wheel 50. Next, in step 129, processor 121 checks to see if any of the bumper switches 78 or whiskers 47 have registered contact with an obstacle. If so, processor 121 immediately ceases all vehicle movement in step 130 by commanding propulsion motors 53 to stop. In step 131, the collision sensor data is encoded and transmitted to control program 16 on host computer 9. Next, in step 132 the accumulated quadrature pulses for both wheels are transmitted to the host 9, followed by clearing the quadrature accumulators in step 133. Next, in step 134, controller 41 encodes and transmits status information to host 9, which indicates, for example, the current state of the vehicle's battery and other on-board systems. If no collision is detected in step 129, control passes to step 135, which checks for new data from navigational scanner 44. Navigational scanner 44 produces new data for every rotation of scanning beam 98. If new data are available, the data are pre-processed in step 136 sufficiently to determine if any reference reflectors 4 were encountered by the scanning beam 98 during its sweep. This preprocessing might consist of, for example, comparing the return-signal amplitude against a fixed threshold. In step 137, processor 121 determines if any reference reflectors 4 are currently visible. If so, control passes to step 138, where the data from navigational scanner 44 are encoded and transmitted to control program 16. Following this report, control passes back to the start of the program through steps 132, 133, and 134, which report and clear the quadrature accumulators then report status information, respectively. If no reflectors 4 were detected in step 137, or no data were available from navigational scanner 44 in step 135, then control passes to step 139. Step 139 compares the two quadrature accumulator values to a threshold. If either of the accumulators exceeds the threshold, then control passes through steps 132, 133, and 134, which report and clear the quadrature accumulators then report status information, respectively. By reporting the quadrature accumulator values when they exceed a threshold, vehicle 1 keeps control program 16 on host 9 informed whenever it moves any significant distance. If, in step 139, quadrature data need not be reported, processor 121 executes step 140, which reads host commands from queue 123 (according to the steps described below, and shown in FIG. 26). Execution then returns to the start of the program.

Figure 26:
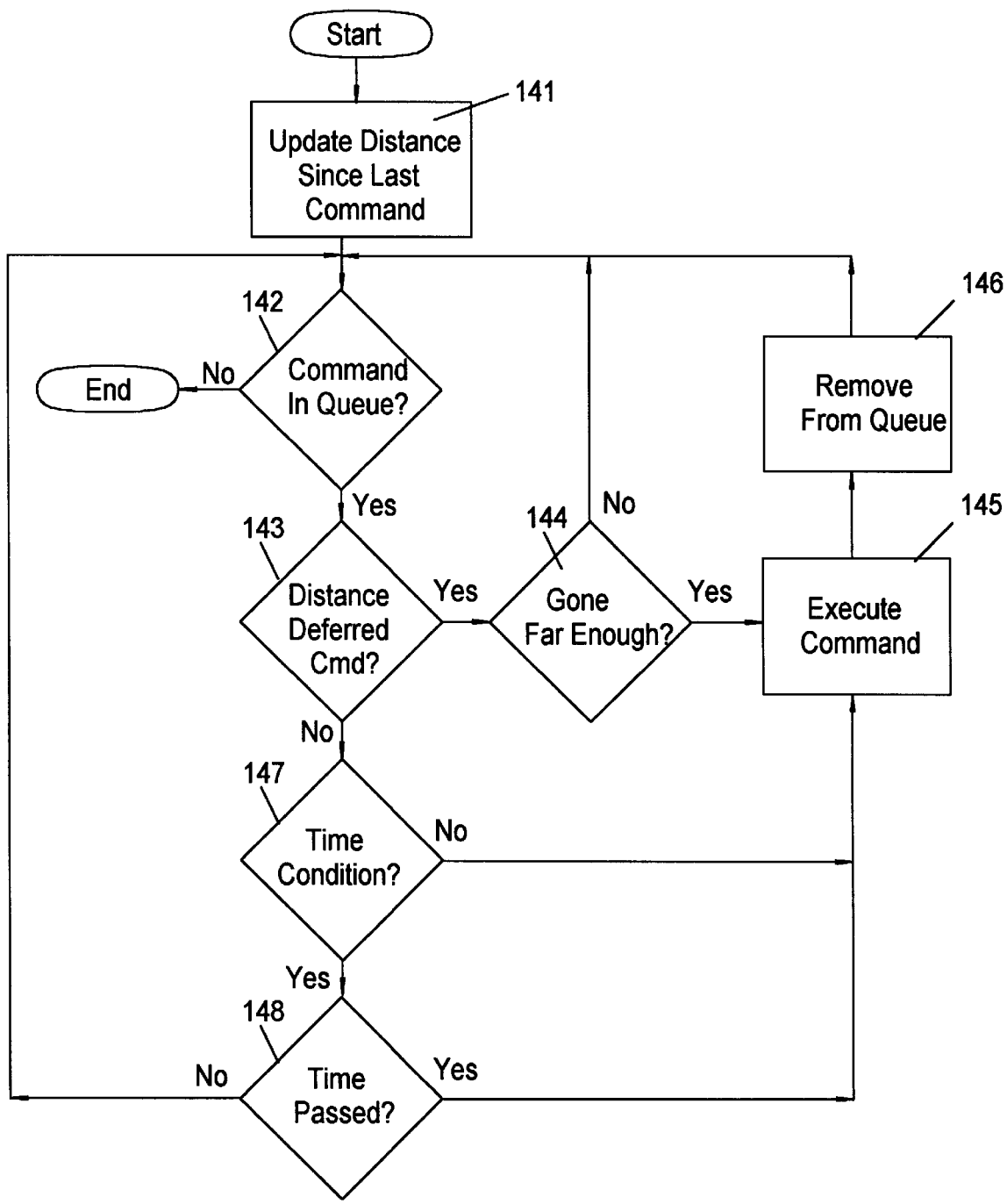
FIG. 26 shows a simplified flowchart for command queue processing.

FIG. 26 is a simplified example flowchart describing the process by which processor 121 reads and executes commands from queue 123. Each command issued by host command program 16 includes data fields which instruct vehicle processor 121 how to schedule execution for that command. Execution of any command can be scheduled (for example) according to the following three methods:

1. Immediate: Execute the command immediately upon receipt.
2. Time-deferred: Execute the command at an indicated future time.
3. Distance-deferred: Execute the command after vehicle has traveled an indicated distance following execution of the previous command.

In step 141 processor 121 first updates an internal variable indicating the distance traveled since last command execution by adding (for example) the quadrature accumulation results described above. In step 142, processor 121 checks to see if there are any pending commands in queue 123; if not, command queue processing terminates. If a command is present, execution flows to step 143, in which the command data is checked for distance-deferred execution per style (3) above. If the command is so scheduled, processor 121 in step 144 checks to see if the distance traveled since last command execution exceeds the value indicated by the current command's scheduling data. If the indicated distance has been traveled, execution flows to step 145, wherein processor 121 carries out the command by, for example, commanding propulsion motors 53 to run or stop, altering the steering angle, or activating or deactivating other vehicle systems. Upon execution, the command is removed from queue 123 in step 146, which also clears the internal variable indicating distance moved since last command execution. If, in step 143, the current command was not scheduled for distance-deferred execution, control flows to step 147, which tests to see if the current command is scheduled for time-deferred execution per style (2) above. If the command is so scheduled, the indicated execution time is compared against processor 121's running absolute time base in step 148. If the current command's indicated execution time has arrived, the command is executed and flushed from the command queue in steps 145 and 146, respectively.

By scheduling commands for deferred execution according to methods (2) and (3), the control program 123 can issue a self-contained command sequence that terminates, for example, with the vehicle stopped awaiting further orders. By issuing such safe command sequences, the control program can avoid the need for support from a real-time operating system; if control program 16 is interrupted, vehicle 1 will simply stop and await further commands.

The example processing sequence shown in FIGS. 25 and 26 is meant to be illustrative, but not limiting. The operation of the local vehicle control system 41 is not critically dependent on the particular order in which these basic functions are carried out. Many other equivalent programs which accomplish substantially the same purpose will readily suggest themselves to persons of ordinary skill in the art.

Host Control Software

One of the most important elements of the present invention is host control program 16 which coordinates the operation of the entire cleaning robot system. Control program 16 resides on host computer 9 and communicates with vehicle 1 via wireless signals 15 produced by host interface module 3. Control program 16 carries out most of the intelligent functions of the system, including analyzing data from the vehicle's sensors, maintaining a map of the working environment, estimating the vehicle's current location, scheduling cleaning tasks, planning appropriate paths for the vehicle to follow, issuing movement commands to the vehicle, and presenting a user-interface to the operator.

Figure 27:
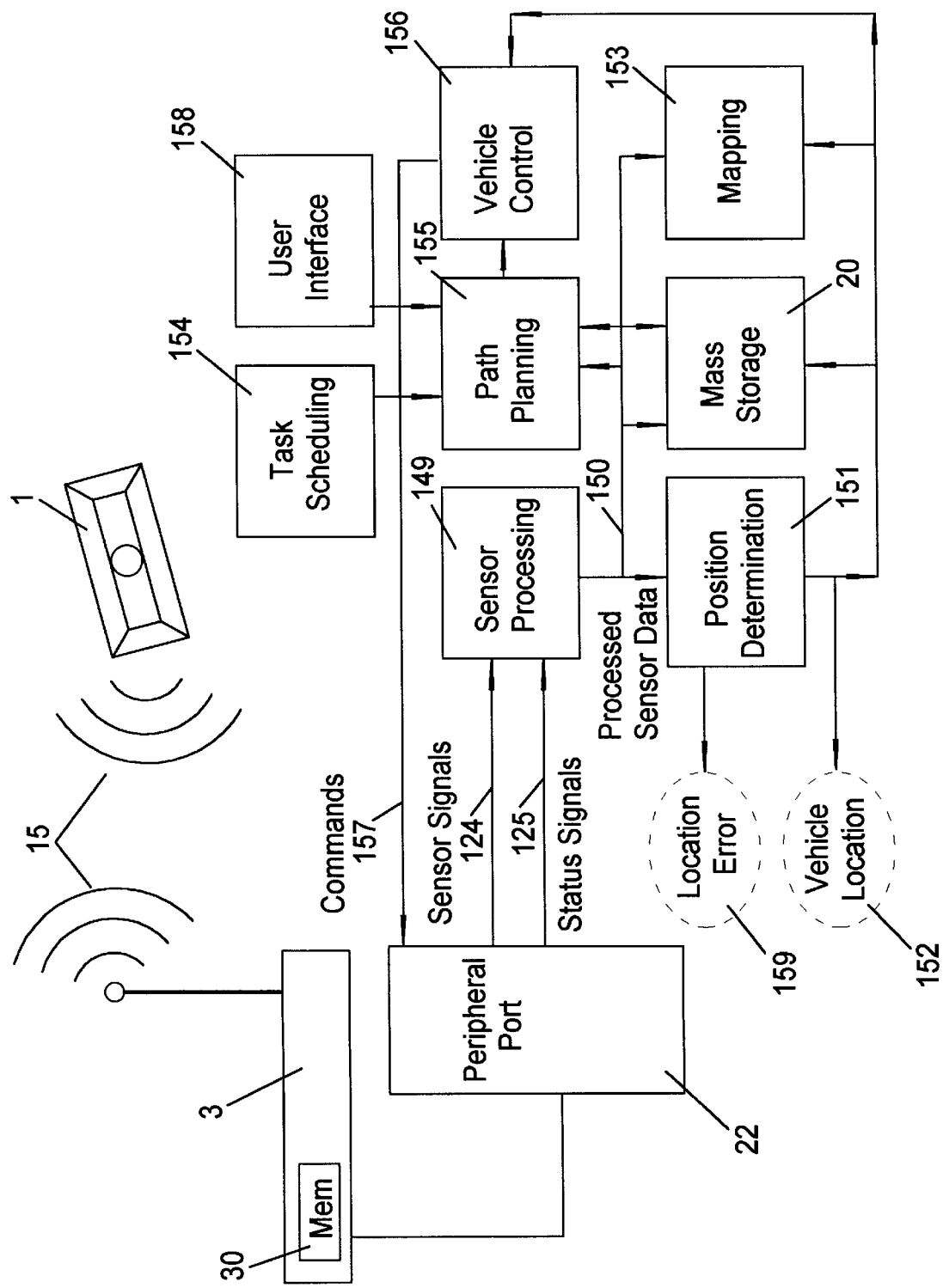
FIG. 27 shows a block diagram of host computer control program subsystems.

For illustrative purposes, the functions of control program 16 are divided into the following logical subsystems as shown in the block diagram FIG. 27:

A sensor-processing subsystem 149 which produces processed sensor data 150,

A position-determination subsystem 151 which produces an estimate 152 of the location and orientation of vehicle 1 within the working environment, A mapping subsystem 153 which automatically generates a mathematical model (i.e. map) of the objects and boundaries in the working environment, A task-scheduling subsystem 154 which uses host computer 9's internal clock to activate or suspend system operation, A path-planning subsystem 155 which determines what path vehicle 1 should follow through the working environment, A vehicle control subsystem 156 which determines a sequence of commands 157 which should be transmitted to vehicle 1 in order to have it follow the path set by path-planning subsystem 155, and A user-interface subsystem 158 which allows an operator to monitor, control, and configure the operation of the other subsystems.

As vehicle 1 moves through the working environment, it communicates with host interface module 3 via wireless signals 15. Host control program 16 continuously reads sensor signals 124 and status signals 125 from host interface module 3 through peripheral port 22. To avoid loss of data, host interface module 3 stores incoming signals 124 and 125 in buffer memory 30 until they can be read by host control program 16. These sensor signals 124 and status signals 125 are processed by the sensor processing subsystem 149.

Sensor processing subsystem 149 carries out higher-level analysis tasks, such as computing bearing angles to reference reflectors 4 observed by navigational scanner 44, and deciding which sensor signals 124 warrant storage or further action by other subsystems. Position-determination subsystem 151 uses processed sensor signals 150 and map data stored on mass-storage device 20 to calculate vehicle 1's estimated location 152 and an associated error estimate 159. The operation of position-determination subsystem 151 is discussed in detail below under the section title "Position Determination." Mapping subsystem 153 uses estimated position 152 and processed sensor signals 150 to generate and maintain a map of the boundaries, obstacles, and reference markers 4 encountered by vehicle 1. The operation of the mapping subsystem 153 is discussed in detail below under the section heading "Map Generation." Movement commands 157 generated by vehicle control subsystem 156 are sent to host interface module 3 via peripheral port 22, thence transmitted to vehicle 1. User interface subsystem 158 presents system status and operating information to the user, and allows the user to control and configure system operation according to various preferences. Operation of the user interface subsystem 158 is described in detail below under the section heading "User Interface."

The particular arrangement of, and interrelationship between, control subsystems shown in FIG. 27 is meant to be illustrative, but not limiting. The divisions between subsystems are somewhat arbitrary in that all of the indicated subsystems reside within the same executable program module and share common data structures and library functions. Many equivalent structures for the system control software are possible and will readily suggest themselves to persons of ordinary skill in the art. Any system which incorporates these same basic functions, however subdivided, within a control program ehost computer host computer is constructed within the spirit of the present invention.

Position Determination

Position-determination subsystem 151 maintains an estimate 152 of vehicle 1's location in the working environment. The system of the preferred embodiment uses a Cartesian coordinate system defined with charging station 2 as its origin. When vehicle 1 is docked to charging station 2, it is at position (0,0) with a heading of 0°. For the current discussion, presume that position-determination subsystem 151 has access to a mathematical representation (i.e. map) of the location of all obstacles, boundaries, and reference reflectors 4 in the working environment. The methods used to generate such a map are discussed below under the section heading "Map Generation".

Whenever the vehicle's navigational scanning system 44 is within line-of-sight of three or more reference reflectors, the task of calculating estimated vehicle location 152 is relatively straightforward. Position-determination subsystem 151 can determine the identity of all observed reflective markers by keeping track of their apparent arrival in, passage through, and departure from scanner 44's field of view as vehicle 1 moves away from a known start position (i.e. charging station 2). A method for determining and tracking the identity of a plurality of anonymous retroreflective reference markers is discussed in detail in U.S. Pat. No. 4,811,228 to Hyyppa. If vehicle 1 is within sight of three reference reflectors, each at a known position, then the position and orientation of vehicle 1 can be calculated by trigonometry from the observed bearing angles to each reflector.

When vehicle 1 is within line-of-sight of only two reference reflectors, it is not possible to calculate estimated vehicle location 152 from a single observation of the two respective bearing angles. The system of the preferred embodiment overcomes this limitation by taking advantage of the fact that estimated location 152 can be determined from any pair of observations if the distance traveled in-between the two observations is known.

Figure 28:
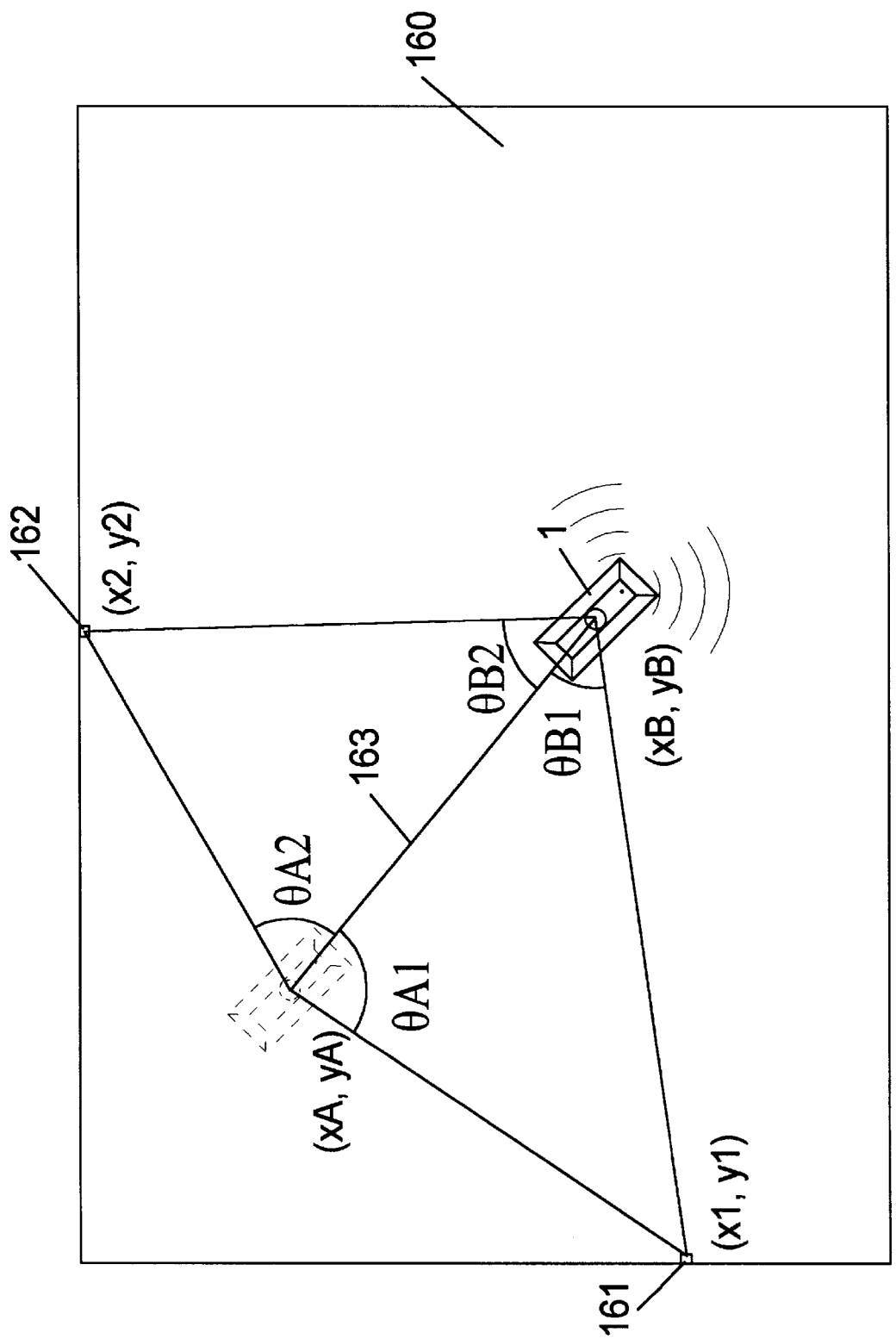
FIG. 28 shows an example placement of vehicle in a room with two reference reflectors.

FIG. 28 shows vehicle 1 in an example room 160 with only two reference reflectors 161 and 162 located at Cartesian coordinates $(x_1, y_1)$ and $(x_2, y_2)$, respectively. When vehicle 1 is at location $(x_A, y_A$ data from navigational scanner 44 provides bearing angles $\theta A_1$ and $\theta A_2$ to the reference reflectors 161 and 162, respectively. The vehicle then moves some distance d along a line 163, either as a normal consequence of its operation or for the specific purpose of establishing a navigational reference. After moving the indicated distance to location $(x_B, y_B)$, navigational scanner 44 will measure a second set of bearing angles, $\theta_{B1}$ and $\theta_{B2}$, to reflectors 161 and 162 respectively. The system establishes the distance d traveled between the two locations $(x_A, y_A)$ and $(x_B, y_B)$ by counting pulses 64 from rotation sensors 56 attached to front wheels 50. Position-determination subsystem 151 can calculate the coordinates of the two points $(x_A, y_A)$ and $(x_B, y_B)$ from the four bearing angles $\theta_{A1}, \theta_{A2}, \theta_{B1}, \theta_{B2}$ and the known distance d via standard methods of plane geometry.

By using the aforementioned technique, position-determination subsystem 151 can accurately calculate estimated vehicle location 152 as vehicle 1 moves through those areas of the working environment within line-of-sight of only two reference reflectors. The areas of the operating environment which are within line-of-sight of two or more reference reflectors thus form a "navigational reference zone." As long as vehicle 1 travels within such zones, its estimated location 152 can be calculated without resorting to dead-reckoning or other approximate techniques. Notice that this position-determination method uses data gathered from the wheel rotation sensors 56 to compute its position, but that this is not the same as dead reckoning. Any errors in the measurement of the distance d are not cumulative; thus, the accuracy of estimated location 152 produced by this method will not decay due to accumulated errors.

Position-determination subsystem 151 does not require that the entire working environment be within line-of-sight of two or more reference reflectors. In fact, it can continue to calculate estimated location 152 as vehicle I moves through large regions from which no reference reflectors are visible at all. We will consider separately the two cases of (1) the areas from which no reference reflectors are visible at all and (2) the areas of the working environment within line-of-sight of only one reference reflector.

Navigation through areas without reference reflectors

Navigation in regions from which no reference reflectors are visible ("blind zones") is performed by standard methods of odometry, also known as dead-reckoning. Position-determination subsystem 151 keeps track of the distance traveled by each of the vehicle's front wheels 50 and also the instantaneous value of the commanded steering angle. This information gives a set of movement vectors which indicate how far, and in what direction, vehicle 1 has traveled. Integrating these vectors over time produces the estimated vehicle location 152. Such dead-reckoning position estimates are notoriously susceptible to accumulated error from a variety of sources including uneven terrain, inaccuracies in the manufactured wheel diameter, etc. Thus position-determination subsystem 151 continuously maintains an estimate 159 of the accumulated errors in the calculated vehicle location 152.

Error estimate 159 can consist of, for example, a probable upper bound on the accumulated error in estimated location vector 152 (which includes X-Y position and orientation components). Position-determination subsystem 151 increases the magnitude of error estimate 159 according to a predetermined algorithm as vehicle 1 maneuvers through a blind zone. For example, each measurement of the distance traveled by wheels 50 can be assigned an uncertainty based on typical inaccuracies measured from a similar system operating in a controlled environment. This measurement uncertainty could alternatively be based on observed data from rotation sensors 56 as vehicle 1 moves through non-blind (i.e. navigational reference) zones. As vehicle 1 moves through a blind zone, position-determination subsystem 151 accumulates these measurement uncertainties (and similar uncertainties in the commanded steering angle) in order to calculate error estimate 159. Thus vehicle 1 will be surrounded by a slowly-growing region of uncertain location (and a corresponding cone of uncertain orientation) as it maneuvers through a blind zone. As far as position-determination subsystem 151 is concerned, the true vehicle position and orientation lie somewhere within this growing zone but cannot be determined precisely.

The magnitude of error estimate 159 is steadily increased as vehicle 1 moves through blind zones. The system of the preferred embodiment uses a simple strategy which increments the magnitude of error estimate 159 as a fixed proportion of the measured distance traveled. In an alternative embodiment, position-determination subsystem 151 may use more sophisticated statistical techniques for combining measurements of estimated uncertainty, such as those described in "Probability and Random Processes" by Alberto Leon-Garcia (Addison-Wesley, 1989) and similar texts. If the vehicle operates in a blind zone for too long, then error estimate 159 will grow so large that location estimate 152 can no longer be considered useful. If the magnitude of error estimate 159 (either orientation or position) exceeds a predefined maximum value, then the system will interrupt its activity and seek a navigational reference.

The system of the preferred embodiment chooses one of two independent methods to acquire a navigational reference: (a) vehicle 1 can be momentarily diverted back into a navigational reference zone from which two or more reference reflectors 4 are visible, or (b) vehicle I can be directed towards an obstacle at a known position (e.g. a wall or corner) and re-calibrate its position by colliding one or more times with the obstacle. After vehicle location estimate 152 has been re-calibrated, vehicle 1 is directed back into the blind zone to resume its previous task. Thus it is a normal behavior of the system to periodically suspend its cleaning function when operating in a blind zone in order to re-calibrate its dead-reckoning calculations. The techniques used to plan vehicle 1's movement, including diversions for acquiring navigational reference, are discussed in detail below under the section heading "Path Planning."

Navigation through areas with only one reference reflector.

Vehicle location estimate 152 cannot be directly calculated by measuring a bearing angle to only one reference reflector at a known position. Even so, a single measured bearing angle can provide important information that can limit the size of accumulated errors in estimated vehicle location 152, particularly errors in the orientation component of 152.

Figure 29:
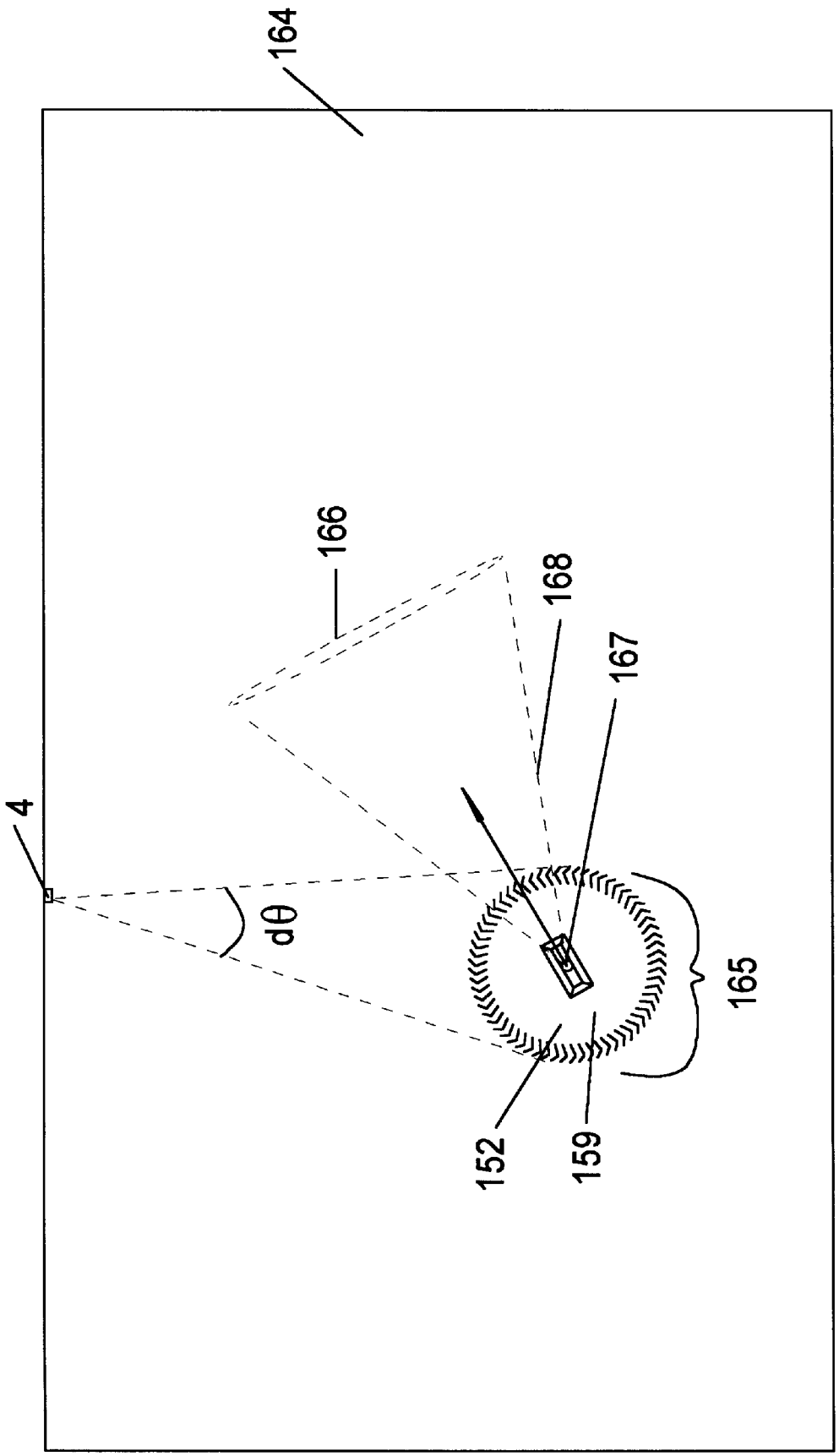
FIG. 29 shows an example placement of vehicle in a room with one reference reflector.

FIG. 29 shows a simplified plan view of an example room 164 with only one reference reflector 4. Vehicle 1 is surrounded by a region of uncertain location 165 given by estimated vehicle location 152 and estimated error 159. Vehicle 1's unknown true location 167 lies somewhere within region 165. Also shown is a cone of uncertain orientation 166 which surrounds the vehicle 1's unknown true orientation 168. By measuring the bearing angle to the single reference reflector 4 and using this information in conjunction with the limited size of region 165, position-determination subsystem 151 can make limited corrections to the orientation component of estimated vehicle location 152. If, for example, the size of region 165 is small compared to the distance to reflector 4, then the observed bearing angle to reflector 4 from any location within region 165 will be substantially the same. In this circumstance, the observed bearing angle can be used to correct the orientation component of estimate 152 with fairly high precision. In general, the following simple rule applies: by observing a single reference reflector 4, the orientation component of estimate 152 can be calculated to within an accuracy dO, where dO is the angle of arc subtended by region of uncertain location 165 as observed from reflector 4. Consequently, observations of reflectors 4 comparatively far away from vehicle 1 can help maintain accuracy in the orientation component of vehicle location estimate 152.

Example Position Determination Algorithm

Figure 30:
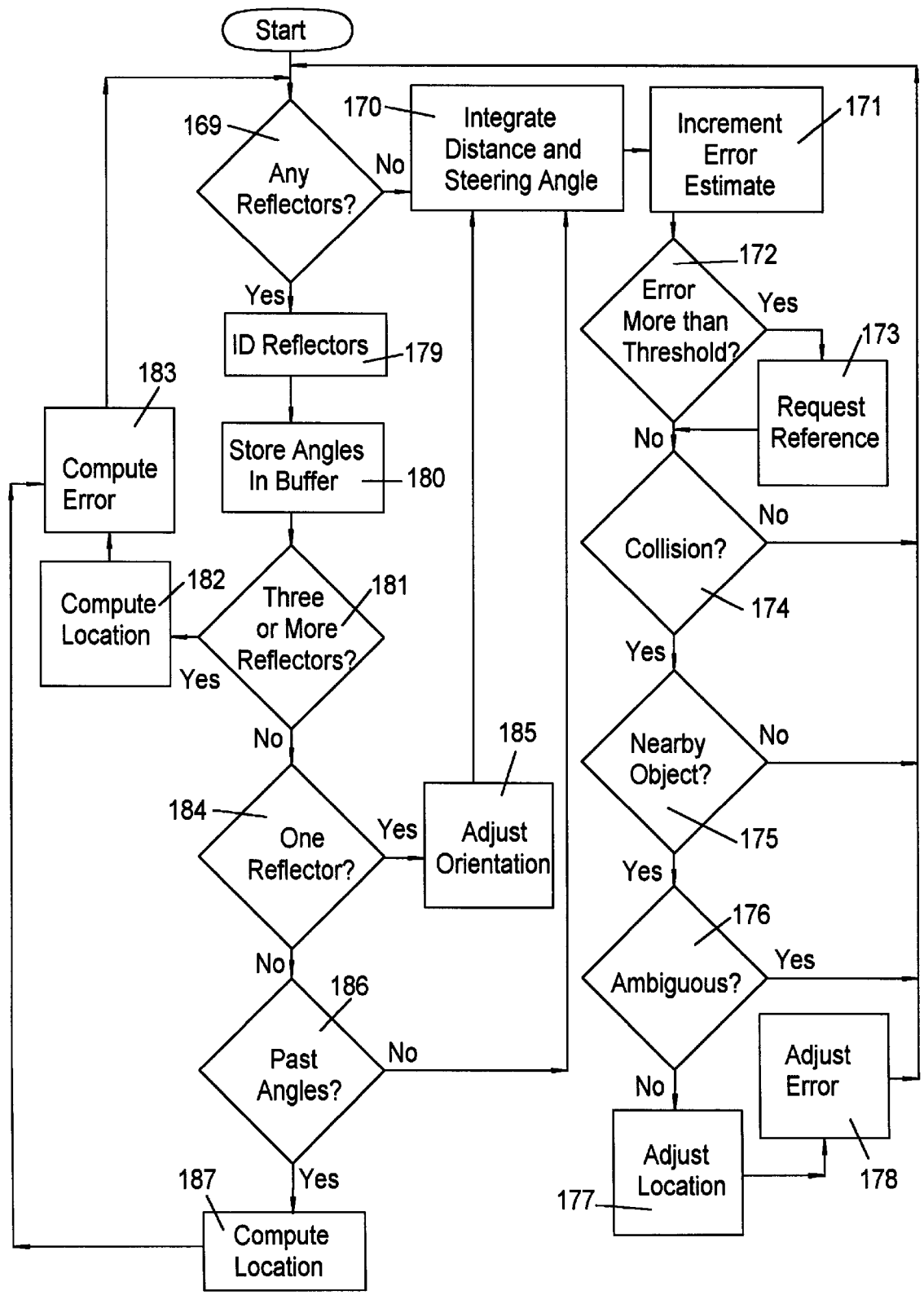
FIG. 30 shows a simplified flowchart of position determination subsystem operation.

FIG. 30 is a flowchart for a simplified position-determination algorithm which substantially accomplishes the purposes set forth above for position-determination subsystem 151. In step 169, position-determination subsystem 151 checks processed sensor signals 150 to see if there are any reference reflectors currently within line-of-sight of the navigational scanner 44. If not, the system is in a blind zone, and control flows to step 170 wherein quadrature pulses 64 from wheel rotation sensors 56, in combination with the current steering angle, are used to update estimated vehicle location 152. Next, in step 171, the orientation component of estimated error 159 is incremented by a small amount proportional to the measured distance traveled. Also in step 171 the X- and Y-components of estimated error 159 are incremented by an amount which depends on the accumulated orientation error, since errors in orientation will tend to cause collateral errors when calculating location. In step 172, the magnitude of estimated error 159 is checked against a maximum value. If estimated error 159 has grown too large, position-determination subsystem 151 requests a navigational reference in step 173. This request is a signal sent to path-planning subsystem 155. In response, path-planning subsystem 155 may create a new path for the vehicle 1 which diverts it into a reference zone, or which causes the vehicle 1 to collide with an object at a known location. Actions which result from a request for a navigational reference may not take place until a later time, depending upon the response from path-planning subsystem 155. In step 174 position-determination subsystem 151 checks signals 150 for collision data which would indicate that the vehicle is in contact with an obstacle, if not, control returns to the top of the flowchart.

If the vehicle 1 is currently in contact with an obstacle, control passes to step 175. In step 175 position determination subsystem 151 queries mapping subsystem 153 to identify any obstacles or boundaries that lie within the current region of uncertain location 165 in the direction indicated by sensor signals 150. If no such obstacle is recognized, control returns to step 169. If the query identifies any previously-mapped obstacles or boundaries which could account for the collision, control flows to step 176. In step 176 position-determination subsystem 151 verifies that only one mapped obstacle could account for the reported collision; if the query of step 175 identified more than one possible obstacle, then no navigational inference can be drawn and control returns to step 169. If, in step 176, only one mapped obstacle is identified, control flows to step 177. In step 177 estimated vehicle location 152 is adjusted to agree with the known position of the object previously identified in step 175. For example, suppose vehicle 1 is moving east (+X), and reports a collision on its forward bumper 46 at a position which agrees with a previously mapped north-south wall (parallel to X=0). In this example, the east-west (X) coordinate of location estimate 152 can be set directly, though the north-south (Y) coordinate remains uncertain. In step 178, the estimated error 159 is reduced in accordance with the new position information gained from the collision. In the cited example, the X-cordinate of estimate 159 would be set to zero, but the Y-coordinate would be unaffected. Control then returns to step 169.

If processed signals 150 indicate that navigational scanner 44 has detected one or more reference reflectors, control will flow from step 169 to step 179. In step 179 position-determination subsystem 151 attempts to identify each reflector detected by scanner 44. Identification is the process of establishing a correspondence between an observed reflector and reflector locations previously stored by mapping subsystem 153. This is accomplished by comparing a measured bearing angle with the expected bearing angles to each known reflector stored in the map (relative to the estimated vehicle location 152). If any of the expected bearing angles agree with the measured bearing angle (within some predefined limit), then the reflector associated with that observation has been identified. Unidentified reflectors are of interest to the map generation subsystem 153 as described below, but are of no use to position-determination subsystem 151. In step 180, position-termination subsystem 151 stores measured bearing angles to any reflectors identified in step 179 in a history buffer. Bearing angle measurements stored in the buffer may later be used in step 187.

Next, In step 181, position determination system 151 tests the number of reflectors identified in step 179. If more than three reflectors were identified, control flows to step 182 wherein estimated vehicle location 152 is calculated directly by trigonometry. Even when estimated location 152 is computed directly from three or more measured bearing angles, there will still be uncertainty in the position calculation due to, for example, resolution limits in the bearing angle measurements. Thus the estimated error 159 is calculated and set in step 183.

If there are fewer than three reflectors identified in step 179, control flows to step 184. If only one reflector was identified, control then flows to step 185. In step 185 (as described above in the section "Navigation through areas with only one reference reflector") the measured bearing angle to the single detected reflector can be used to establish an upper bound on the orientation component of estimated error 159. Once the orientation error has been so limited, control passes to step 170.

If and only if exactly two reflectors were identified in step 179, control will flow through steps 181 and 184 to step 186. In step 186 position-determination subsystem 151 checks the bearing angle history buffer for previously-measured bearing angles to the same two currently-identified reflectors. If any prior measurements of the two reflectors were taken from an appreciably different observation point, then control passes to step 187. In step 187 estimated vehicle location 152 is calculated from the combined set of past and current bearing angle measurements using the technique described above. Control then flows through step 183 back to step 169.

The example position-determination algorithm shown in FIG. 30 is meant to be illustrative but not limiting. Many equivalent algorithms which accomplish substantially the same purpose will readily suggest themselves to persons of ordinary skill in the art.

System Installation and Setup

In order to be accepted in the consumer marketplace, computer peripheral devices must provide for a short, simple, and positive installation and setup process that can be carried out by a non-technical end user, preferably in ½ hour or less. It is one of the principal limitations of many self-running cleaning systems described in the prior art that they require either an involved setup and programming phase, a hand-taught learning phase, or both. The systems taught in U.S. Pat. No. 5,341,540 to Soupert and U.S. Pat. No. 4,811,228 to Hyyppa require that an operator "teach" the system by manually guiding the vehicle through its intended path. The system taught in U.S. Pat. No. 5,111,401 to Everett, Jr. et. al; requires an operator to install reflective guide paths on the floor of the working environment. Both of these approaches, and many like methods disclosed in the prior art, are highly undesirable for a device intended to be deployed as a household appliance and/or computer peripheral.

In the system of the preferred embodiment, the user is guided through a short and simple installation process by printed instructions and/or a setup "Wizard" program which is executed upon installation of control program 16 on host computer 9. called "Wizard" programs are commonly employed to guide users through the steps necessary to install computer peripheral devices such as video adapters, printers, etc. and are well known to persons of ordinary skill in the art.

Figure 31:
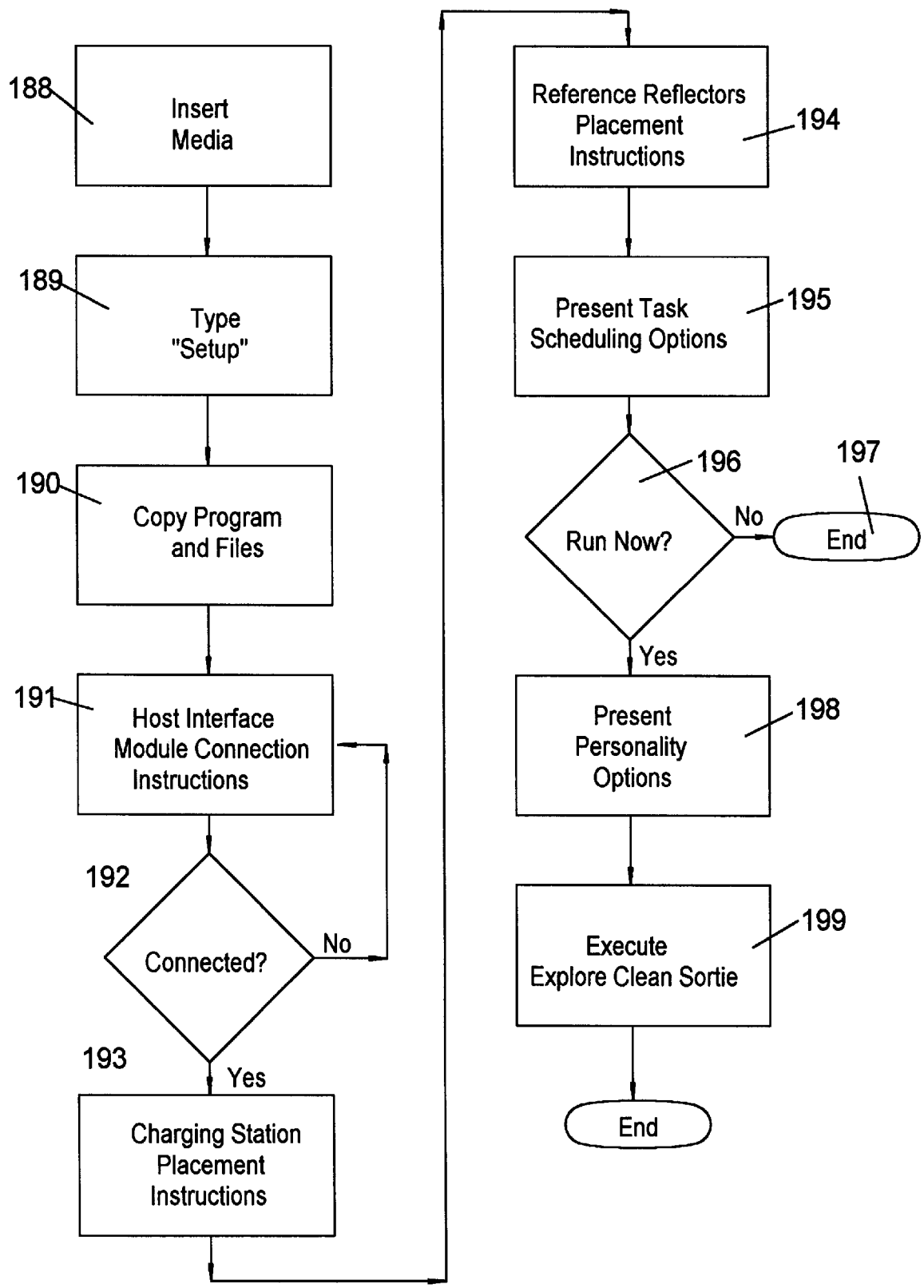
FIG. 31 shows a simplified flowchart showing user-installation procedure.

FIG. 31 shows a flowchart of the installation process for the system of the preferred embodiment. This example flowchart is meant to be illustrative, but not limiting; many equivalent installation methods will readily suggest themselves to persons of ordinary skill in the art. In step 188, the user inserts distribution media 7 containing control program 16 into the appropriate media-reader of host computer 9 (e.g. CD-ROM drive or floppy disk drive). In step 189, the user initiates the automatic installation process by issuing the appropriate commands to computer 9 (for example, the user might type "a:setup"). A description of the commands necessary to carry out step 189 is printed on a label affixed to distribution media 7. The commands issued in step 189 start the installation "Wizard" program, which first copies all necessary files (step 190) from distribution media 7 to mass-storage device 20. In step 191 the installation program presents instructions to the user describing the proper method for connecting host interface module 3 to an appropriate peripheral port 22 (e.g. a COM or printer port). Before proceeding, the installation program checks in step 192 to be sure that host interface module 3 is properly connected. If not, the user can review the connection instructions given in step 191. Once the proper operation of the host interface module 3 has been ascertained, control flows to step 193. In step 193 the installation program presents instructions for the proper installation of charging station 2. For example, the installation program can advise the user to place charging station 2 in a location which is inconspicuous, yet not separated from the areas to be cleaned by doors or partitions. The user is further instructed that charging station 2 must be plugged in to an electrical outlet, and that vehicle 1 must be manually placed in its starting, docked position on charging station 2.

In step 194, the installation program instructs the user in the proper placement of reference reflectors 4 in the working environment. Simple guidelines are provided for finding suitable locations for the reference reflectors 4; for example, the user is advised to place them so that at least three are visible from the center of each room to be cleaned. Since the vertical placement of the reflectors is important, the system includes a "reference stick" 6. The user is instructed to mount each reflector 4 so that the distance from the bottom of reflector 4 to the floor is equal to the length of stick 6. If the user fails to follow the guidelines, the system can still operate substantially normally despite sub-optimal placement of the reflectors 4. Placement and use of reference reflectors 4 is described in detail herein under the section headings "Position Determination" and "Map Generation."

In step 195, the installation program presents the user with a plurality of scheduling options. For example, the installation software presents the user with a menu of pre-configured cleaning schedules, as well as a "customize" feature which allows the user to define and edit a new schedule. Suitable scheduling options might include hours and days of the week during which the system is permitted to clean, or prohibited from cleaning, the working environment. In step 196, the user is asked whether or not the system should immediately start a cleaning sortie. Frequently, new users wish to see their new system in operation rather than trusting that it will start running, unobserved, in the dark of night. If the user declines to run the system, the installation process ends in step 197. If the user chooses to run the system, the installation program will present, in step 198, a set of "personality" options, as described in detail below under the section heading "Entertainment Functions." The system will then execute a cleaning and exploration sortie in step 199

Map Generation

Immediately after being installed in a new working environment, the system of the preferred embodiment will have no a priori information about the size or shape of the area to be cleaned, nor the number and placement of obstacles therein. Thus, the system's first order of business is to "explore" the environment and construct a mathematical representation (i.e. map) of its boundaries, obstacles, and reference reflectors 4. This map-making function is carried out by mapping subsystem 153 of control program 16 running on host computer 9.

Exploration starts with vehicle 1 in its docked position on charging station 2. The location of every obstacle, boundary, or reference reflector which vehicle 1 encounters is measured relative to the position (and orientation) of charging station 2. The system starts its exploration by commanding vehicle 1 to move directly away from the charging station 2 until it encounters an obstacle or a reflector.

Figure 32B:
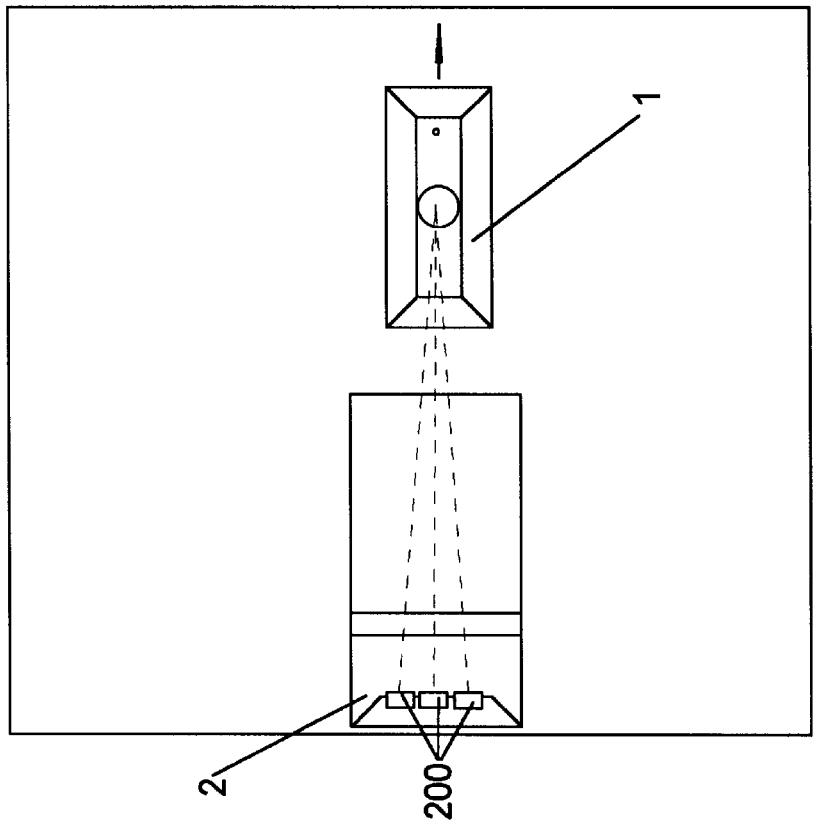
FIGS. 32A and 32B show the vehicle moving away from start position on charging station.
Figure 32A:
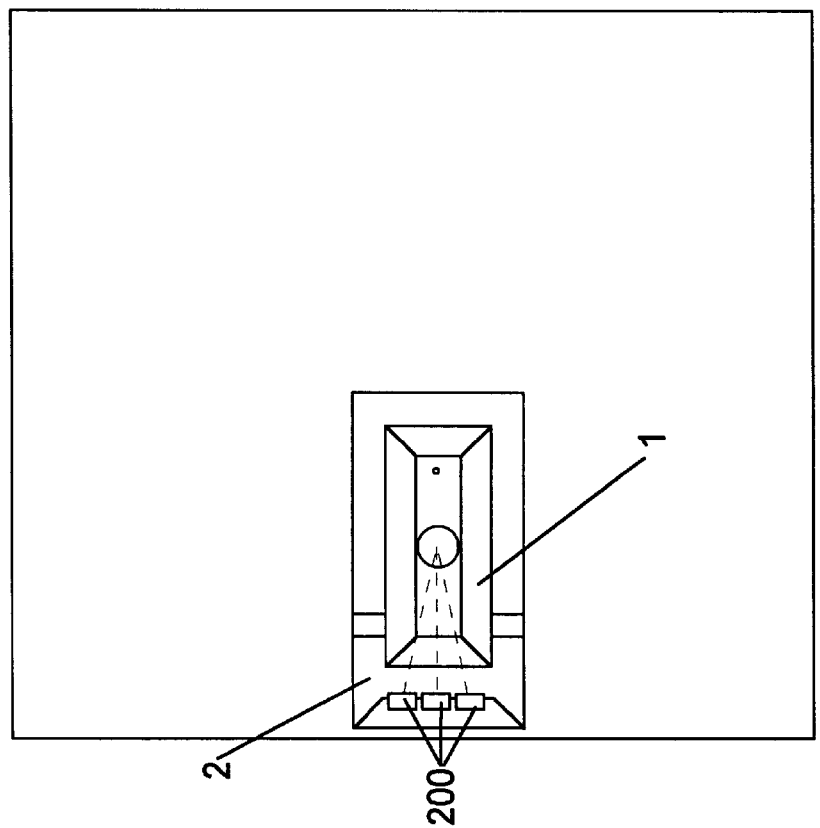

FIG. 32A shows a simplified plan view of vehicle 1 docked to charging station 2. Charging station 2 is marked with a distinctive pattern of reference reflectors 200 (for example, three reflectors set apart by a predetermined distance) positioned to be within sight of navigational scanner 44. When vehicle 1 is properly docked, mapping subsystem 153 will expect to measure three bearing angles corresponding to reference reflectors 200. FIG. 32B shows vehicle 1 moving away from charging station 2. As the distance between scanner 44 and the three reflectors 200 increases, the measured bearing angles will change in a way that allows position-determination subsystem 151 to calculate the distance and direction to charging station 2 (with higher accuracy when the distance is small). Thus whenever vehicle 1 is within line-of-sight of charging station 2, control software 16 can (if appropriate) accurately guide the vehicle to dock with charging station 2.

Mapping Obstacles and Boundaries

As vehicle 1 moves away from charging station 2, position-determination subsystem 151 produces estimate 152 of the vehicle's position and orientation. Initially, location estimate 152 is computed from a combination of odometry and observation of reflectors 200 by navigational scanner 44. Eventually, vehicle 1 may encounter an obstacle or boundary. If it does, the collision will trigger one of the bumper switches 78, and vehicle control system 41 will stop forward movement. From this point, control program 16 will direct vehicle 1 to "probe" the obstacle (or boundary) using recursive boundary-following techniques similar to those described in the prior art. A system which uses a recursive algorithm to map the boundaries of a working environment is taught in U.S. Pat. No. 4962453 to Pong, Jr. et. al. Such systems generally work on a "divide and conquer" principle, wherein a vehicle is recursively directed to drive through the midpoint of a chord drawn between two prior collision locations, for example along a wall, until the space between the recorded collision locations is smaller than the width of the vehicle. Once an obstacle, or portion of an obstacle, is completely mapped by such a technique, the vehicle can set off in an arbitrary new direction until it encounters another obstacle or boundary to be probed.

Many methods for map-storage and map-generation described in the prior art place a premium minimizing the memory required to store the map. One distinguishing feature of the present invention is that it takes advantage of the opportunity to store mapping information on hard disk drive 20 of existing host computer 9, thus allowing the storage of vast amounts of data for very low incremental cost. Mapping subsystem 153 creates and stores a data structure for each collision event (i.e. each time the vehicle's bumpers 46 or whiskers 47 detect an obstacle). Each data structure includes the time and date of the collision, the direction of travel at that time, estimated vehicle location 152, estimated error 159, and the identity of the sensor (or sensors) which recorded the collision. Such a data structure requires approximately 20 bytes of storage. At the time of this application, the equivalent cost of the hard-disk storage space necessary to permanently record such a data structure for every single collision event ever recorded over the entire operating life of the system (taken at 2,000,000 collisions) is only US$4.00.

In the broadest sense, the map of obstacles and boundaries in the working environment is stored as the set of all recorded collision-event data structures, which represent every obstacle that vehicle 1 has ever detected. From such a set of data structures, it is possible to create a useful representation of the locations of obstacles and boundaries likely to be found in the current environment. One method is to divide the extent of the explored working environment into a uniform Cartesian grid, and then to assign to each grid square a probability that an obstacle is present. Each of the stored collision data structures is processed in sequence by an algorithm (described below) that adds to each square the probability that there is presently an obstacle at that location, given that a collision was reported there at some past time. This algorithm assigns a lower incremental probability (i.e. weight) to older collision-event data structures which may be out-of date, and can otherwise modulate the incremental probability according to the ancillary (e.g. time and date or other context) information stored with each collision-event.

Such a map grid of the probabilities of obstacle and boundary locations can be generated rapidly from the stored set of historical collision event data, and then used, for example, to plan the vehicle's path through the environment. The algorithm that generates this map from the stored collision data can also modify the map dynamically in response to new collision data acquired from vehicle 1 as it operates.

Transient vs. Fixed Obstacles

Any mapping system suitable for use in a home environment must be able to handle transient obstacles which appear and disappear unexpectedly between cleaning sorties. Examples of transient obstacles include articles of clothing, toys, magazines, garbage cans, footstools, etc. The system of the preferred embodiment stores collision-event data for encounters with all obstacles, either transient or permanent. Before the database of collision events is processed to form a working map for the current sortie, the collision records are sorted by date. The statistical map-generation methods will tend to weight more heavily events recorded during more recent sorties. Events which tend to corroborate the presence of obstacles at the same place over many sorties are also assigned additional weight. Any collision events recorded during an active sortie, with either novel or familiar obstacles, are incorporated into the statistically-generated working map with very high weights. Special attention is paid to events corresponding to recently-detected obstacles not confirmed by data from prior sorties. The map generation system 153 can "single out" a set of such events to be deliberately confirmed or invalidated by diverting the path for the next sortie to re-visit the suspicious location. If, when vehicle 1 visits the suspicious site on a subsequent sortie, it fails to encounter the obstacle again, the transient collision event can be purged from the database (or transferred to a "transient obstacle" database for future reference). If the vehicle does encounter the obstacle, a second, corroborating collision event will be entered into the main database.

Figure 33B:
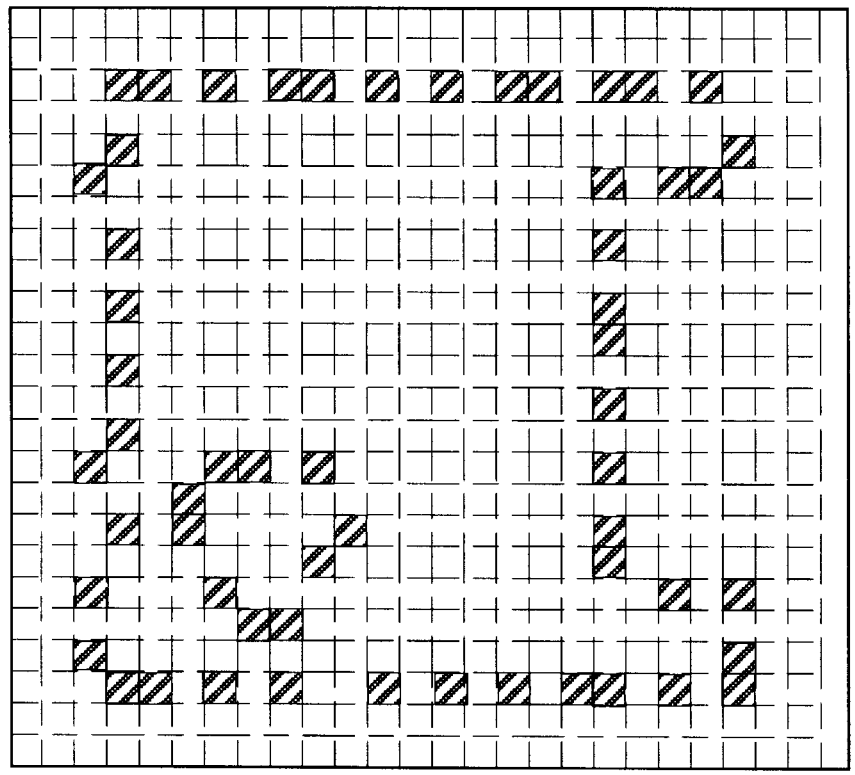
FIGS. 33A and 33B show a 2-D plot of collision locations in mapping subsystem database.
Figure 33A:
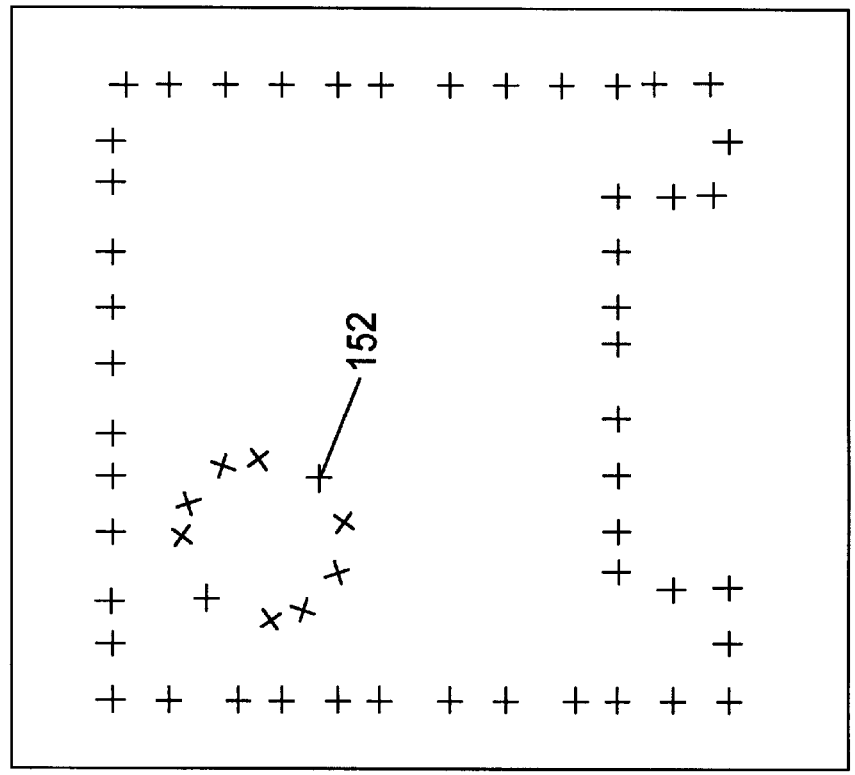

FIG. 33A shows a two-dimensional representation of an example database of collision events. Each ⊕ in the figure corresponds to the estimated vehicle location 152 recorded at the time of the collision. Also stored with each collision event is the date and time of the collision (not shown), and the estimated error 159 at the time of the collision (also not shown). This example database of collision records is typical of what vehicle 1 might encounter after a few hours of operation in a simplified example environment with one obstacle.

FIG. 33B shows a two-dimensional map of the working environment divided into a uniform grid. Each grid square is shaded according to the calculated probability of an obstacle being present. This probability is calculated by an algorithm (described below) that processes each of the collision records stored by mapping subsystem 153.

Figure 34:
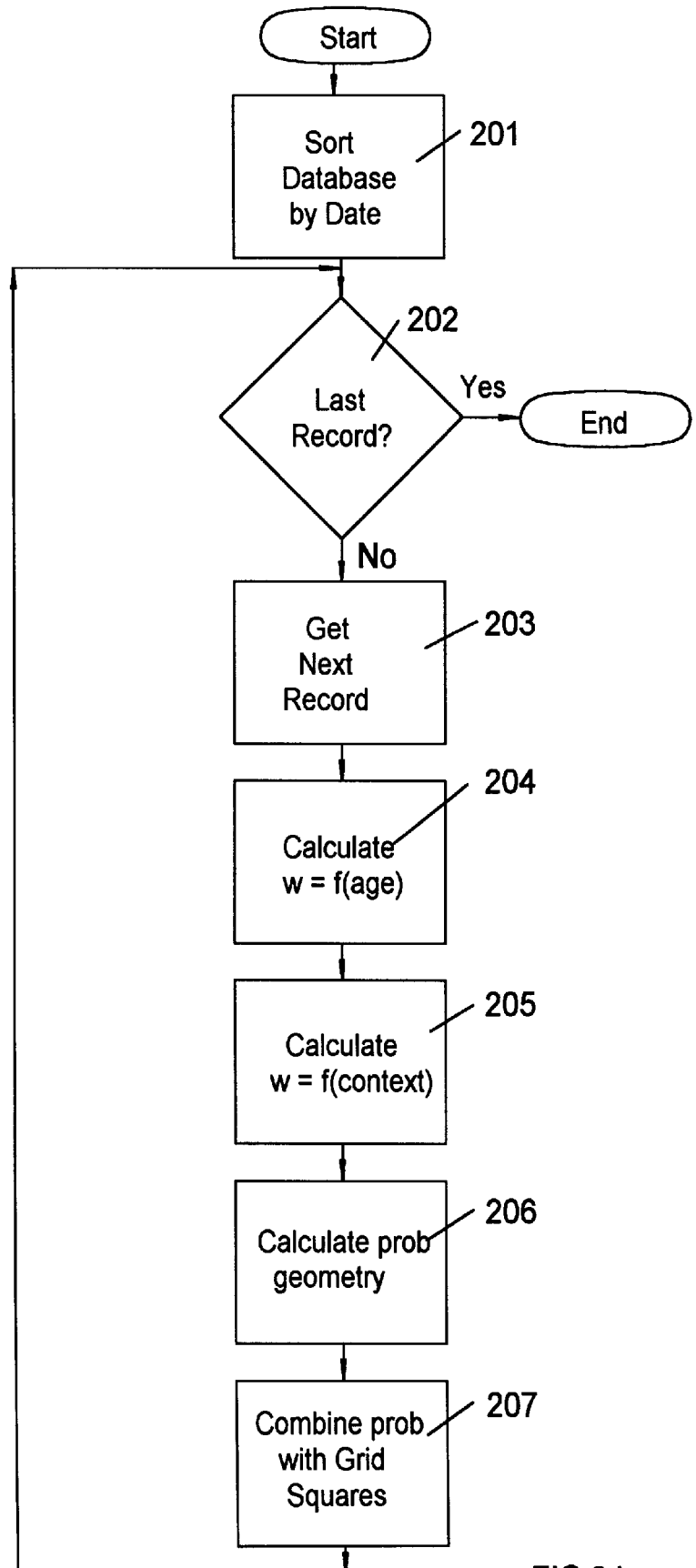
FIG. 34 shows a simplified flowchart for generating 2-D map from database of collision records.

FIG. 34 shows a flowchart of an example algorithm used to convert the database of collision records into a grid map of obstacle probabilities. The algorithm begins in step 201 by sorting collision records in the database according to the time and date of the collision so that the most recent events are processed first. Steps 203 and 202 cause the algorithm to loop over the entire database by selecting the next record and testing for the final record, respectively. In step 204 a weight w is calculated for each record based on its age. Mapping subsystem 153 uses a simple decaying exponential weighting function given by:

$$w = e^{-kt}$$

where t is the age of the record in days, and k is a predefined constant (typically, 0.1<k<1). This weighting function has the desired effect of discounting collision records which have happened in the more distant past. The outcome of the algorithm is not heavily dependent on the particular weighting function used, and other functions with similar proper ordinary skill in the art. In step 2 to persons of ordinary skill in the art. In step 205, the weight w is adjusted according to several heuristic rules which depend on ancillary context information. For example, w is reduced by a predefined factor if the obstacle was detected by whisker sensors 47, which are more apt to detect transient obstacles such as clothing or toys. Another heuristic rule increases w by a predefined factor if the current collision record event's position lies along a line segment which connects nearby high-probability grid squares. This rule expresses algorithmically the prior knowledge that many obstacles, such as walls and large pieces of furniture, tend to have linear edges. The result of steps 204 and 205 is a value of w, between 0 and 1, which expresses the probability that the obstacle which caused the collision record is still present in the environment. In the next step 206, the total probability w is divided across grid squares in the neighborhood of the collision record location, as shown in FIGS. 35A–35D and described below. Each affected grid square is assigned an incremental grid probability $p_i$, which represents a localized portion of the total obstacle probability w associated with the current collision record. All of the incremental grid probabilities $p_i$ must sum to the aggregate obstacle probability w, as given by:

$$w = \sum_i p_i$$

In step 207, the incremental additional probabilities $p_i$ due to the current collision record are combined with a running aggregate probability $P_A$ associated with each grid square. For any grid square, the probabilities are combined using the formula:

$$P_{A(n)} = (1 - (1 - P_{A(n-1)})(1 - P_i))$$

This algorithm will terminate when every collision record in the database has been processed. The result will be a map of probable obstacle locations of the type shown in FIG. 33B.

Figure 35C:
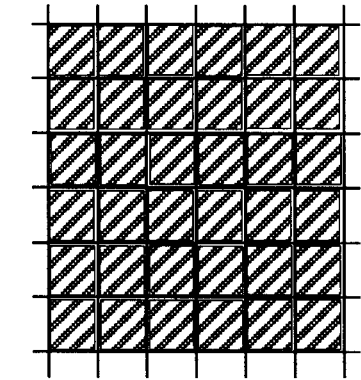
FIGS. 35A–35D show a distribution of obstacle probability w across neighboring grid squares.
Figure 35D:
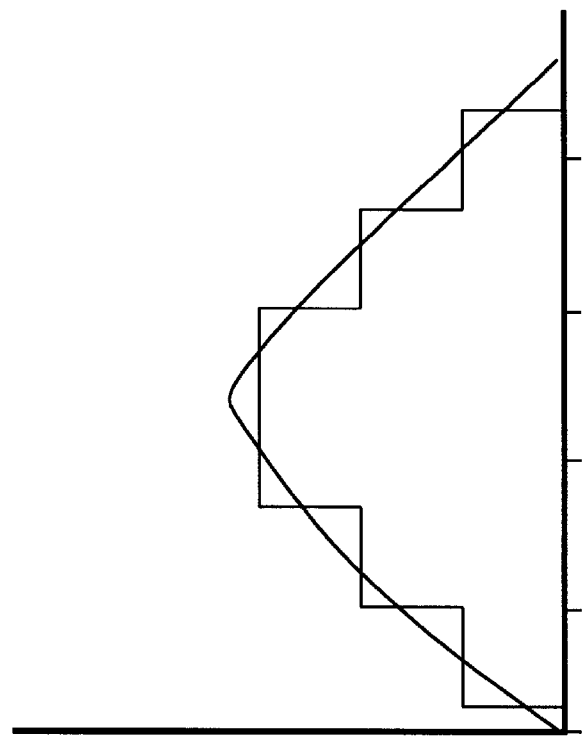
Figure 35A:
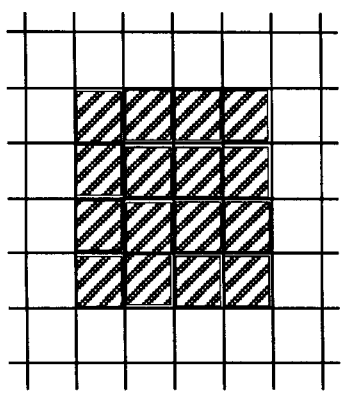
Figure 35B:
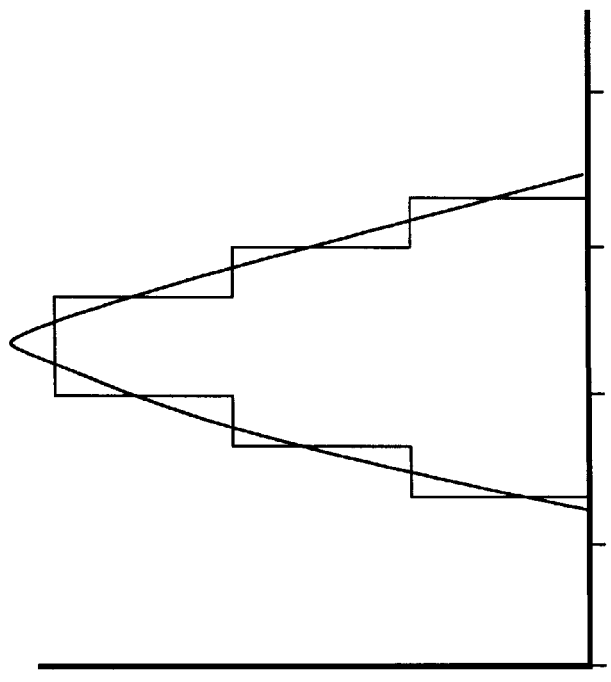

FIGS. 35A–35D show in more detail the operations executed in step 206 of FIG. 34. The probability w associated with each collision record is distributed across the grid squares in the region of the collision location. The size of the affected region depends on the estimated error 159 in the calculated vehicle location 152 at the time of the collision.. If the location of vehicle 1 was known very accurately (estimated error 159 was small), then the weight w is distributed over a small region. FIG. 35A shows a map of distributed probabilities $p_i$, with each square shaded according to the value of $p_i$ assigned to that location. FIG. 35B shows a two-dimensional section through the region of FIG. 35A. FIGS. 35C–35D show corresponding probability distribution assignments for a different collision record with a larger estimated error 159. In both cases, all of the $p_i$ values assigned to the nearby grid squares must sum to w, the total probability associated with the collision record calculated in the previous steps. For the system of the preferred embodiment, the shape of the distribution is a discrete Gaussian with a standard deviation given by the magnitude of the estimated error 159, though many other localized distributions will produce similar results.

Figure 36:
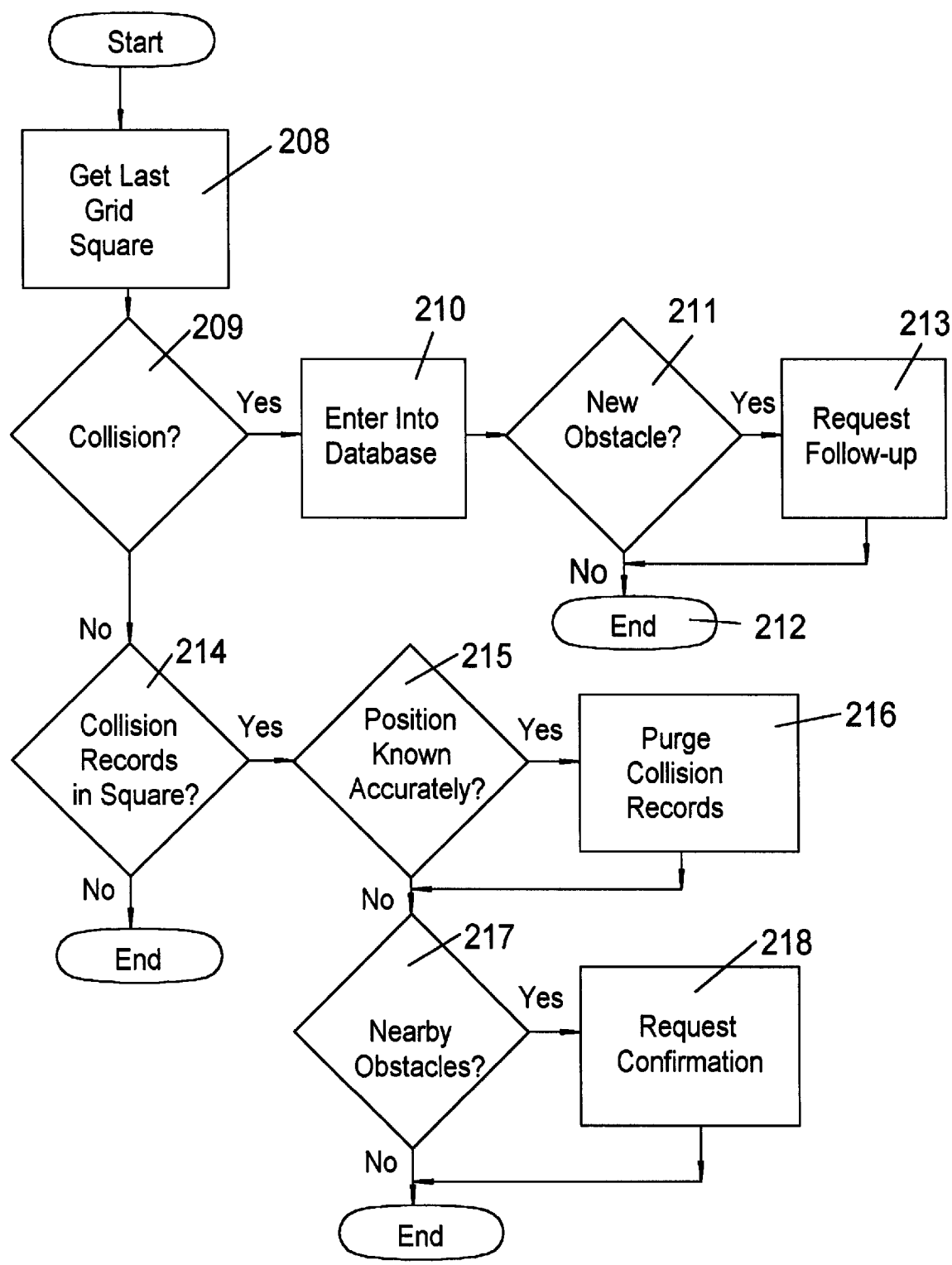
FIG. 36 shows a simplified flowchart for entering new collision records into mapping database.

FIG. 36 shows a flowchart of the algorithm used to update the collision record database as vehicle 1 moves through the working environment. This algorithm is invoked each time the vehicle's estimated position 152 passes from one grid square to another. In step 208, mapping subsystem 153 calculates the location of the grid square through which vehicle 1 has just passed. Step 209 checks to see if vehicle 1 collided with an obstacle while in that grid square. If so, control proceeds to step 210, which enters the new collision record into the database. Next, in step 211, the collision event is classified as either a "new obstacle" or an "old obstacle," according to the absence or presence of any prior collisions recorded within that grid square. If the obstacle is not deemed novel, the algorithm ends in step 212. If the obstacle is novel, control flows to step 213, which requests a follow-up visit to the obstacle from the path-planning subsystem 155. This request will result in a subsequent traversal of the grid square in question at a later time to confirm the presence of the new obstacle. If, in step 209, it was determined that no collision occurred as the vehicle passed through the square, control flows to step 214. Step 214 checks the database for any previously-recorded collisions within the grid square. If any previous collisions are found, control flows to step 215, which checks the current estimated error 159 in the calculated vehicle location 152. If the calculated position 152 is known accurately (i.e. if magnitude of estimated error 159 is lower than a threshold), then step 216 is executed. If the algorithm has arrived at step 216, then vehicle 1 is confidently known to have traversed the grid square without encountering any obstacles, a fact which stands in contradiction to stored records of collision events at that location. In this case, the weight of the more recent experience prevails, and the obstacle is presumed to have been moved or eliminated from the environment. Collision records corresponding to the grid square in question are purged from the database. After the database has been purged, or if the present location is not known with sufficient accuracy, control passes to step 217. Step 217 checks neighboring grid squares for obstacles. Collision events in adjacent squares may be associated with the same obstacle which has been determined to have been removed. In step 218, the algorithm requests a visit to neighboring grid squares from the path planning subsystem in order to confirm the presence of previously-recorded obstacles.

The set of simplified algorithms described above is but one of many methods for generating a two-dimensional map based on a statistically significant number of point observations. Other equivalent methods will readily suggest themselves to persons of ordinary skill in the art. Any system which stores a large database of many, or all, collision events, and subsequently combines them to form a map of the working environment, is constructed within the spirit of the present invention.

Mapping Reference Reflector Locations

Of special importance to the navigation and mapping system is the precise location of all reference reflectors 4 in the working environment. When the vehicle begins operating in a new environment, it will take special measures to determine the location of each new reference reflector detected by navigational scanner 44.

FIG. 37A shows a simplified plan view of an example room 219 with charging station 2 and two reference reflectors 220 and 221. Vehicle 1 begins its exploration from the docked position on charging station 2 as shown. In this simple example, it will already be within line-of-sight of both reflectors 220 and 221. Mapping subsystem 153 can immediately determine that the true position of reflectors 220 and 221 must lie somewhere along the two bearing lines 222 and 223, respectively. In order to fix the location of either reflector 220 or 221 the mapping subsystem 153 need only determine the distance to reflector 220 or 221 along its bearing line 222 or 223. The system of the preferred embodiment uses a combination of two techniques to accurately determine the distance to each newly-observed reference reflector. These techniques are (a) direct measurement, and (b) triangulation.

Consider first the technique of direct measurement. Suppose that mapping subsystem 153 first determines the distance to the first reflector 220 from charging station 2 (position 0,0) by direct measurement. Control program 16 will direct vehicle 1 to head directly towards reflector 220, traveling along line 222. Eventually, vehicle 1 will collide with the wall to which reflector 220 is affixed. When vehicle 1 arrives, mapping system 153 notes the net distance traveled by front wheels 50 (as measured by rotation sensors 56) and adds an appropriate adjustment for the size of vehicle 1 to calculate the location of reflector 220. Notice that this measurement is not prone to measurement errors in steering angle, since vehicle 1 can be continuously guided "down the beam" to the reflector 220 in a straight path. Any one such measurement is, however, prone to errors in the measured distance, but only those errors that accumulate over the single straight path used to locate reflector 220.

While calculating the distance to reflector 220 by direct measurement, mapping system 153 simultaneously measures the distance to the other reflector 221 by triangulation.

FIG. 37B shows the same room 219 of FIG. 37A, with the same two reflectors 220 and 221. At the starting point (charging station 2) of direct measurement path 222, navigational scanner 44 will detect the second reflector 221 at a certain bearing angle $\theta_1$. As vehicle 1 moves along line 222, the bearing angle to reflector 221 will change. When vehicle 1 finally collides with reflector 220, navigational scanner 44 records a second measurement $\theta_2$ of the bearing angle to reflector 221. By using the two measured bearing angles $\theta_1$ and $\theta_2$ combined with the distance traveled between the two measurements (the baseline distance), the position of the second reflector 221 can be accurately computed through standard techniques of trigonometry. Thus, by traversing path 222 between charging station 2 and reflector 220, mapping subsystem 153 can calculate accurate estimates for the locations of both reflectors 220 and 221. Mapping system 153 can confirm and refine these estimates by taking a second set of measurements traversing the path 223 from charging station 2 to the second reflector 221, this time measuring the distance to the second reflector 221 by direct measurement, and the distance to the first reflector 220 by triangulation. The results from this second independent set of measurements can be combined with the first (by simple averaging of coordinates, for example) to form improved estimates of the locations of both reflectors 220 and 221.

The example of FIG. 37B is simplified in that both reference reflectors 220 and 221 are visible from the vehicle's starting location at its charging station 2. In general, not all reference reflectors in the working environment will be visible from the starting location, but instead will be "discovered" as vehicle 1 explores the area. Each newly-discovered reference reflector can be categorized according to two classes: (a) the set of reflectors which share a region-of-visibility with a previously mapped reflector, and (b) the set of reflectors which do not. A reflector's "region-of-visibility" is defined as the area in the working environment inside of which navigational scanner 44 on the vehicle has an unobstructed line-of-site to the reflector.

Figure 38:
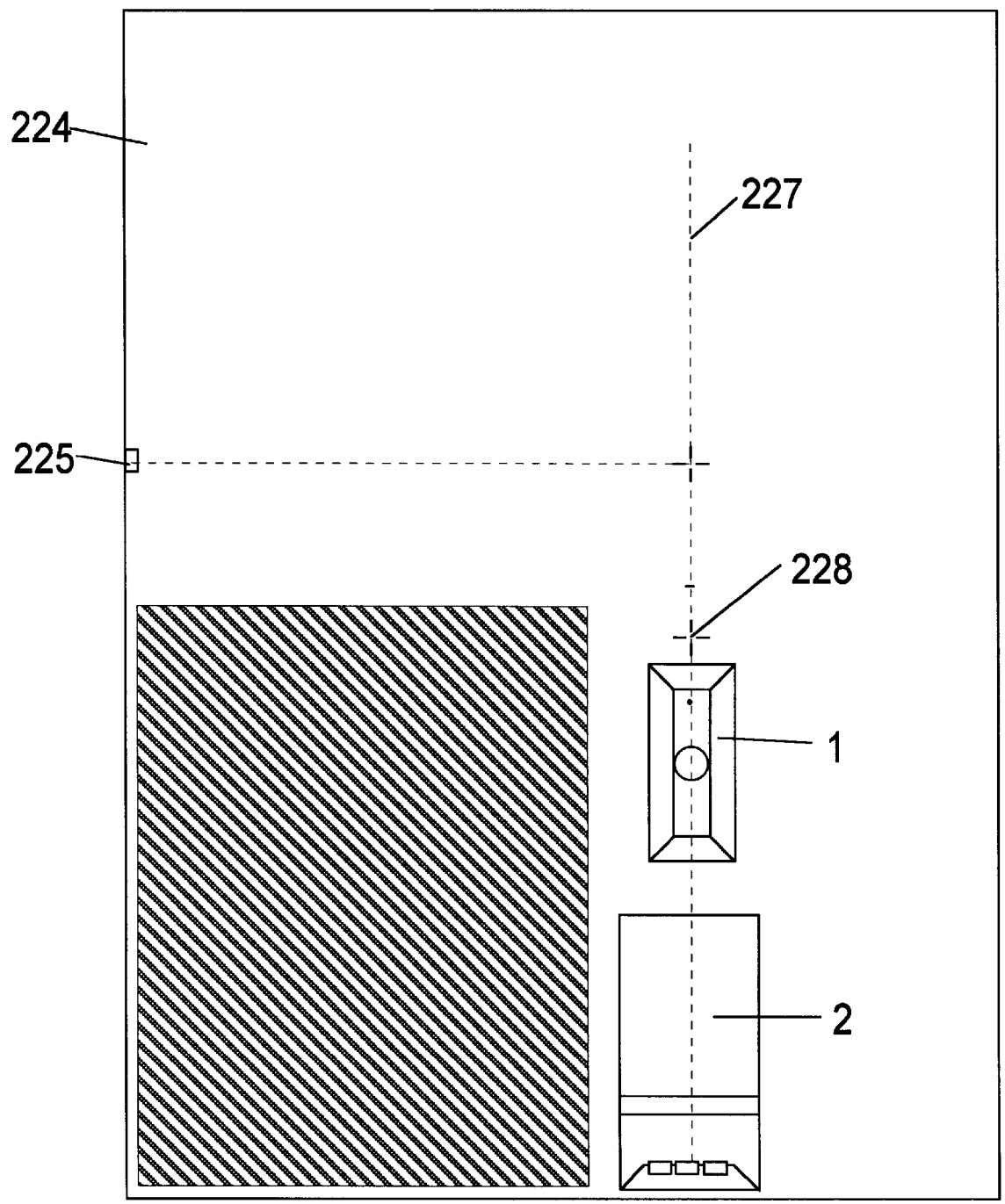
FIG. 38 shows a plan view of example room with charging station, on e reflector, and obstacle.

FIG. 38 shows a simplified plan view of a room 224 with a reference reflector 225 which is not visible from vehicle 1's starting location at charging station 2 (the line-of-sight is blocked by an obstacle 226), but does share a region-of-visibility with reflectors 200 affixed to charging station 2. When vehicle 1 starts exploring, it begins by moving away from charging station 2 along line 227. When vehicle 1 passes point 228 along this line 227, navigational scanner 44 will detect unmapped reference reflector 225. Mapping subsystem 153 can construct an estimate of the distance to newly-discovered reflector 225 by triangulation (as disclosed above) as vehicle 1 continues to move along line 227. Mapping system 153 can also confirm the position of reflector 225 by a method similar to the direct-measurement technique disclosed for the simple case above, but by following a two-segment path between charging station 2 and reflector 225 instead of a direct path. By repeating the above steps whenever navigational scanner 44 detects a new reflector, mapping subsystem 153 can "hopscotch" from reflector to reflector, using already-mapped reflectors to assist in determining the locations of new ones.

Some reflectors may not share a region-of-visibility with any previously-mapped reflectors. In such cases, mapping system 153 must rely to some extent on dead-reckoning to determine the position of the new reflector. Path-planning system 155 can calculate the most direct path through the blind zone that separates the new reflector from previous ones when initially mapping the reflector, thus minimizing accumulated odometry errors.

Accuracy in Mapping and Position Determination

The methods of position determination described above depend on an accurate map of the location of obstacles, boundaries, and reference reflectors in the working environment. The methods for generating this map depend on an accurate estimate of vehicle 1's position during the mapping process. Thus it would appear that the system must "pull itself up by its bootstraps" in order to form the map. Several characteristics of the present invention tend to overcome this problem.

First, mapping subsystem 153 and path-planning subsystem 155 use stylized methods, described above, in order to accurately determine the position of reference reflectors. These methods tend to be immune to errors in estimated steering angle, the principal source of errors in dead-reckoning, because they use navigational scanner 44 to guide vehicle 1 in straight lines toward or away from reflectors. Any error in the calculated position of a reflector is due either to errors in the distance estimates derived from wheel rotation sensors 56, or direct measurement error in the bearing angles themselves. Errors caused by inaccurate distance measurements fall into two categories: (1) systematic errors inherent in the rotation sensor mechanisms, and (2) random measurement-to-measurement fluctuations.

An important characteristic of the present invention is that systematic errors in the distance measuring equipment, caused by (for example) manufacturing variations in the diameters of the vehicle's wheels 50, do not interfere with correct operation of mapping subsystem 153 or position-determination subsystem 151. Such errors will cause the position-determination subsystem 151 to incorrectly estimate the distances between features of the environment; but as long as these estimation errors are consistent (i.e. systematic), they only amount to "measuring the room with a different yardstick." Since absolute accuracy in measuring the dimensions of the room are not important for tasks such as vacuum cleaning, systematic distance errors can simply be ignored.

The system of the preferred embodiment again takes advantage of the low incremental cost of mass-storage 20 on host computer 9 to further improve mapping accuracy. As discussed above, mapping subsystem 153 takes special steps to probe newly-encountered obstacles and to determine the location of newly-encountered reference reflectors. The result of this process will be a set of potentially-inaccurate estimates of the positions of these objects based on but a few observations. Later, as vehicle 1 moves through the working environment during its normal operation, it will continue to encounter already-mapped obstacles (either deliberately or by miscalculation) and it will continue to detect already-mapped reference reflectors. Because of the relatively low cost of mass-storage 20 on host computer 9, the mapping system 153 can afford to store data associated with each and every collision with every obstacle vehicle 1 ever encounters, and can likewise afford to regularly store a large number of routine observations and measured bearing angles to previously-mapped reference reflectors. Using standard statistical data-processing methods (simple coordinate averaging, for example), this body of accumulated measurement data can be used to form very accurate estimates of the locations of obstacles and reference reflectors in the working environment. It is an important feature of the current invention that, through storing and processing a large amount of data taken during its routine operation, mapping subsystem 153 will form an ever-improving map of its working environment.

Completing the Map

The system of the preferred embodiment takes advantage of the fact that it is not necessary to create a map of the entire working environment before useful cleaning can be accomplished. In particular, battery unit 48 which powers vacuum system 43 is capable of providing enough energy to clean some known, limited area on a single charge. Thus, once the system has "discovered" a section of the working environment as large as the one-sortie vacuum area, it can usefully begin its cleaning task.

Once mapping subsystem 153 has identified a suitable area to be cleaned, path-planning subsystem 155 directs vehicle 1 to make a "first pass" of the area, generally a boustrophidonic pattern without the vacuum system 43 running in order to locate any new obstacles. Path-planning subsystem 155 then makes any necessary modifications to the cleaning path and directs vehicle 1 to make a second pass of the area with the vacuum system 43 active. Once the charge in the vacuum system battery unit 48 is drained, control program 16 uses the rest of the charge in main battery unit 49 to further explore the environment, to confirm and refine the estimated positions of obstacles, and ultimately to return vehicle 1 to charging station 2. Using this method, the system can take days or even weeks to fully explore the working environment while still providing a useful cleaning function from the time of installation.

Path Planning

Path-planning subsystem 155 is responsible for calculating a course for vehicle 1 to follow through the working environment in order to carry out its various functions. Some functions of path-planning subsystem 155 are relatively straightforward, such as calculating a path which completely covers a region to be cleaned in a systematic pattern, or calculating a path which will carry vehicle 1 back to charging station 2 in order to recharge battery system 40. Other movements are planned in order to support the activities of position-determination subsystem 151 or mapping subsystem 153. For example, when mapping subsystem 153 detects a new reflector, path-planning subsystem 155 is responsible for calculating the path segments to be traversed by vehicle 1 in order to assist in determining the position of the new reflector (as described above under the section heading "Mapping Reference Reflector Locations").

The operations of path-planning subsystem 155 can be loosely subdivided into two categories, referred to herein as strategic and tactical path-planning. Strategic path planning is the process for determining where vehicle 1 should go in order to accomplish the purpose at hand (for example, cleaning or exploring a boundary). Tactical path-planning is the process by which the subsystem computes a set of path segments which will carry vehicle 1 to a given destination without colliding with any (mapped) obstacles.

Tactical path-planning can be accomplished according to any of several means known to persons of ordinary skill in the art. Given an origin point, a destination point, and a map of the known obstacles in the environment, path-planning subsystem 155 must calculate the shortest path for vehicle 1 to follow which does not intersect any mapped obstacles or boundaries. This is a classic problem in Artificial Intelligence which has received a thorough treatment in the literature, and for which there are many known good algorithms (dynamic programming, for example). "Artificial Intelligence" by Patrick Henry Winston (Addison-Wesley, 1984), a standard college textbook, devotes most of a chapter to the subject of path-finding.

Strategic path-planning is the process by which the system determines, to put it simply, where to go next. Strategy is determined by the system's operational priorities, which are (in order):

1. Maintaining the accuracy of estimated vehicle location 152.
2. Determining the location of newly-encountered reference reflectors.
3. Accomplishing the system's basic task (e.g. cleaning).
4. Exploration, including:
    (a) Determining the boundaries of incompletely-explored obstacles.
    (b) Mapping unexplored regions of the working environment.
    (c) Routine map refinement.

Maintaining an accurate position estimate is the top priority. If the vehicle's position is unknown, all is lost (for example, vehicle 1 will be unable to return to charging station 2). Path-planning subsystem 155 can assist position-determination subsystem 151 by calculating a path that will provide a navigational reference when the estimated position error 159 grows too large. This condition is flagged by position determination subsystem 151 as shown in step 139 of FIG. 30. In response, path-planning subsystem 155 computes the shortest path which will carry vehicle 1 into a navigational reference zone (a region from which at least two reference reflectors are visible), or which causes vehicle 1 to collide with an object at a known location. Path-planning subsystem 155 also computes a return path that will allow the system to resume its previous activities.

The discovery of a new (not-yet-mapped) reference reflector 4 is a momentous event in the life of the system. In general, the system will only encounter new reflectors during its initial exploration of the environment, or in the unlikely event that a user has later moved or added a reflector. In either case, the detection of a new reflector is a comparatively rare occurrence, and the determination of the exact location of each reflector is important to the system's correct operation. Consequently, path-planning subsystem 155 will suspend whatever activity is underway upon discovery of a new reflector and take the necessary actions to accurately determine its location. The process for determining the location of a new reflector (described above under the heading "Mapping Reference Reflector Locations") involves the deliberate movement of vehicle 1 either directly towards the new reflector (to calculate its position by direct measurement) or directly towards a second reflector (to calculate the first reflector's position by triangulation). Before these measurement movements can be undertaken, vehicle 1 must first obtain the best-possible navigational reference by, for example, colliding with a known reflector or docking with base station 2. Path planning system 155 is responsible for directing vehicle 1 through the indicated movements in order to establish the location of newly-encountered reflectors.

Path-planning subsystem 155 allocates time between priorities (3) and (4) according to a simple battery management strategy. Vacuuming is a battery-intensive activity, and the system is deliberately constructed so that battery unit 49 which powers the propulsion, control, and communication systems has a significantly longer operating time than battery unit 48 which powers vacuum system 43. Path-planning subsystem 155 divides each sortie into two distinct periods: a cleaning period and an exploration period. The cleaning period comes first, and continues until the vacuum battery unit 49 is exhausted. Vehicle 1 then spends the remaining charge in main battery 48 exploring the working environment according to priorities (4*a*) through (4*c*).

During the cleaning period, path-planning subsystem 155's first job is to identify a region to be cleaned. Vacuum battery unit 48 has a predictable maximum operating time, and vehicle 1 moves at a predetermined velocity while carrying out its cleaning task. These limitations, combined with the width of vacuum intake 65 and the desired amount of overlap between cleaning passes, determines the maximum area of the working environment that can be cleaned on a single charge of battery unit 48. For example: if vacuum battery unit 48 has a 20-minute lifetime, vehicle 1 traverses the floor at 30cm/sec, vacuum intake 65 is 25cm wide and there is 5cm of overlap between passes, then vehicle 1 would be able to clean a 72 square-meter area on a single charge. Path planning subsystem 155 starts by identifying the region or regions of the operating environment which have least recently been cleaned until the total area reaches 72 square meters. The resulting area, which may or may not be broken into noncontiguous regions, constitutes the Area To Be Cleaned (ATBC) on the current sortie. The tactical part of path-planning subsystem 155 calculates a set of path segments which avoid all known obstacles and which cover the entire ATBC in a boustrophidonic scan pattern according to the standard path finding techniques described above. The tactical part of path-planning subsystem 155 also calculates the best path for vehicle 1 to take from charging station 2 to an entry point of the ATBC.

The strategic part of path-planning subsystem 155 directs vehicle 1 to make two passes through the ATBC according to the calculated area-covering pattern. The first pass is conducted at a somewhat higher speed, and without vacuum system 43 running. The first pass allows the system to discover any new obstacles in the environment and adjust the area-covering path accordingly. Vehicle 1 actually cleans the ATBC on the second pass (along the adjusted path) with vacuum system 43 running.

Upon the conclusion of the cleaning period, path-planning subsystem 155 is free to direct exploration of the working environment using the remaining charge in the main battery unit 48. According to priority (4a) above, path planning subsystem 155 checks to see if there are any obstacles that have not yet been completely mapped. An obstacle (or boundary) is deemed "completely mapped" if the distance between recorded collisions around its entire perimeter is nowhere greater than the width of vehicle 1. If there is a gap in the record of collisions around an obstacle's perimeter, path planning system 155 will calculate a course which carries vehicle 1 through the center of the gap. If vehicle 1 passes through the gap without colliding with the obstacle, then the system has found a route through (or into) the obstacle. Usually the system will register the expected collision with the obstacle, thus improving its knowledge of the obstacle's extent.

If all of the known obstacles and boundaries in the environment have been completely mapped, path-planning subsystem 155 can direct vehicle 1 to set off into terra incognita, beyond the limits of the current map, according to priority (4b) above. Vehicle 1 can thus continue to discover new reflectors, obstacles, and clear regions until the charge in main battery unit 48 is nearly exhausted. When main battery unit 48 starts to run low, path-planning subsystem 155 directs vehicle 1 to return to charging station 2, thus ending the sortie.

After some number of days or weeks of operation, the system will have fulfilled priorities (4a) and (4b): the perimeters of all known obstacles will have been completely mapped, and the mapped region will be entirely surrounded by boundaries and obstacles. Apart from the addition, removal, or movement of obstacles within the environment (which will again trigger activities (4a) and (4b)), the system's exploration task is complete. What, then, is the best use of the remaining charge in main battery unit 48 at the end of the cleaning period? The system of the preferred embodiment uses the additional exploration time to continuously refine its map of obstacles and reference reflectors. Path planning subsystem 155 directs vehicle 1 to "make the rounds" of all the previously-encountered reflectors and obstacles (with special attention to corners of obstacles). Mapping subsystem 153 adds the resulting series of reflector observations and obstacle collisions to its database, thus continuously improving its map by averaging together a growing body of observed data.

System Features Adapted for Home or Office Use

Keep-Out Reflectors

The system of the preferred embodiment includes features for handling certain special requirements of the home or office environment. Users may, for example, wish to mark "prohibited areas" into which vehicle 1 should not travel. For this purpose, the system is delivered with a plurality of special "keep-out" reference reflectors 5 which are distinct from the standard set of navigational reflectors 4 described above and are clearly marked as such for the benefit of the user. Physically, keep-out reflectors 5 differ from standard navigational reflectors 4 in width. For example, the keep-out reflectors 5 may be 50% wider than the standard navigational reflectors 4 (1.5cm wide vs. 1cm, respectively). The process for identifying and mapping reflectors (described above) naturally includes moving vehicle 1 as close as possible to a newly-discovered reflector. When vehicle 1 is very close to a reflector, the width of the "return spike" in the photodetector response will give an indication of the width of the reflector strip. For example, when navigational scanner 44 is located 10cm away from a 1cm-wide reflector strip, the reflector subtends a 6° arc in the scanner's field of view. At the same distance, a 1.5 cm-wide reflector subtends a 9° arc. Thus sensor-processing subsystem 149 can readily distinguish between standard reflectors 4 and keep-out reflectors 5. Instructions accompanying keep-out reflectors 5 direct the user to place them in pairs to form boundaries through which vehicle 1 will not cross. Path-planning system 155 will treat line segments connecting any pair of neighboring keep-out reflectors 5 accordingly. Users can thus prevent vehicle 1 from entering a room, for example, by placing a keep-out reflector S on either side of its entrance.

Figure 40:
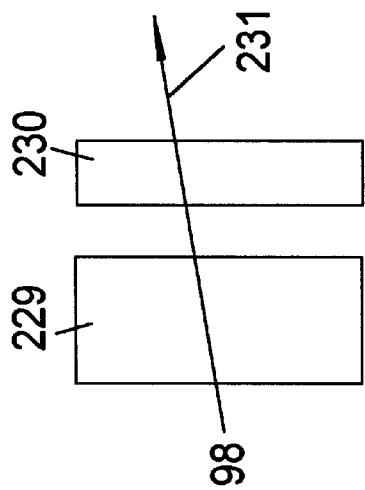
FIG. 40 shows a frontal view of wide and narrow reflectors showing scanning beam path.
Figure 41:
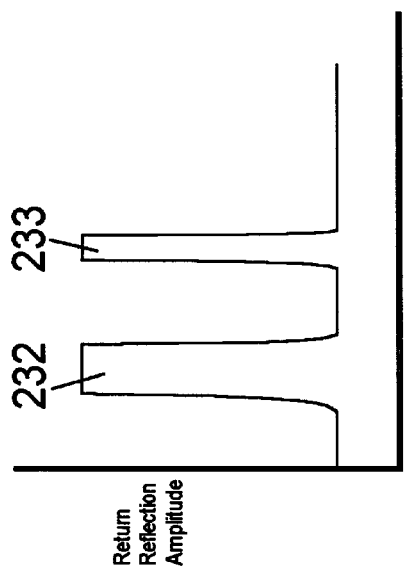
FIG. 41 shows an x-y plot of scanner detection amplitude vs. time for wide and narrow reflectors.
Figure 39:
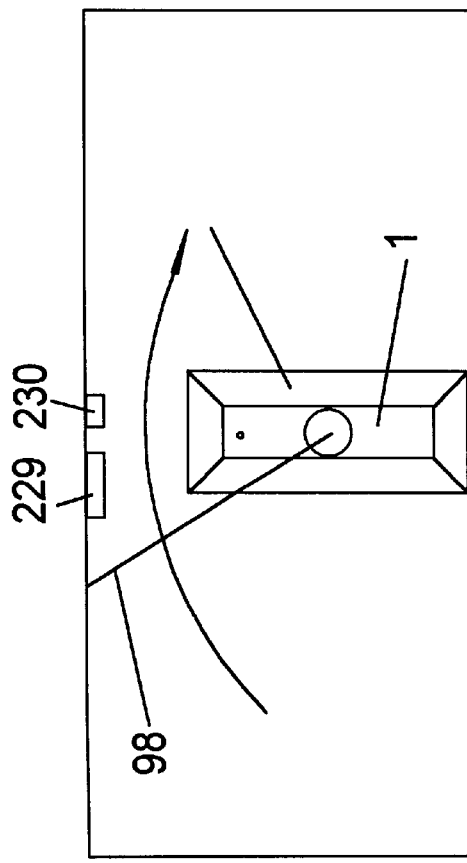
FIG. 39 shows a plan view of an example room with two reflectors, one wide and one narrow.

FIG. 39 shows a simplified (improbable) arrangement of two reference reflectors, one wide reflector 229 and one narrow reflector 230, with vehicle 1 located in close proximity. FIG. 40 shows the beam path 231 traced by navigational scanning beam 98 as it crosses first wide reflector 229, then narrow reflector 230. FIG. 41 shows the time-varying return signal amplitude recorded by photodetector 86 when vehicle 1 is positioned as shown in FIG. 39. The return spike 232 caused by the wide reflector 229 is distinctly wider (longer in temporal duration) than the return spike 233 from the narrow reflector 230.

Figure 42:
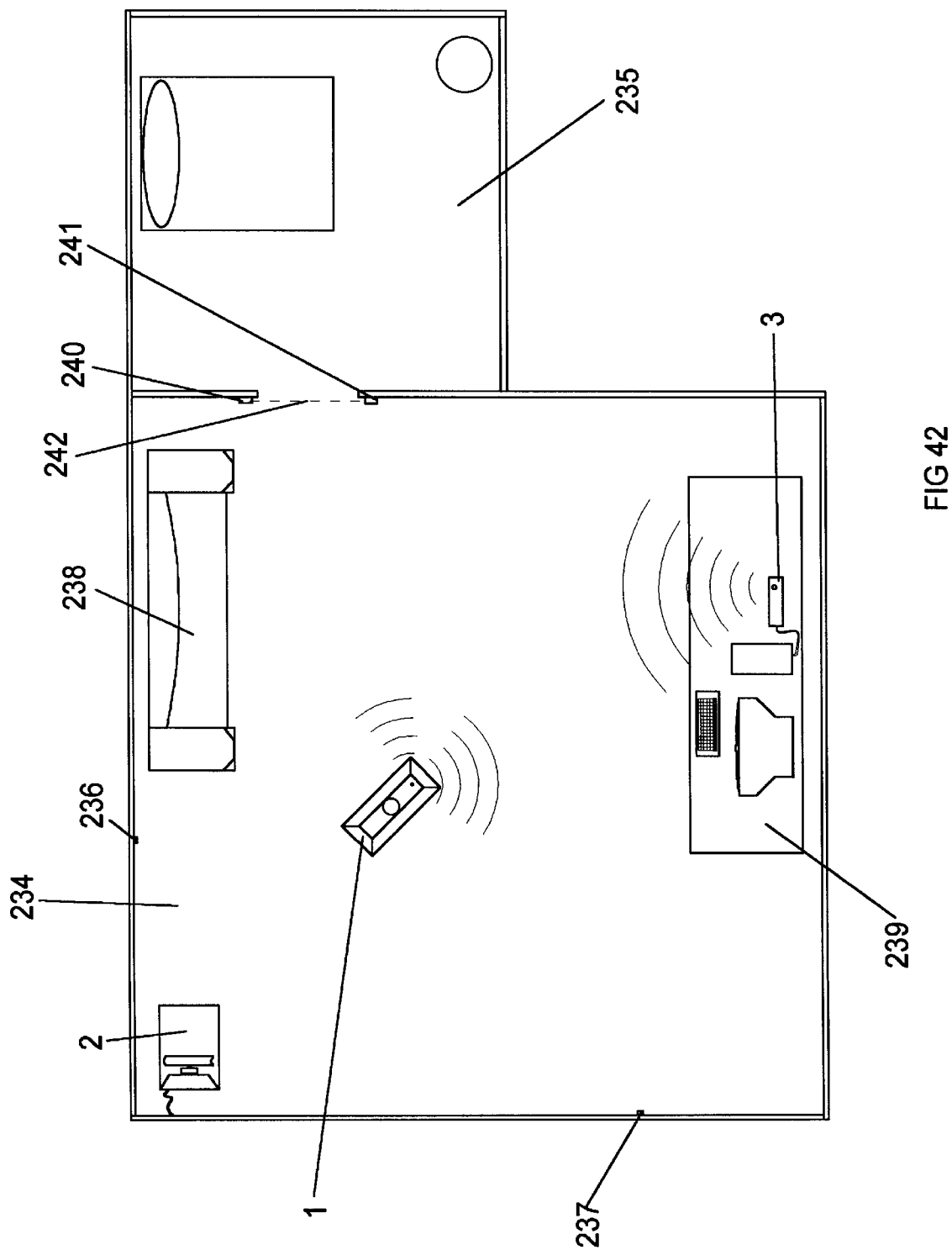
FIG. 42 shows a plan view of example rooms showing placement of keep-out reflectors.

FIG. 42 shows a plan view of a simplified example region which includes a typical application for keep-out reference reflectors 5. The region is divided into two rooms 234 and 235 separated by an open passageway. In this example, the user wishes vehicle 1 to clean room 234, but to avoid room 235. Room 234 includes normal reference reflectors 236 and 237, charging station 2, and various articles of furniture 238 and 239. In accordance with the installation instructions, the user has placed two wide keep-out reflectors 240 and 241 on either side of the passageway into room 235, thereby marking it as a prohibited area. When mapping subsystem 153 discovers the two reflectors 240 and 241, it will recognize them as keep-out reflectors 5 by their width and record them as-such in the map. Thereafter (unless the reflectors 240, 241 are subsequently removed) path-planning subsystem 155 will never direct vehicle 1 to pass through the line 242 which connects the two reflectors 240 and 241; it will treat the line as an impassable obstacle.

In an alternative embodiment, keep-out reflectors 5 could be made to appear distinct by printing on their surface a characteristic pattern of opaque and reflective regions. An example of such a pattern is a black stripe printed vertically down the middle of the reflective strip. Such a striped reflector would produce a "double-spike" response from the navigational scanner 44, which can be interpreted and classified by the sensor-processing subsystem 149 as a keep-out reflector.

Unanticipated Displacement

A self-running vacuum vehicle deployed in homes must be able to deal gracefully with interference by pets and children. In particular, the vehicle may be bodily picked up and moved to another location not under its own power (by a dog, child, or even an adult). Position-determination subsystem 151 must be able to detect such a condition, and, if detected, somehow determine the vehicle's new location. The system of the preferred embodiment incorporates a simple sensor which detects whether vehicle 1 is sitting on its suspension 38 (a simple microswitch attached to suspension member 52, for example). If vehicle 1 is lifted off the floor, position-determination subsystem 151 responds by invalidating the estimated vehicle position 152 and executing a special "seek" mode. In seek mode, position-determination subsystem 151 will attempt to reestablish the vehicle's position presuming no knowledge about its past location. In general, this can be accomplished by finding any two reference reflectors 4 and accurately measuring the distance between them. In most cases, by comparing the measured distance and the computed distance between pairs of reflector locations stored in the map database, the identity of the two reflectors can be established In ambiguous cases wherein the measured distance agrees with the computed distance between more than one pair of stored reflector locations, finding and measuring a third reflector will usually resolve the ambiguity.

In certain pathological cases (for example, if all the reflectors have been deliberately placed at regular intervals around the perimeter of a circle), this seek strategy will fail: the result of any set of pair-wise distance measurements will always be ambiguous. Alternatively, the vehicle 1 may simply have been locked in a closet with no reference reflectors at all. If the seek mode fails, the system alerts the user (as described below under the section heading "User Interface Functions") and shuts down.

Entertainment Functions

Consumer acceptance of computers into the home has come about in large part due to the entertainment capabilities of modern computer systems. Multimedia software, games, and various on-line recreational services continue to grow in popularity with home computer users; increasingly, families and individuals have come to expect their computers not only to perform useful tasks, but to entertain them while doing so. A distinguishing characteristic of the current invention is a variety of subsystems and functions intended for the information, amusement and entertainment of the user while the system carries out its task.

Often, the user may configure the robot system to go about its task at night (or other times when the working environment is vacant). In such situations, the entertainment functions will be of little or no interest. A feature of the robot system of the preferred embodiment is the inclusion of a "run now" function which can be invoked either by pressing a button on vehicle 1 or by executing a command in control program 16. When selected, vehicle 1 will immediately begin a cleaning sortie, temporarily overriding any deferred-cleaning schedule presently in effect. Users may invoke this feature if, for example, they simply wish to watch the robot system operate.

Vehicle Behavior

If the user has so selected, the robot system will execute behaviors according to a "personality profile" as it goes about its cleaning, navigation, and exploration tasks. These behaviors, commanded by the control program 16 on host computer 9, include sound output from audio speaker 45 located on vehicle 1 in conjunction with various vehicle movement patterns, some of which are executed for the sole purpose of amusing onlookers. Audio output from speaker 45 may include, but is not limited to, synthesized and/or digitized voice and "sound effect" samples. Control program 16 may command vehicle speaker system 45 to play a voice sample when, for example, vehicle 1 collides with an obstacle. The voice sample could (for example) be an impersonation of Moe Howard saying "OW!" or Prince Charles saying "Pardon me, madam." By combining suitable sound samples and vehicle movement patterns, control program 16 can create for onlookers the impression of a vehicle personality which is, for example, happy, sad, aggressive, lazy, frantic, paranoid, irritable, or myriad other anthropomorphic characteristics. Upon installation, the user can assign a personality to the system by selecting from a list of available options (for example, a menu of well-known celebrities). The user can also reconfigure or override the personality at a later time by manipulating options via a standard graphical user interface.

Carpet Patterning

Premium housecleaning services sometimes add a flourish to their work by creating intricate regular patterns in the nap of the carpet using a traditional manual vacuum cleaner. By carefully controlling the orientation of the beater brush and the direction of movement, a skillful operator can "pant" crisscross, circular, or even floral patterns in the carpet.

Vehicle 1 can be directed to traverse its cleaning area in an arbitrarily complex pattern by a suitable control program running on the host computer. The system of the preferred embodiment includes a menu of pre-designed patterns, any of which can be selected for any room in the working environment (the default pattern being "none"). If a pattern is selected, path-planning subsystem 155 will direct vehicle 1 to traverse the indicated region according to a predefined path such that the nap of the carpet is combed into the desired pattern.

The carpet-patterning feature of the system can only be used on carpeted areas with a deep enough pile to retain an oriented texture. The system of the preferred embodiment limits the application of patterning to areas within line-of-sight of at least two reference reflectors, since pinpoint navigation is necessary to generate a satisfactory result.

User-Interface Functions

Control program 16 has access to all of the user interface means of host computer 9 including, for example, keyboard 18, pointing device 19, and a display 10. Control program 16 also has access to a wide variety of facilities and support functions provided by operating system 17. OS-provided facilities include task-scheduling, time-of-day, and a wealth of functions for displaying and manipulating the familiar elements of a modern graphical user interface (menus, windows, scroll bars, icons, bitmaps, etc.). Thus it is convenient and natural to provide a familiar, standard, full-featured, and consistent graphical user interface which allows the user to control the operation of the system.

The user interface subsystem 158 provides a variety of control and information functions, primarily including:

1. Allowing the user to view and modify the system's operating (cleaning) schedule.
2. Allowing the user to view a map of the working environment.
3. Allowing the user to annotate and modify the map.
4. Allowing the user to view the system's planned cleaning and exploration paths.
5. Allowing the user to influence or modify the planned path.
6. Allowing the user to command the system to immediately clean a certain region.
7. Providing the user with on-line documentation which describes the system and its operation.
8. Alerting the user in case the system needs operator intervention.

This section discusses each of these functions in detail.

Controlling the Cleaning Schedule

The problem of best presenting and allowing the modification of date-and-time scheduling information using a graphical user interface (GUI) has been thoroughly addressed in the prior art. A wide variety of highly refined Personal Information Management (PIM) software products are commercially available at the time of this application, each of which include (by necessity) windows, screens, and controls that allow users to view and manipulate daily schedule information. Two examples of such products include "Schedule+," produced by the Microsoft corporation of Redmond, Wash. and "Ecco Pro" produced by the NetManage corporation of Cupertino, Calif. The system of the preferred embodiment uses the well-developed methods and practices of existing scheduling software to display and control the system's cleaning schedule. The user can, for example, display a monthly calendar that includes a brief summary of the cleaning activity for each day (e.g. "Clean 12:30–1:00AM"). By well-established means, a user can modify this information or display the schedule for any day in more detail. The implementation specifics of the scheduling user interface are not particularly important, as long as the system provides for clear and simple manipulation of the scheduling data, accessible to ordinary non-technical end users. Persons of ordinary familiarity with popular software programs can find a rich variety of methods and techniques which accomplish this purpose.

Viewing the Map

Figure 43:
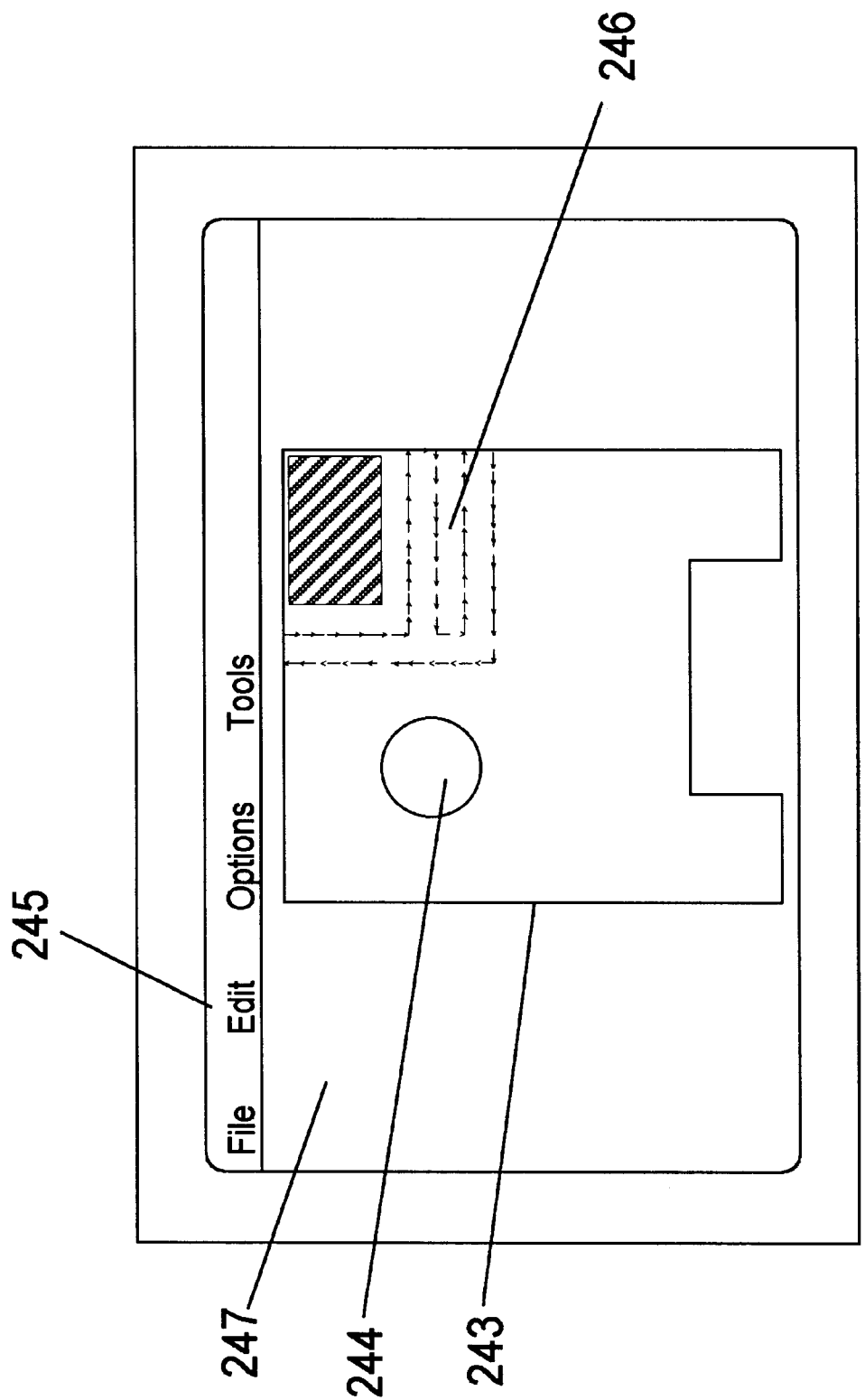
FIG. 43 shows an example software window showing planned path, mapped boundaries, and obstacles.

Users may wish to view the map of the working environment generated by mapping subsystem 153. User-interface subsystem 158, when so requested, can display a window which contains a graphical depiction of the current map. This depiction is based on the grid-square/probability representation (per FIG. 33B) which mapping subsystem 153 maintains as part of its normal operation. FIG. 43 shows an example map window displayed by user interface subsystem 158. The boundaries 243 of the working environment, and the obstacles 244 therein, are shaded according to the calculated probabilities at the corresponding grid squares. From this visual representation a user can see what objects vehicle 1 has encountered, and what regions the system has explored. In addition to the location of obstacles and boundaries, the map display window can indicate which regions have most recently been cleaned (by, for example, displaying regions in different colors).

Modifying the Map

On the map display window, an Edit menu 245 includes commands that allow the user to annotate regions on the map. The user can select regions on the map by "dragging"to create a rectangular box in the window 247, and then assigning one of several properties to the indicated region. Predefined properties include "Keep out," "Clean often," "Move carefully," and "Clean with pattern." Regions marked as "Keep out" are subsequently avoided by path-planning subsystem 155. Regions marked "Clean often" are visited more frequently. Users may wish to mark hallways, dining areas, or other high-traffic regions as "Clean often." If a region is marked "Move carefully," path-planning subsystem 155 will direct vehicle 1 to move very slowly through the region. Users might mark a region "Move carefully" if it contains delicate furniture, a grandfather clock, or other such sensitive habiliments. Regions which are to be cleaned so that the nap of the carpet forms an attractive pattern (as described above under the section heading "Entertainment Functions") are marked with the "Clean with pattern" property. The user is then presented with a menu of available patterns for the system to trace in that region. The particular map modification and annotation functions described above are meant to be illustrative, but not limiting. Any similar system which uses a host computer to allow display and manipulation of mapping data through a GUI is constructed within the spirit of the present invention.

Displaying and Modifying the Path

If the user so requests, the system can superimpose on the displayed map an indication 246 of the planned path for the next sortie. The intended path is displayed as a series of connected line segments. By "dragging" selected segments or groups of segments, the user can alter the planned path.

Immediate Cleaning

In addition to regular, scheduled cleaning tasks, manual vacuum-cleaning systems are often used to clean up accidental messes. Food spills, broken glass, tracked-in dirt, and other similar messes may sometimes require immediate cleanup. The system of the preferred embodiment addresses this need via its "clean now" feature. If an area needs immediate cleaning, the user can indicate this area on the map display, then select "clean now" from a command menu. Vehicle 1 will execute a cleaning sortie at once with the indicated area as a destination. Using this feature, a user can effortlessly clean up messes like broken glass without risking injury.

Requests for User Intervention

User-interface subsystem 158 informs the user if the automatic vacuum-cleaning system requires any manual intervention. Such situations include, for example, vehicle 1 becoming stuck, vehicle 1 becoming lost (i.e. the system being unable to determine the vehicle's position), main battery 49 running out, and various other distress conditions. Under such circumstances, the user-interface subsystem 158 displays an "alert box" (a GUI element well-known in the prior art) directing the user to dock vehicle 1 to charging station 2. The user will discover the message the next time he or she uses computer 9. Apart from distress conditions, user-interface subsystem 158 can inform the user if the system needs such routine maintenance lubrication or replacement of vacuum-cleaner bag 70.

The system of the preferred embodiment can also request intervention if the placement of reference reflectors 4 violates certain minimum requirements. Recall that the user must decide where to place reflectors 4 when installing the system. The operating instructions include simple guidelines that will tend to produce a satisfactory set of navigational references, but the user may misunderstand or ignore these instructions. After the system has explored the environment enough to have identified room boundaries and reference reflector locations, it may discover that the user has placed the reflectors poorly.

FIG. 44 shows an example of a room 248 wherein the user has selected a particularly bad arrangement of the three reference reflectors 249, 250, and 251. Reflector 249 is located behind chair 252 such that it cannot be seen from most of the room 248. Similarly, reflectors 250 and 251 are hidden from most of the room by desk 253. Additionally, reflectors 250 and 251 are placed too close together. For straightforward reasons of plane geometry, the navigational utility of any pair of reflectors is greatly reduced if the distance between them is small.

If the system of the preferred embodiment were unlucky enough to be installed in the manner shown in FIG. 44, it would proceed to explore the environment, finding in due course reflectors 249, 250, and 251. Upon locating any new reflector, the system uses several simple checks to be sure that the reflector has been properly placed. For example, one such check decides whether the new reflector is too close to (i.e. less than some predefined distance from) another reflector. If the system discovers that two reflectors are too close together, or that a reflector is only visible from a small area, then user-interface subsystem 158 will alert the user.

It is not enough to merely inform the user that reflectors have been poorly placed; the user-interface system 158 must provide some sort of remedial suggestion. When issuing its alert, user-interface subsystem 158 presents a graphical map of the working environment with an improved set of reference reflector locations indicated thereon. The system chooses these improved locations according to a simple set of rules (for example, placing reflectors as close as possible to corners without being occluded by an obstacle). FIG. 45 shows the same room 248 with three improved reflector locations (254, 255, and 256) indicated. The user may choose to relocate the reflectors (249, 250, and 251) according to the system's recommendations, or may choose to ignore the advisory altogether. If the advisory is ignored, the system will not alert the user about this condition again.

SUMMARY, RAMIFICATIONS, AND SCOPE

The reader will see that the self-running automatic cleaning system of this invention can be constructed for very low cost from simple, well-proven components. Furthermore, by using the idle computation and storage resources already present in many homes and offices, the system can include sophisticated navigation, mapping, control, and scheduling functions that allow it to carry out its cleaning task unobtrusively, conveniently, and reliably. By taking advantage of the extremely low incremental cost of information storage associated with modern PC hard-disk drives, the system implements an automatic map-generation function which avoids the necessity of any laborious or inconvenient pre-programming by an operator. With the addition of entertainment functions, the system can be not only inexpensive, effective, reliable, and convenient, but fun, too. In short, the present invention can fulfill the promise of AGV technology and robotics in general: To create ubiquitous cleaning robots which reduce at least some of the drudgery in the lives of ordinary people.

What is claimed:

1. A computer peripheral system for carrying out at least one task in a substantially planar region of a working environment, said computer peripheral system comprising:

(a) a guided vehicle comprising:
  (1) a body,
  (2) a propulsion means,
  (3) a steering means,
  (4) an actuation means for carrying out said at least one task,
  (5) an energy storage means,
  (6) a plurality of sensing means which produce sensor signals corresponding to detection of objects in said working environment and status signals corresponding to the operation of the systems within the vehicle,
  (7) a communication means for receiving commands and transmitting data across a bi-directional communication link,
  (8) a control means which directs said propulsion means and said steering means in response to said commands received via said communication means,
(b) a host interface module comprising:
  (1) a connection means for interfacing with a host computer,
  (2) a means for relaying commands from said host computer to said communication means on said vehicle,
  (3) a means for relaying said sensor signals and said status signals from said communications means on said vehicle to said host computer,
(c) a charging station comprising:
  (1) a docking means for coupling to said vehicle,
  (2) a recharging means for replenishing said energy storage means in said vehicle,
(d) a system control apparatus comprising:
  (1) an installation means for loading a control program onto said host computer,
  (2) a sensor processing means for acquiring said sensor signals and said status signals via said host interface device and storing said status signals and said sensor signals on a mass storage device associated with said host computer,
  (3) a position determination means comprising a means for calculating from said sensor signals and said status signals an estimated vehicle location, said estimated vehicle location including an estimate of position of said vehicle in said working environment, and an estimate of the orientation of said vehicle in said working environment,
  (4) a mapping means comprising a means for autonomously generating from said sensor signals, said status signals, and said estimated vehicle location a mathematical model of said working environment, including estimated locations of obstacles and boundaries therein,
  (5) a scheduling means comprising a means for automatically initiating operation of said computer peripheral system at predefined times according to a plurality of user selectable preferences,
  (6) a path planning means comprising a means for autonomously generating a mathematical representation of a planned path for said vehicle to follow through said working environment in order to carry out said at least one task according to a plurality of user selectable preferences,
  (7) a vehicle control means comprising means for issuing control commands to said vehicle via said host interface module, and a means for determining a sequence of commands which will cause said vehicle to follow said planned path starting from said estimated vehicle location, and
  (8) a user interface means comprising means for presenting on a display device of said host computer a plurality of user selectable preferences which control the operation of said task scheduling means and said path planning means, and means for altering said preferences according to user input.

2. The system of claim 1 wherein the tasks to be carried out include cleaning of said substantially planar region in said working environment, and wherein said actuation means in said vehicle includes means for cleaning said substantially planar region.

3. The system of claim 1 wherein said charging station and said host interface module are contained within a shared physical housing.

4. The system of claim 1 wherein the means for connecting said host interface module to said host computer uses a preexisting peripheral connection on said host computer.

5. The system of claim 4 wherein said preexisting peripheral connection is selected from a group consisting of serial port connections, parallel port connections, SCSI port connections, ISA bus connections, EISA bus connections, PCI bus connections, IRDA connections and USB connections.

6. The system of claim 1 wherein said sensing means on said vehicle include a plurality of collision sensors, each of which produce a signal when movement of said vehicle brings one of said collision sensors into contact with any object in said working environment.

7. The system of claim 6 wherein said collision sensors are disposed on said body of said vehicle at a plurality of vertical heights, and wherein said position determination means, said mapping means, and said path planning means interpret differently signals from said collision sensors disposed at each height.

8. The system of claim 1 wherein said sensing means on said vehicle include a plurality of proximity sensors each of which produces a signal indicating the distance between one of said proximity sensors and nearby obstacles in said working environment.

9. The system of claim 1 wherein said user interface means comprises a map display means for presenting a graphical representation of said mathematical model of said working environment on said display device of said host computer.

10. The system of claim 9 wherein said user interface means comprises a map modification means for altering said mathematical model according to user input.

11. The system of claim 10 wherein said map modification means comprises a means for incorporating into said mathematical model a plurality of avoidance regions according to user input, and wherein said path planning means is constructed to avoid generating any planed path which would cause said vehicle to travel through any of said avoidance regions.

12. The system of claim 9 wherein said user interface means comprises path display means for presenting a graphical representation of said planned path on said display device.

13. The system of claim 1 wherein said sensing means on said vehicle include a scanning device comprising:
  (a) an emitter which projects a beam of electromagnetic energy into the working environment, a portion of said beam being reflected back to said scanning device by objects in said working environment,
  (b) a rotation means for causing the projected direction of said beam to rotate about an axis substantially perpendicular to the projected direction, (c) a detector which senses said portion of said beam reflected back to said scanning device by objects in said working environment and includes means for producing a time varying reflection signal indicating the intensity of said portion of said beam, and (d) a synchronization means for producing a reference signal indicating the direction of the rotating beam relative to a reference orientation on said vehicle.

14. The system of claim 13

(a) further including a plurality of anonymous retroreflective reference markers disposed in the plane of rotation of said beam on substantially vertical surfaces of objects in said working environment at fixed locations, (b) wherein said sensor processing means includes:

(1) a means for calculating from said reflection signal and past values of said reflected signal the number of reference markers encountered by said beam (2) a means for calculating from said reflection signal and said past values of said signal a bearing angle to each of the encountered reference markers relative to said reference orientation, (c) wherein said mapping means includes a means for calculating from a succession of observed bearing angles the locations of said reference markers, and a means for incorporating the calculated location of each detected reference marker in said mathematical model, and (d) wherein said position determination means includes a means for calculating from said succession of observed bearing angles adjustments to said estimated vehicle location, whereby said position determination means can use said observed bearing angles and the calculated marker locations incorporated in said mathematical model to produce an improved estimate of the location and orientation of said vehicle in said working environment.

15. The system of claim 14 wherein said path planning means includes means for modifying said planned path when said scanning device detects a new reference marker not yet stored in said mathematical model, whereby the calculated location of said new reference marker is refined using the bearing angle measurements taken as said vehicle traverses the modified path.

16. The system of claim 14 wherein said mapping means includes means for calculating a set of improved reference marker locations, and wherein said user interface means includes means for presenting said advisory information on said display device; said advisory information including an indication of said improved reference marker locations, whereby said improved locations allow for improved visibility of said reference markers and improved accuracy in said estimated vehicle location.

17. The system of claim 14 wherein said advisory information includes a graphical map of said working environment with said improved reference marker locations indicated thereon.

18. The system of claim 14 wherein at least one of said retroreflective reference markers is affixed to said charging station.

19. The system of claim 14 wherein the plurality of retroreflective reference markers is subdivided into a first anonymous set and a second anonymous set, the markers belonging to the first set being distinguishable by said sensor processing means from the markers belonging to the second set, and wherein said position determination means, said mapping means, and said path planning means interpret differently observations of markers belonging to each set.

20. The system of claim 19 wherein said plurality of retroreflective reference markers is subdivided into more than two sets.

21. The system of claim 19 in which said second set of reference markers differs in width from said first set of reference markers.

22. The system of claim 19 wherein said path planning means avoids generating any path for the vehicle which passes between two neighboring reference markers belonging to the second set.

23. The system of claim 14 further including tilting means which alters the plane of rotation of said beam, whereby said scanning device can detect a set of objects which lie outside a plane of rotation fixed relative to said vehicle.

24. The system of claim 23 wherein said tilting means comprises a rotating mirror positioned so that said direction of said beam is deflected by said rotating mirror, said rotating mirror being rotated at a rate substantially slower than the rate of rotation of said beam.

25. The system of claim 2 wherein said sensing means on said vehicle include means for producing a cleaning signal indicating the amount of material collected by said cleaning means.

26. The system of claim 25 wherein said path planning means includes means for modifying said planned path in response to stored values of said cleaning signal, whereby areas of the working environment can be selectively cleaned according to past measurements of material collection.

27. The system of claim 1 wherein said position determination means for calculating a plurality of uncertainty values indicating an estimate of the error in said estimated vehicle location.

28. The system of claim 27 wherein said path planning means includes means for modifying said planned path when any of said uncertainty values exceed a threshold, whereby said planned path causes said vehicle to encounter previously mapped objects or reference markers in order to reduce the uncertainty in said estimated vehicle location.

29. The system of claim 27 wherein said user-interface means includes means for presenting alert information on said display device when any of said uncertainty values exceed a predefined threshold for a predefined time limit, whereby said alert information can instruct an operator to return said vehicle to said charging station.

30. The system of claim 27 wherein said sensing means further include contact sensing means which produce a signal if said vehicle is not in contact with said substantially planar region, and wherein said position determination means responds to the signal from said contact sensing means by increasing at least one of said uncertainty values.

31. The system of claim 1 wherein said vehicle further includes sound production means for generating audible sounds in response to commands received from said host computer via said host interface module.

32. The system of claim 31 wherein said system control apparatus further includes behavior control means comprising:

(a) an audio control means for actuating said sound production means on said vehicle by issuing commands via said host interface module, (b) means for recognizing from said sensor data a plurality of predefined interactions between said vehicle and said working environment, (c) means for choosing a selected sound from a plurality of predefined sounds, and (d) means for coordinating the generation of said selected sound by said sound production means with said predefined interactions.

33. The system of claim 32 wherein said predefined interactions include collisions with objects in said working environment.

34. The system of clam 32 wherein at least one of said predefined sounds is a voice sample.

35. The system of claim 32 wherein said behavior control means includes means for modifying the choice of said selected sound amongst said predefined sounds according to a plurality of user selectable preferences.

36. The system of claim 32 wherein said path planning means includes means for modifying said planned path to coordinate the movement of said vehicle with said predefined interactions recognized by said behavior control means.

* * * * *